US010397640B2

(12) United States Patent
Cormican et al.

(10) Patent No.: US 10,397,640 B2
(45) Date of Patent: Aug. 27, 2019

(54) INTERACTIVE CONTEXTUAL PANELS FOR NAVIGATING A CONTENT STREAM

(71) Applicant: Cisco Technology, Inc., San Jose, CA (US)

(72) Inventors: Neil Cormican, London (GB); Ronnie Dan, Modiin (IL); Patricia Patitucci, Guildford (GB); Peter Rogers, Toronto (CA); James Walker, Kings Worthy (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 755 days.

(21) Appl. No.: 14/324,171

(22) Filed: Jul. 5, 2014

(65) Prior Publication Data

US 2015/0128046 A1    May 7, 2015

Related U.S. Application Data

(60) Provisional application No. 61/901,383, filed on Nov. 7, 2013.

(51) Int. Cl.
*H04N 5/445* (2011.01)
*H04N 21/431* (2011.01)
(Continued)

(52) U.S. Cl.
CPC ....... *H04N 21/4316* (2013.01); *G06F 3/0412* (2013.01); *G06F 3/0484* (2013.01); *G06F 3/0488* (2013.01); *G06F 3/04817* (2013.01); *G06F 3/04883* (2013.01); *G06F 3/1454* (2013.01); *H04L 41/22* (2013.01); *H04L 65/00* (2013.01); *H04N 21/23424* (2013.01);
(Continued)

(58) Field of Classification Search
CPC ................................... H04N 21/4316
USPC ....................................... 725/40, 43
See application file for complete search history.

(56) References Cited

U.S. PATENT DOCUMENTS 6,330,231 B1   12/2001  Bi
6,415,164 B1    7/2002  Blanchard et al.
(Continued)

FOREIGN PATENT DOCUMENTS

GB     2 389 017 A    11/2003
JP     2011-204656    10/2011

OTHER PUBLICATIONS

Christian, Josh, "Four Images on One Screen!—Make Your Home Theater More Versatile," posted Sep. 2, 2010, http://blog.dsientertainment.com/audio-video-home-theater-automation/bid/29732/Four-Images-On-One-Screen-Make-Your-Home-Theter-More-Versatile.
(Continued)

*Primary Examiner* — Pankaj Kumar
*Assistant Examiner* — Sahar Aqil Riaz
(74) *Attorney, Agent, or Firm* — Polsinelli PC

(57) ABSTRACT

Displaying a graphical user interface on a second-screen device. The graphical user interface can include a partial video stream displayed in a video display area on a touchscreen of the second-screen device and a contextual panel in an active display area on the touchscreen. The contextual panel can include content associated with the partial video stream. The displayed partial video stream can be associated with a video stream displayed by a primary display with the two displayed video streams being associated with the same content and substantially synchronized.

18 Claims, 42 Drawing Sheets

(51) Int. Cl.

| | |
|---|---|
| *G06F 3/0481* | (2013.01) |
| *G06F 3/0484* | (2013.01) |
| *H04L 12/24* | (2006.01) |
| *G06F 3/041* | (2006.01) |
| *H04N 21/234* | (2011.01) |
| *H04N 21/41* | (2011.01) |
| *H04N 21/4143* | (2011.01) |
| *H04N 21/422* | (2011.01) |
| *H04N 21/4227* | (2011.01) |
| *H04N 21/442* | (2011.01) |
| *H04N 21/472* | (2011.01) |
| *H04N 21/4784* | (2011.01) |
| *H04N 21/43* | (2011.01) |
| *H04N 21/482* | (2011.01) |
| *H04L 29/06* | (2006.01) |
| *H04N 21/4788* | (2011.01) |
| *G06F 3/0488* | (2013.01) |
| *G06F 3/14* | (2006.01) |
| *H04N 21/81* | (2011.01) |
| *G09G 5/12* | (2006.01) |

(52) U.S. Cl.
CPC ..... *H04N 21/4122* (2013.01); *H04N 21/4126* (2013.01); *H04N 21/4143* (2013.01); *H04N 21/4222* (2013.01); *H04N 21/4227* (2013.01); *H04N 21/42209* (2013.01); *H04N 21/42224* (2013.01); *H04N 21/4307* (2013.01); *H04N 21/44222* (2013.01); *H04N 21/4784* (2013.01); *H04N 21/4788* (2013.01); *H04N 21/47205* (2013.01); *H04N 21/47217* (2013.01); *H04N 21/482* (2013.01); *G06F 3/1423* (2013.01); *G06F 2203/04803* (2013.01); *G09G 5/12* (2013.01); *G09G 2354/00* (2013.01); *H04N 21/812* (2013.01)

(56) References Cited

U.S. PATENT DOCUMENTS

| | | | |
|---|---|---|---|
| 6,453,345 | B2 | 9/2002 | Trcka et al. |
| 6,470,383 | B1 | 10/2002 | Leshem et al. |
| 6,529,218 | B2 | 3/2003 | Ogawa et al. |
| 7,027,052 | B1 | 4/2006 | Thorn et al. |
| 7,036,087 | B1 | 4/2006 | Odom |
| 7,043,702 | B2 | 5/2006 | Chi et al. |
| 7,051,029 | B1 | 5/2006 | Fayyad et al. |
| 7,603,373 | B2 | 10/2009 | Error et al. |
| 7,644,365 | B2 | 1/2010 | Bhattacharya et al. |
| 7,730,223 | B1 | 6/2010 | Bavor et al. |
| 7,792,844 | B2 | 9/2010 | Error et al. |
| 7,921,459 | B2 | 4/2011 | Houston et al. |
| 7,945,620 | B2 | 5/2011 | Bou-Ghannam et al. |
| 7,958,189 | B2 | 6/2011 | Bernstein |
| 8,006,198 | B2 | 8/2011 | Okuma et al. |
| 8,037,421 | B2 | 10/2011 | Scott et al. |
| 8,245,297 | B2 | 8/2012 | Lim |
| 8,325,626 | B2 | 12/2012 | Tóth et al. |
| 8,380,359 | B2 | 2/2013 | Duchene et al. |
| 8,396,874 | B2 * | 3/2013 | Shamma ............. G06F 17/3082 707/741 |
| 8,423,163 | B2 | 4/2013 | Park |
| 8,429,562 | B2 | 4/2013 | Gourdol et al. |
| 8,442,693 | B2 | 5/2013 | Mirza et al. |
| 8,443,289 | B2 | 5/2013 | Sahashi et al. |
| 8,448,076 | B2 | 5/2013 | Hammack et al. |
| 8,619,958 | B2 | 12/2013 | Patisaul et al. |
| 8,650,492 | B1 | 2/2014 | Mui et al. |
| 8,738,158 | B2 | 5/2014 | Sims et al. |
| 8,762,475 | B2 | 6/2014 | Cheung et al. |
| 8,839,404 | B2 | 9/2014 | Li et al. |
| 8,868,736 | B2 | 10/2014 | Bowler et al. |
| 8,958,318 | B1 | 2/2015 | Hastwell et al. |
| 8,977,794 | B2 | 3/2015 | Grohman et al. |
| 8,994,539 | B2 | 3/2015 | Grohman et al. |
| 9,112,719 | B2 | 8/2015 | Sasaki et al. |
| 9,185,002 | B2 | 11/2015 | Sasaki et al. |
| 9,317,778 | B2 * | 4/2016 | Cordova-Diba ............. G06F 17/30247 |
| 9,318,016 | B2 | 4/2016 | Park |
| 9,354,798 | B2 | 5/2016 | Sasaki et al. |
| 9,462,041 | B1 | 10/2016 | Hagins et al. |
| 9,516,374 | B2 | 12/2016 | Cormican et al. |
| 9,584,853 | B2 | 2/2017 | Frebourg et al. |
| 9,686,581 | B2 | 6/2017 | Cormican et al. |
| 9,733,983 | B2 | 8/2017 | Kukreja et al. |
| 9,900,224 | B2 | 2/2018 | Dumitriu et al. |
| 9,985,837 | B2 | 5/2018 | Rao et al. |
| 2001/0048373 | A1 | 12/2001 | Sandelman |
| 2002/0049749 | A1 | 4/2002 | Helgeson et al. |
| 2002/0087976 | A1 | 7/2002 | Kaplan et al. |
| 2003/0035075 | A1 | 2/2003 | Butler et al. |
| 2003/0229529 | A1 | 12/2003 | Mui et al. |
| 2004/0010561 | A1 | 1/2004 | Kim et al. |
| 2004/0034614 | A1 | 2/2004 | Asher et al. |
| 2004/0041833 | A1 | 3/2004 | Dikhit |
| 2004/0236774 | A1 | 11/2004 | Baird et al. |
| 2005/0146534 | A1 | 7/2005 | Fong et al. |
| 2006/0005228 | A1 | 1/2006 | Matsuda |
| 2006/0129939 | A1 | 6/2006 | Nelles et al. |
| 2007/0037563 | A1 | 2/2007 | Yang et al. |
| 2007/0061486 | A1 | 3/2007 | Trinh et al. |
| 2007/0226325 | A1 | 9/2007 | Bawa et al. |
| 2007/0239854 | A1 | 10/2007 | Janakiraman et al. |
| 2008/0045142 | A1 | 2/2008 | Kim |
| 2008/0084888 | A1 | 4/2008 | Yadav et al. |
| 2008/0101381 | A1 | 5/2008 | Sun et al. |
| 2008/0126930 | A1 | 5/2008 | Scott |
| 2008/0127057 | A1 | 5/2008 | Costa et al. |
| 2008/0163207 | A1 | 7/2008 | Reumann et al. |
| 2008/0219243 | A1 | 9/2008 | Silverman |
| 2008/0307451 | A1 | 12/2008 | Green |
| 2009/0044185 | A1 | 2/2009 | Krivopaltsev |
| 2009/0153288 | A1 | 6/2009 | Hope et al. |
| 2009/0307485 | A1 | 12/2009 | Weniger et al. |
| 2010/0023865 | A1 | 1/2010 | Fulker et al. |
| 2010/0031202 | A1 | 2/2010 | Morris et al. |
| 2010/0033422 | A1 | 2/2010 | Mucignat et al. |
| 2010/0169755 | A1 | 7/2010 | Zafar et al. |
| 2010/0174583 | A1 | 7/2010 | Passova et al. |
| 2010/0188328 | A1 | 7/2010 | Dodge et al. |
| 2010/0218211 | A1 * | 8/2010 | Herigstad ............. H04N 7/163 725/34 |
| 2010/0262477 | A1 | 10/2010 | Hillerbrand et al. |
| 2010/0275139 | A1 | 10/2010 | Hammack et al. |
| 2010/0280637 | A1 | 11/2010 | Cohn et al. |
| 2011/0030013 | A1 | 2/2011 | Diaz Perez |
| 2011/0050594 | A1 | 3/2011 | Kim et al. |
| 2011/0115741 | A1 | 5/2011 | Lukas et al. |
| 2011/0142053 | A1 | 6/2011 | Van Der Merwe et al. |
| 2011/0182295 | A1 | 7/2011 | Singh et al. |
| 2011/0185303 | A1 | 7/2011 | Katagi et al. |
| 2011/0191303 | A1 | 8/2011 | Kaufman et al. |
| 2011/0193788 | A1 | 8/2011 | King et al. |
| 2011/0202270 | A1 | 8/2011 | Sharma et al. |
| 2011/0208541 | A1 | 8/2011 | Wilson et al. |
| 2011/0209089 | A1 | 8/2011 | Hinckley et al. |
| 2011/0209104 | A1 | 8/2011 | Hinckley et al. |
| 2011/0221777 | A1 | 9/2011 | Ke |
| 2011/0239142 | A1 * | 9/2011 | Steeves ............. G06F 3/14 715/764 |
| 2011/0264286 | A1 | 10/2011 | Park |
| 2012/0005609 | A1 | 1/2012 | Ata et al. |
| 2012/0054367 | A1 | 3/2012 | Ramakrishnan et al. |
| 2012/0140255 | A1 | 6/2012 | Tanaka |
| 2012/0154138 | A1 | 6/2012 | Cohn et al. |
| 2012/0154294 | A1 | 6/2012 | Hinckley et al. |
| 2012/0185791 | A1 | 7/2012 | Claussen et al. |
| 2012/0192111 | A1 | 7/2012 | Hsu et al. |
| 2012/0210349 | A1 * | 8/2012 | Campana ............. G06F 3/147 725/32 |

(56) References Cited

U.S. PATENT DOCUMENTS

| | | |
|---|---|---|
| 2012/0235921 A1 | 9/2012 | Laubach |
| 2012/0290940 A1 | 11/2012 | Quine |
| 2012/0291068 A1 | 11/2012 | Khushoo et al. |
| 2012/0324035 A1 | 12/2012 | Cantu et al. |
| 2013/0021281 A1 | 1/2013 | Tse et al. |
| 2013/0024799 A1 | 1/2013 | Fadell et al. |
| 2013/0047125 A1 | 2/2013 | Kangas et al. |
| 2013/0069969 A1 | 3/2013 | Chang et al. |
| 2013/0124523 A1 | 5/2013 | Rogers et al. |
| 2013/0145008 A1 | 6/2013 | Kannan et al. |
| 2013/0145307 A1 | 6/2013 | Kawasaki |
| 2013/0152017 A1 | 6/2013 | Song et al. |
| 2013/0155906 A1 | 6/2013 | Nachum et al. |
| 2013/0159898 A1 | 6/2013 | Knospe et al. |
| 2013/0174191 A1* | 7/2013 | Thompson, Jr. ... G06Q 30/0207 725/23 |
| 2013/0179842 A1 | 7/2013 | Deleris et al. |
| 2013/0201215 A1 | 8/2013 | Martellaro et al. |
| 2013/0218987 A1 | 8/2013 | Chudge et al. |
| 2013/0265905 A1 | 10/2013 | Filsfils |
| 2013/0290783 A1 | 10/2013 | Bowler et al. |
| 2013/0322438 A1 | 12/2013 | Gospodarek et al. |
| 2013/0322848 A1 | 12/2013 | Li |
| 2013/0326583 A1 | 12/2013 | Freihold et al. |
| 2013/0347018 A1* | 12/2013 | Limp ................ H04N 21/4826 725/19 |
| 2014/0002580 A1 | 1/2014 | Bear et al. |
| 2014/0007089 A1 | 1/2014 | Bosch et al. |
| 2014/0013271 A1 | 1/2014 | Moore et al. |
| 2014/0016926 A1 | 1/2014 | Soto et al. |
| 2014/0023348 A1* | 1/2014 | O'Kelly ............... G11B 27/031 386/278 |
| 2014/0025770 A1 | 1/2014 | Warfield et al. |
| 2014/0033040 A1* | 1/2014 | Thomas ............... G06F 3/0488 715/721 |
| 2014/0040784 A1 | 2/2014 | Behforooz et al. |
| 2014/0089992 A1* | 3/2014 | Varoglu ............ H04N 21/4122 725/81 |
| 2014/0105213 A1 | 4/2014 | A K et al. |
| 2014/0108614 A1 | 4/2014 | Gunderson et al. |
| 2014/0108985 A1 | 4/2014 | Scott et al. |
| 2014/0130035 A1 | 5/2014 | Desai et al. |
| 2014/0132594 A1* | 5/2014 | Gharpure ............. G06T 15/205 345/419 |
| 2014/0176479 A1* | 6/2014 | Wardenaar ............ G11B 27/34 345/173 |
| 2014/0198808 A1 | 7/2014 | Zhou |
| 2014/0201681 A1 | 7/2014 | Mahaffey et al. |
| 2014/0269321 A1 | 9/2014 | Kamble et al. |
| 2014/0280133 A1 | 9/2014 | Dulitz |
| 2014/0281012 A1* | 9/2014 | Troxler ............... H04L 67/2804 709/231 |
| 2014/0282213 A1 | 9/2014 | Musa et al. |
| 2014/0298210 A1 | 10/2014 | Park et al. |
| 2014/0310623 A1 | 10/2014 | O'Connell, Jr. et al. |
| 2014/0320387 A1 | 10/2014 | Eriksson et al. |
| 2014/0337824 A1 | 11/2014 | St John et al. |
| 2014/0373064 A1 | 12/2014 | Ray |
| 2015/0006296 A1 | 1/2015 | Gupta et al. |
| 2015/0012881 A1 | 1/2015 | Song et al. |
| 2015/0019991 A1 | 1/2015 | Kristjansson |
| 2015/0030024 A1 | 1/2015 | Venkataswami et al. |
| 2015/0043581 A1 | 2/2015 | Devireddy et al. |
| 2015/0058314 A1 | 2/2015 | Leclerc et al. |
| 2015/0074735 A1* | 3/2015 | Herigstad ............ H04N 21/478 725/110 |
| 2015/0081701 A1 | 3/2015 | Lerios et al. |
| 2015/0121436 A1* | 4/2015 | Rango ................ G11B 27/10 725/88 |
| 2015/0128050 A1 | 5/2015 | Cormican et al. |
| 2015/0163192 A1 | 6/2015 | Jain et al. |
| 2015/0169208 A1 | 6/2015 | Cho |
| 2015/0193549 A1 | 7/2015 | Frye et al. |
| 2016/0034051 A1 | 2/2016 | Xi et al. |
| 2016/0063954 A1* | 3/2016 | Ryu ..................... G06F 3/1454 345/589 |
| 2016/0154575 A1 | 6/2016 | Xie et al. |
| 2016/0202879 A1* | 7/2016 | Chen ..................... G06Q 50/01 715/753 |
| 2016/0253046 A1 | 9/2016 | Garrison et al. |
| 2016/0364085 A1 | 12/2016 | Henderson et al. |
| 2018/0143868 A1 | 5/2018 | Johnston et al. |

OTHER PUBLICATIONS

DSI Entertainment Systems, "Crestron control of a high-end custom home theater design in Los Angeles," voutube.com, published Dec. 14, 2010, http://www.youtube.com/watch?v=zq4KVo7XRUE.

rAVe Publications, "ISE 2014: Savant Systems Displays SmartView Video Tiling Interface," youtube.com, published Feb. 6, 2014, http://www.youtube.com/watch?v=XN80MOr1Nj4.

Residential Systems, Inc. "Savant Video Tiling from Residential Systems, Inc." Video, youtube.corn, published Dec. 26, 2013, http://www.youtube.com/watch?v=20JWj5IJSIQ.

Sky.com, Jun. 24, 2013, British Sky Broadcasting Group PLC and Sky International AG, http://www.sky.com/mysky/latestnewslarticle/my-sky-updates/2012-07/sky-plus-app-on-ipad.

SmartView Tiling User Guide, Savant Systems LLC, Jan. 2014, pp. 1-25.

Zeeebox.com, copyright 2012, https://web.archive.orglweb/20130609083253/http://zeebox.com.

"AppRF," arubanetworks.com, retrieved Nov. 7, 2017, 12 pages.

"Attractive-jQuery-Circular-Countdown-Timer-Plugin-TimeCircles," Jan. 19, 2015, 1 page.

"Definition of together," Merriam-Webster, 2 pages.

"Flow diagram," http://en.wikipedia.org/wiki/Flow_diagram, retrieved on Jun. 11, 2015, 2 pages.

"GitHub," https://github.com/tejas-rane/CLI-forRYU-Firewail retrieved Nov. 9, 2017.

"Google Gesture Search," Goggle, Jun. 21, 2013.

"Introducing the new Sky+ app for iPad," Sky.com, 2 pages.

"Suggestion: Browser "new tab"—cover gesture to include bookmarks," Feb. 11, 2014.

"Tweetbot for MAC," http://tapbots.com/tweetbot/mac/ retrieved Jun. 8, 2015, 3 pages.

"Y! Multi messenger 2.0.0.100," last update Sep. 10, 2013, http://y-multi-messeger.soft32.com.

Author Unknown, "Sorting Your Chat List," available at https://support.google.com/chat/answer/161035?hl=en, retrieved on Jan. 1, 2014, 2 pages.

Author Unknown, "User Interface—Changing Icon Appearance Based on Frequency of Use (Samsung)—Patent Application—Prior Art Request," available at http://patents.stackexchange.com/questions/4233/user-interface-changing-icon-appearance-based-on-frequency-of-use-samsung Jul. 26, 2013, 9 pages.

Author Unknown, "Using the Tile View," Visokio, 2013, 3 pages.

Constine, Josh, "Facebook's Relevance-Filtered Chat buddy List, or, Why Users Don't Know Who's Online," Aug. 8, 2011, 9 pages.

Firewall Builder, http://www.fwbuilder.ord/4.0/screenshots.shtml retrieved Nov. 7, 2017, 4 pages.

Galitz, Wilbert O., "The Essential Guide to User Interface Design," second edition, 2002, p. 477-478.

McNamara, Katherine, "Firepower Setup and Policy Creation," Aug. 12, 2016, 2 pages.

Mui, Phil, "Introducing Flow Visualization: visualizing visitor flow," Google Analytics Blog, Oct. 19, 2011, 6 pages.

Neeman, Patrick, "Goggle Is Missing Social and Their Culture May Be to Blame," Jun. 12, 2013, 9 pages.

Pozo, S., et al., "AFPL2, An Abstract Language for Firewall ACLs with NAT support," Jun. 2009, 8 pages.

The Lync Insider, "The "Inside" Perspective on Skype for Business Server 2015, Lync Server 2012, VOIP and Unifie . . . " Jun. 8, 2015, 23 pages.

Wagner, Kyle, "The OS X Lion Survival Guide," Jul. 21, 2011, 7 pages.

Wikipedia, "Sankey Diagram," Jun. 11, 2015, 2 pages.

(56) References Cited

OTHER PUBLICATIONS

Yu, Toby, "Resizable Contacts Widget Pro," Oct. 7, 2013, 3 pages.

* cited by examiner

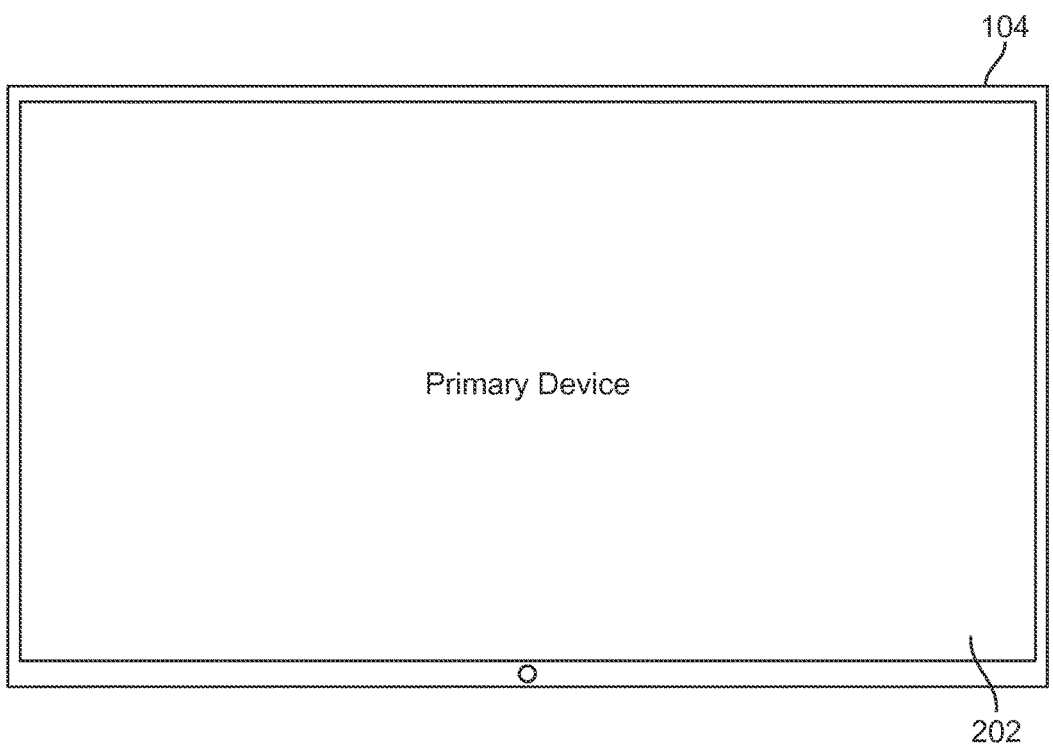
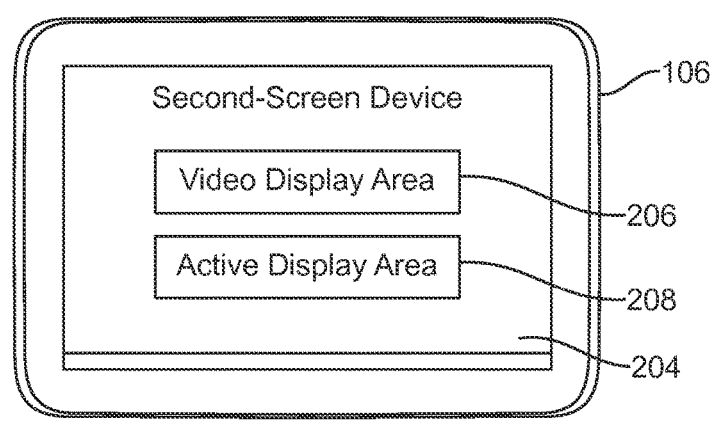
FIG. 2A

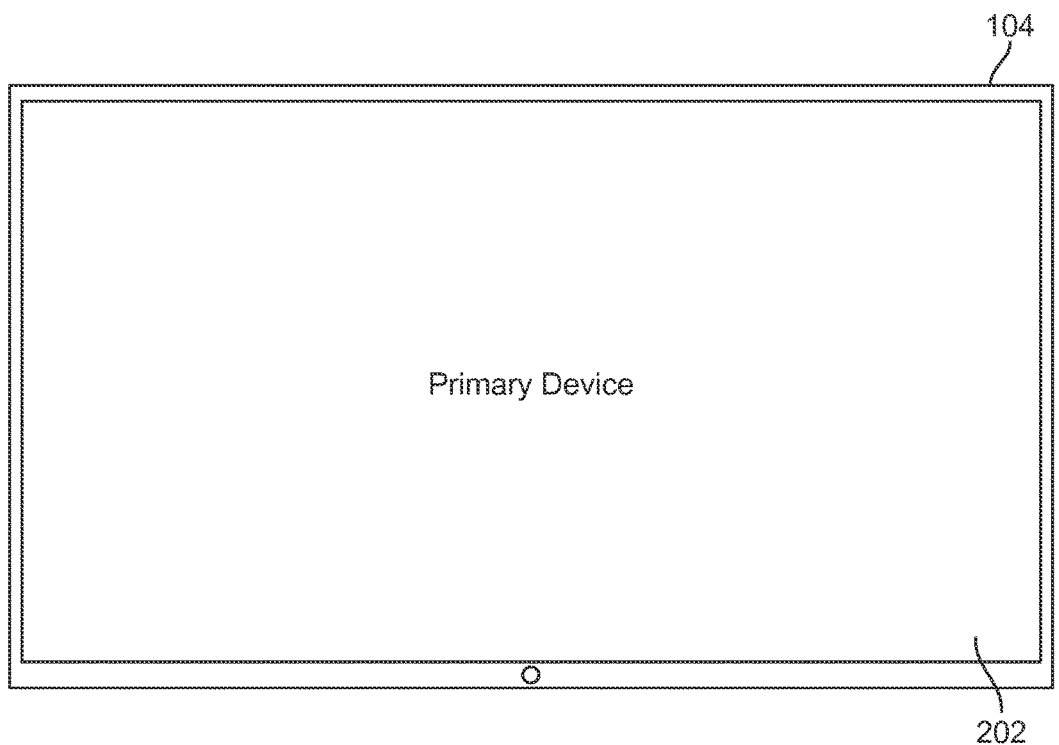
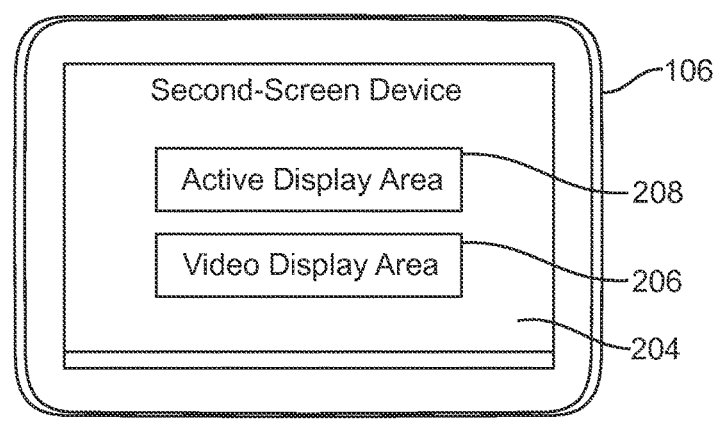
FIG. 2B

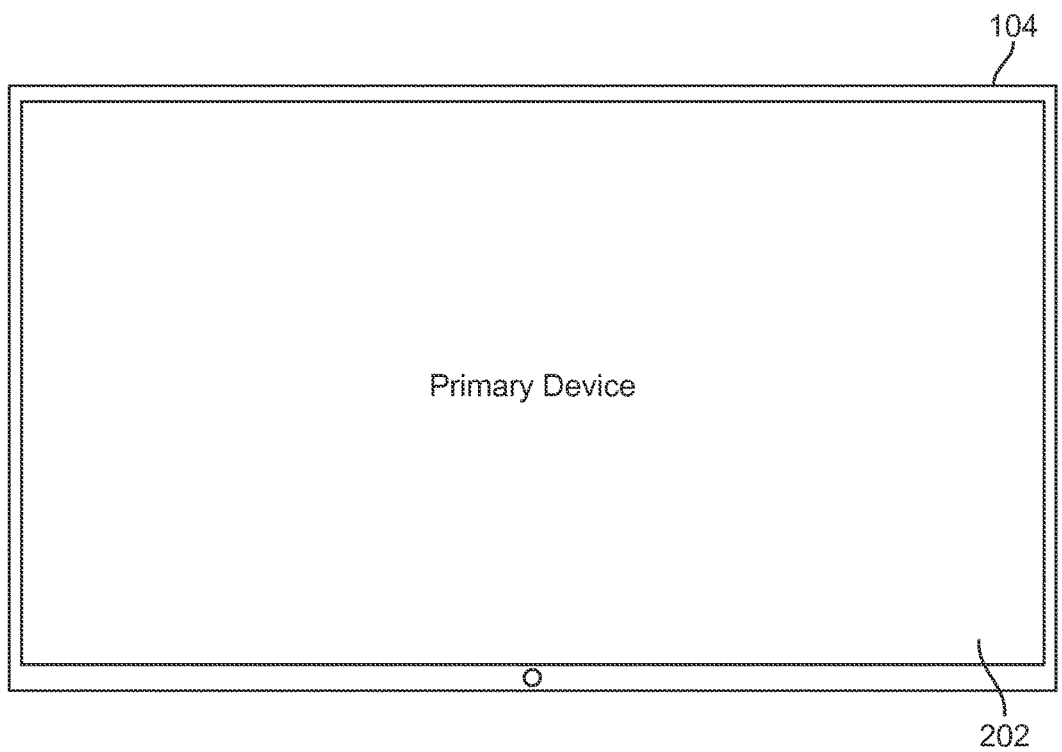
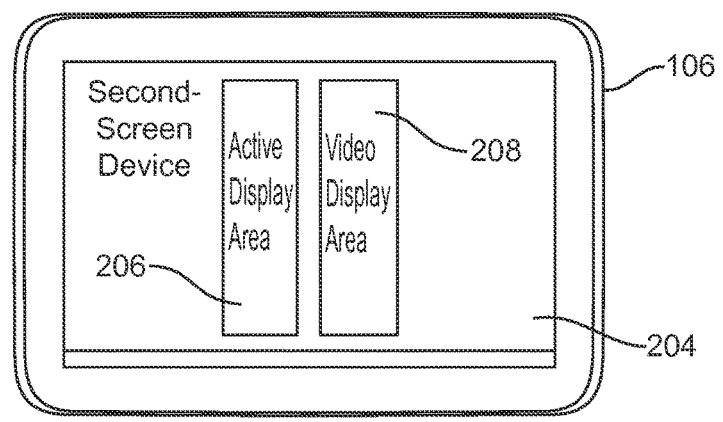
FIG. 2C

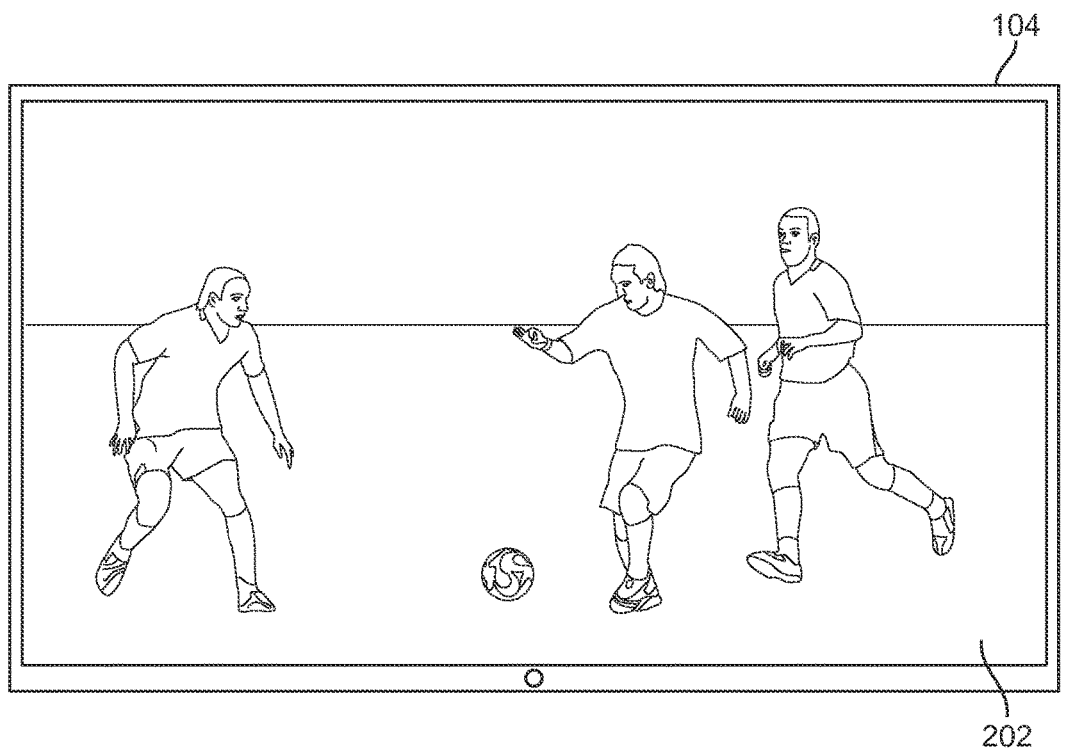
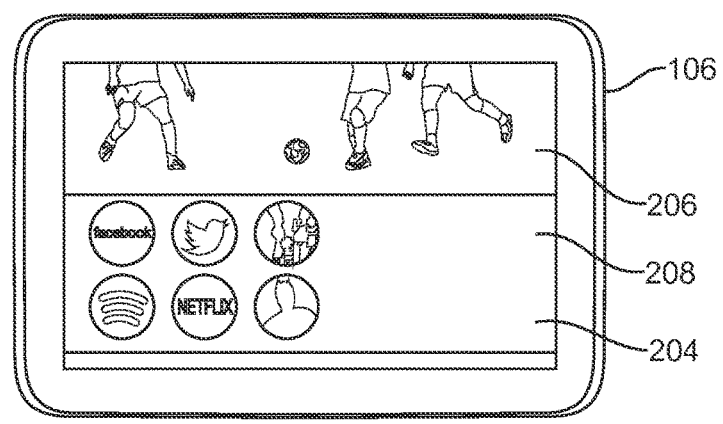
FIG. 4

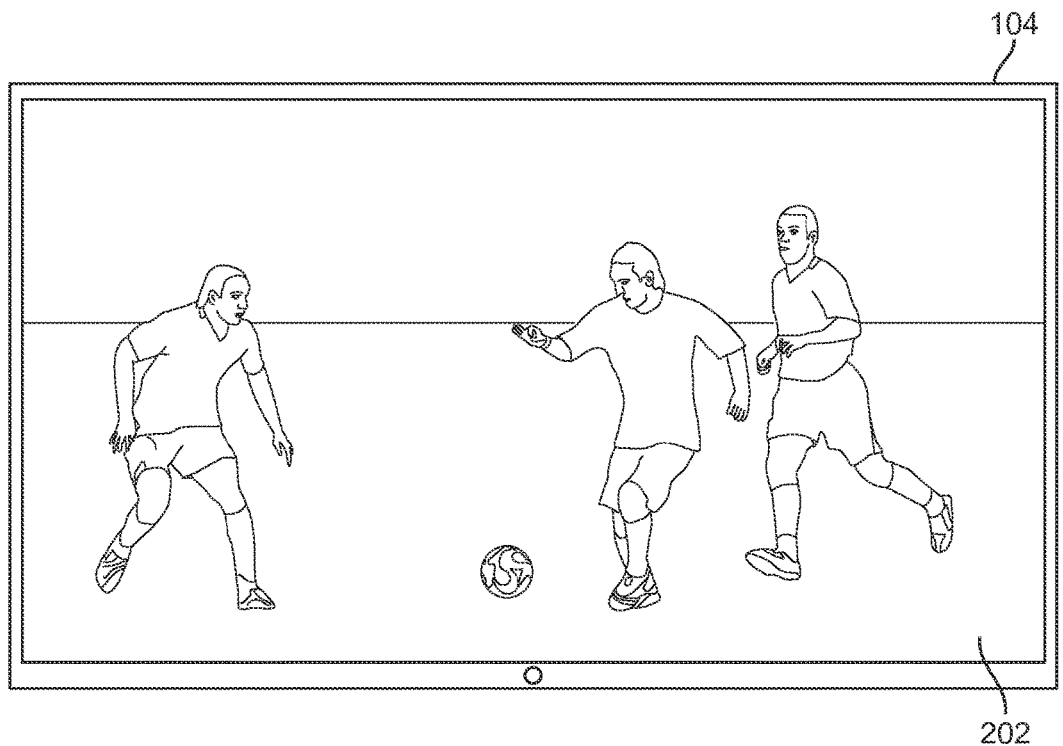
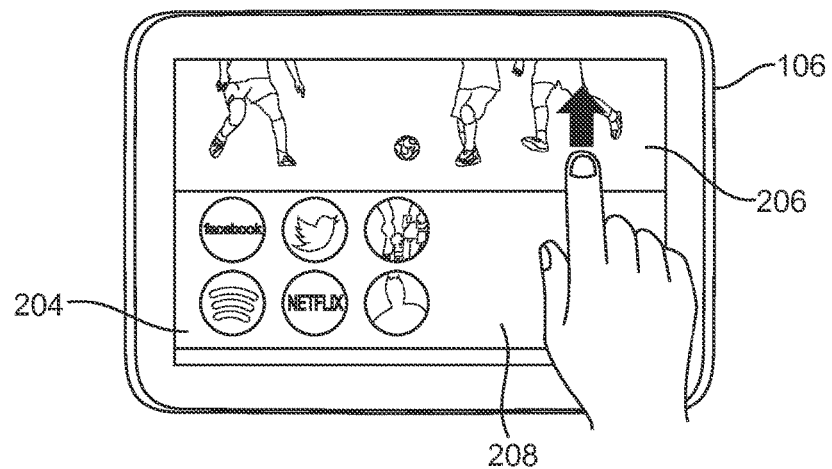
FIG. 5

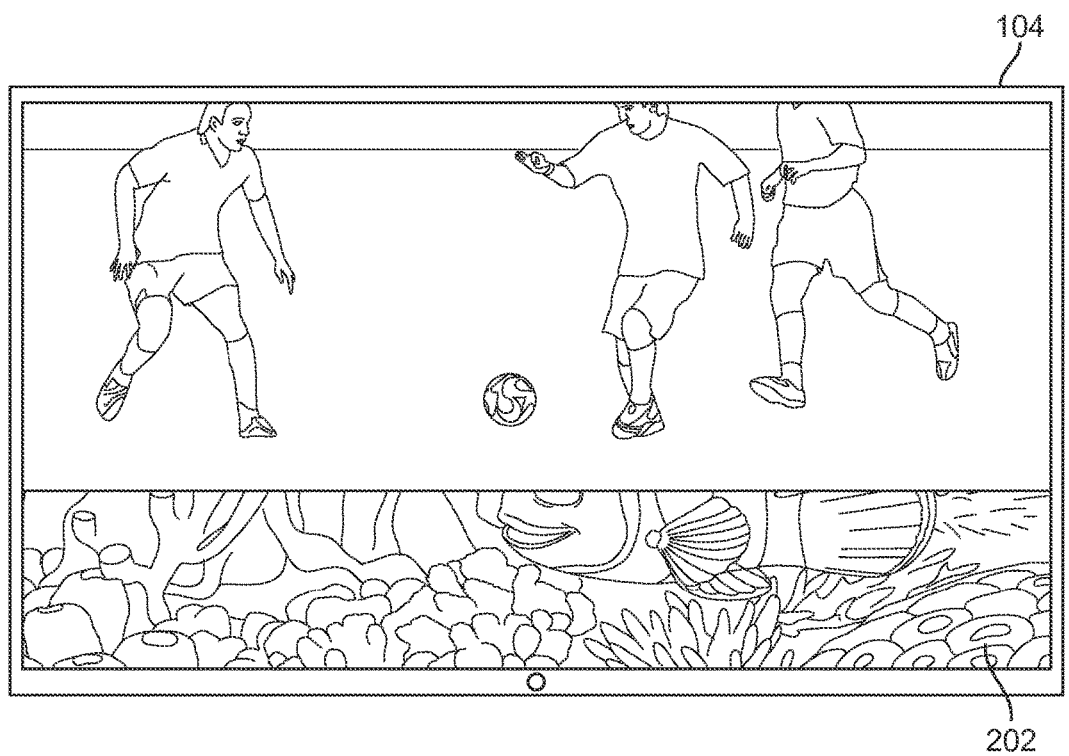
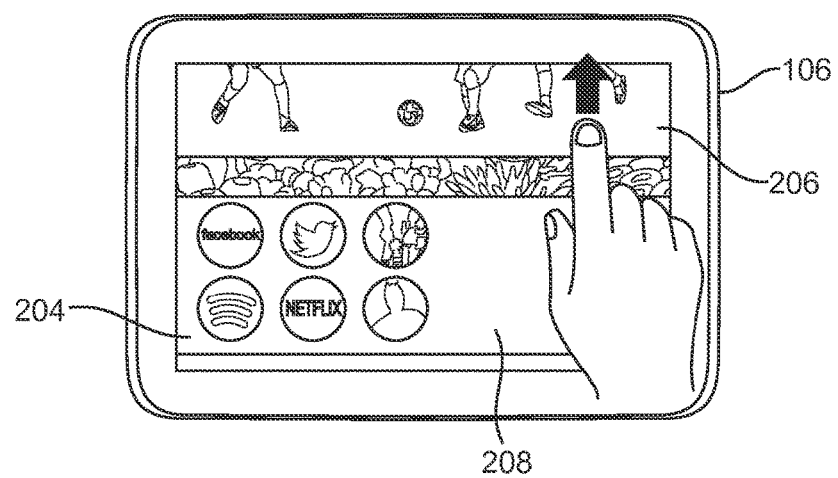
FIG. 6

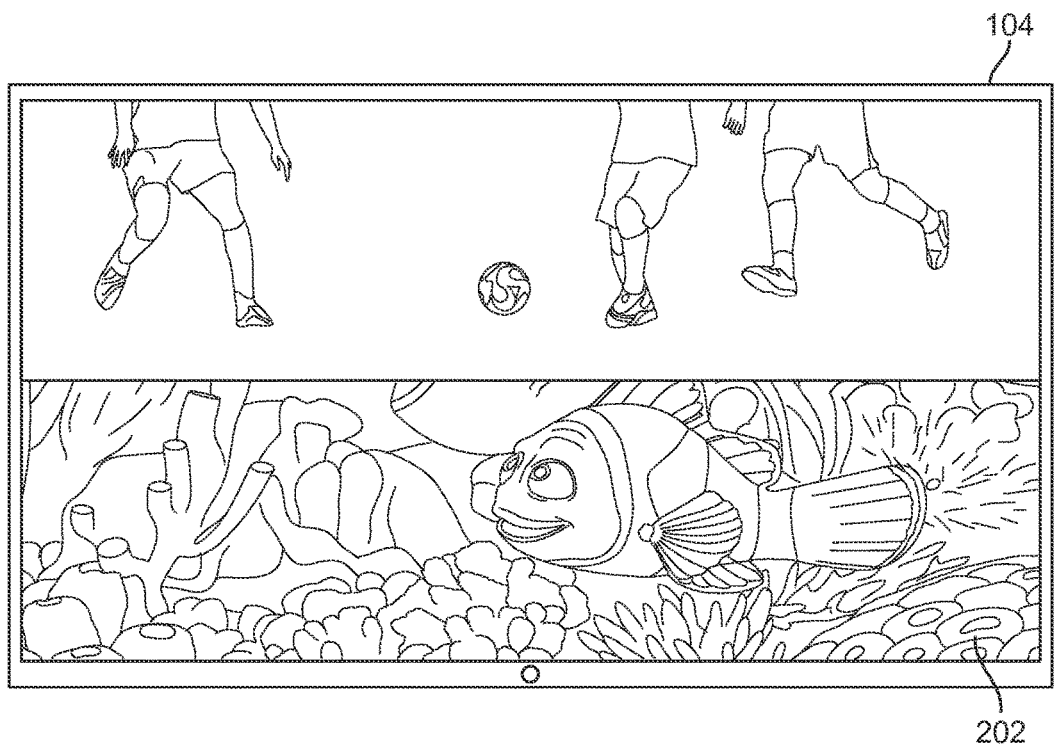
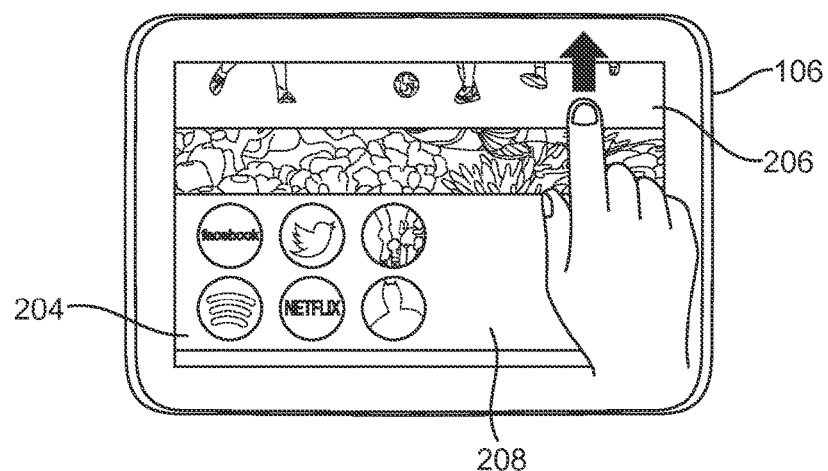
FIG. 7

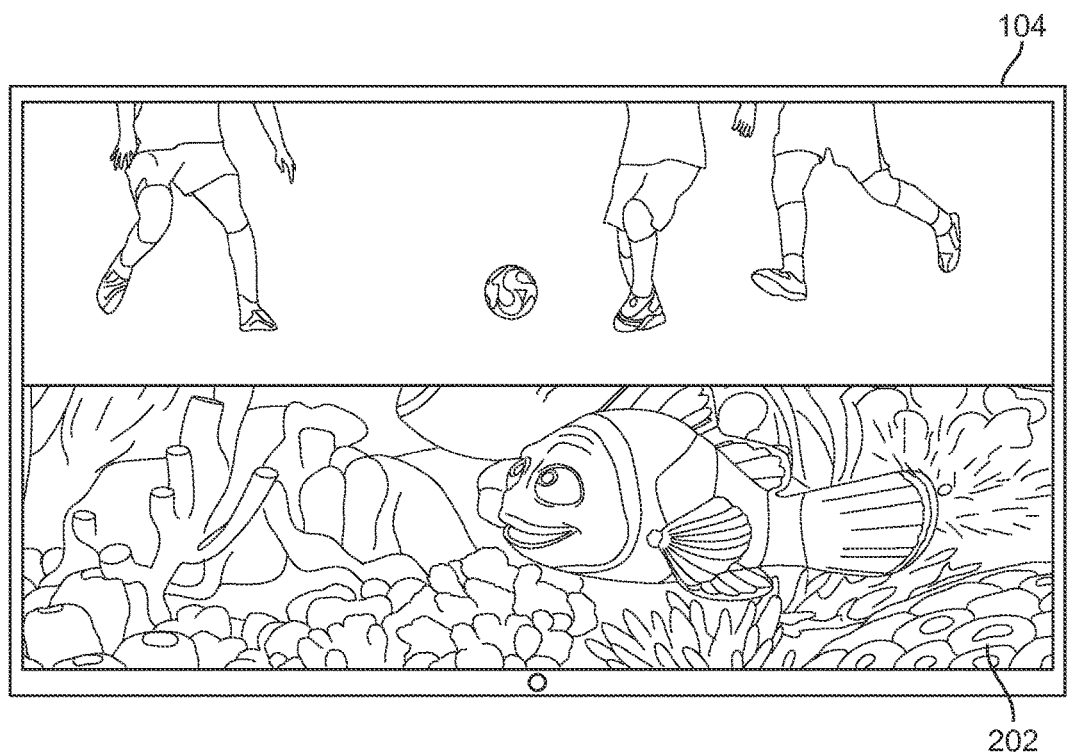
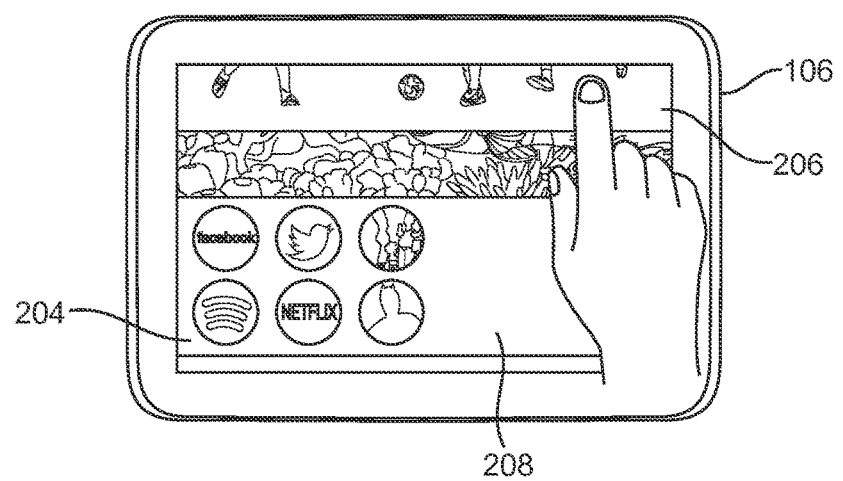
FIG. 8

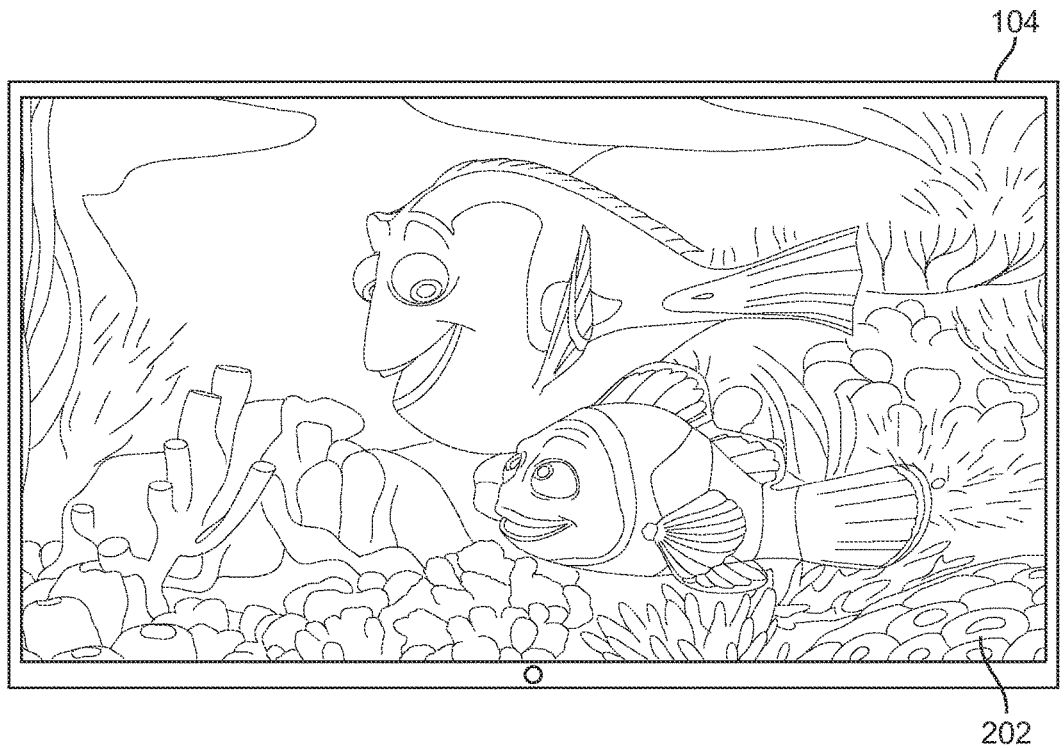
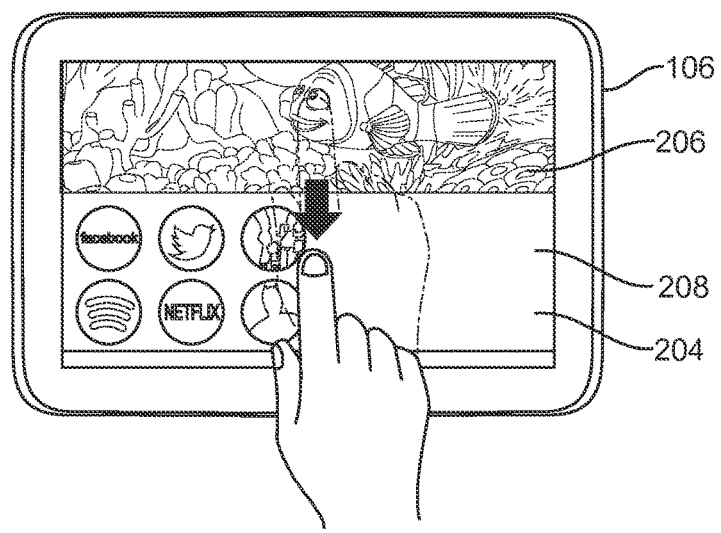
FIG. 14

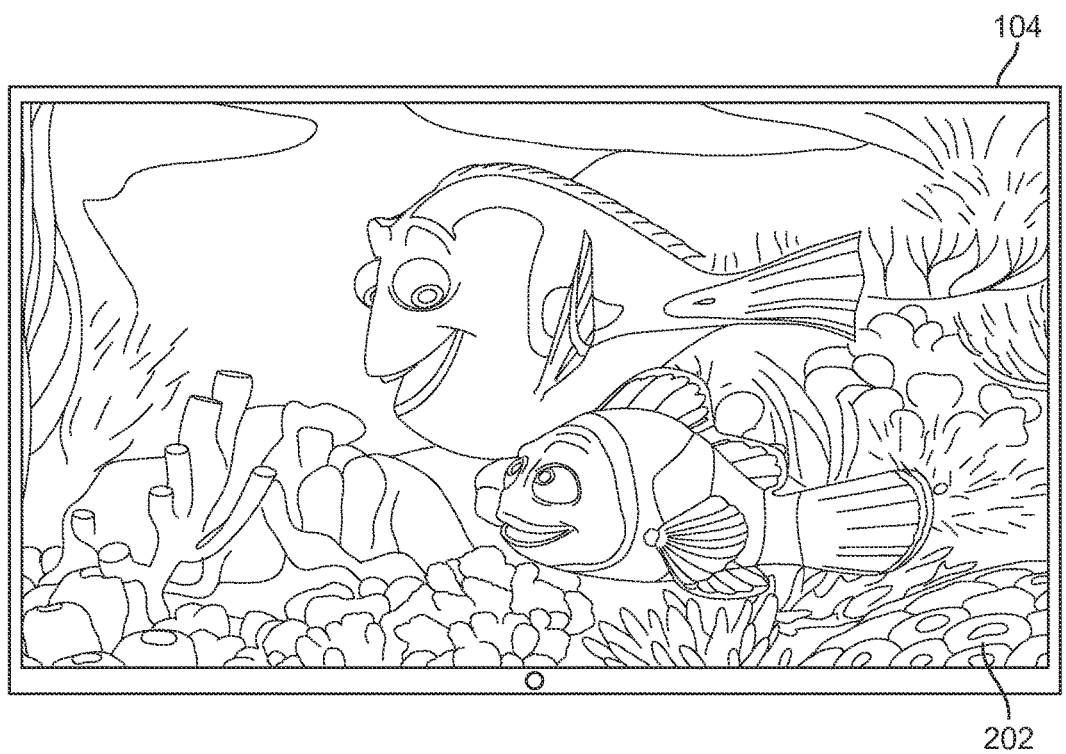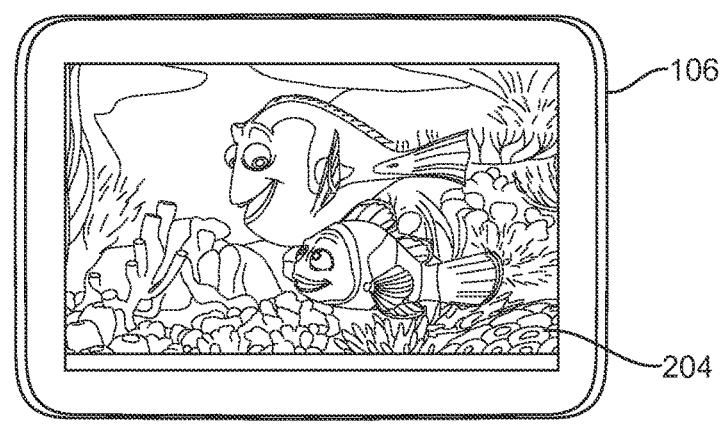
FIG. 15

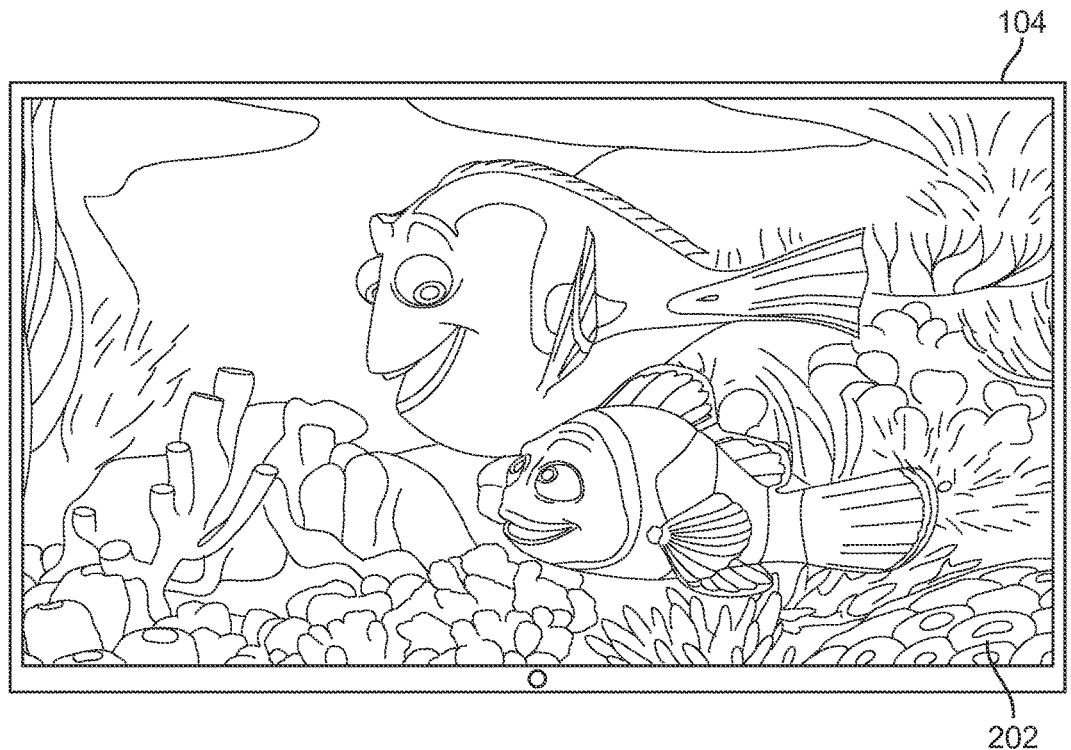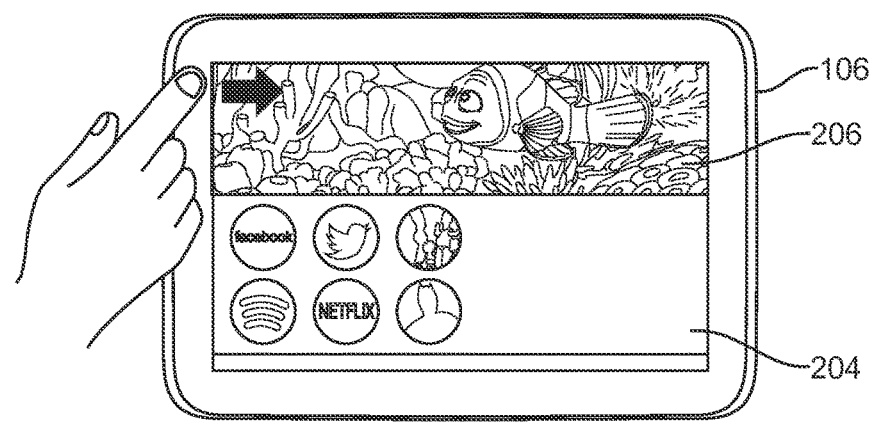
FIG. 16

INTERACTIVE CONTEXTUAL PANELS FOR NAVIGATING A CONTENT STREAM

RELATED APPLICATIONS

This application claims priority to U.S. Provisional Patent Application No. 61/901,383, filed on Nov. 7, 2013, the content of which is incorporated herein by reference in its entirety.

TECHNICAL FIELD

The present technology pertains to outputting video content on a primary display, and more specifically pertains to navigation on a second-screen device with the effects of the navigation being shown on the primary display.

BACKGROUND

Current technology is allowing a user to watch a primary display, such as a television, while using a second-screen device, such as a tablet or a smart phone, to interact with the primary display. As such interactions are becoming more popular, television viewers are using the second-screen devices to find out what is on television and/or using the second-screen devices for searches, queries, sharing media content related to the content on the television and other interactions on the second-screen devices. However, the primary displays and second-screen devices typically do not interact and more specifically do not share a visual connection between the two devices. For example, a user sits in front of the television with the tablet on his or her lap and uses an application to find information related to a channel or program. If the application is related to what is on the television, the user has to make the connection between the two devices. For example, the user has to watch and/or listen to the television and interact with the second-screen device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

FIG. 2A illustrates a block diagram of a primary display and a second-screen device of a TV bridge system in accordance with an exemplary embodiment;

FIG. 2B illustrates a block diagram of a primary display and a second-screen device of a TV bridge system in accordance with an alternative exemplary embodiment;

FIG. 2C illustrates a block diagram of a primary display and a second-screen device of a TV bridge system in accordance with another alternative exemplary embodiment;

FIG. 4 illustrates screenshots of the primary device and the second-screen device displaying video streams from a currently tuned channel in accordance with an exemplary embodiment;

FIG. 5 illustrates screenshots of the primary device and the second-screen device for a peek command gesture in accordance with an exemplary embodiment;

FIG. 6 illustrates screenshots of the primary device and the second-screen device for a peek command that is less than 50%/50% in accordance with an exemplary embodiment;

FIG. 7 illustrates screenshots of the primary device and the second-screen device for a peek command that is 50%/50% in accordance with an exemplary embodiment are illustrated;

FIG. 8 illustrates screenshots of the primary device and the second-screen device for an up channel command gesture in accordance with an exemplary embodiment;

FIG. 14 illustrates screenshots of the primary device and the second-screen device for a full screen command gesture in accordance with an exemplary embodiment;

FIG. 15 illustrates screenshots of the primary device displaying a video stream and the second-screen device displaying a video stream in full screen in accordance with an exemplary embodiment;

FIG. 16 illustrates screenshots of the primary device and the second-screen device for a tear to unlock command gesture in accordance with an exemplary embodiment

DESCRIPTION

Figure 1:
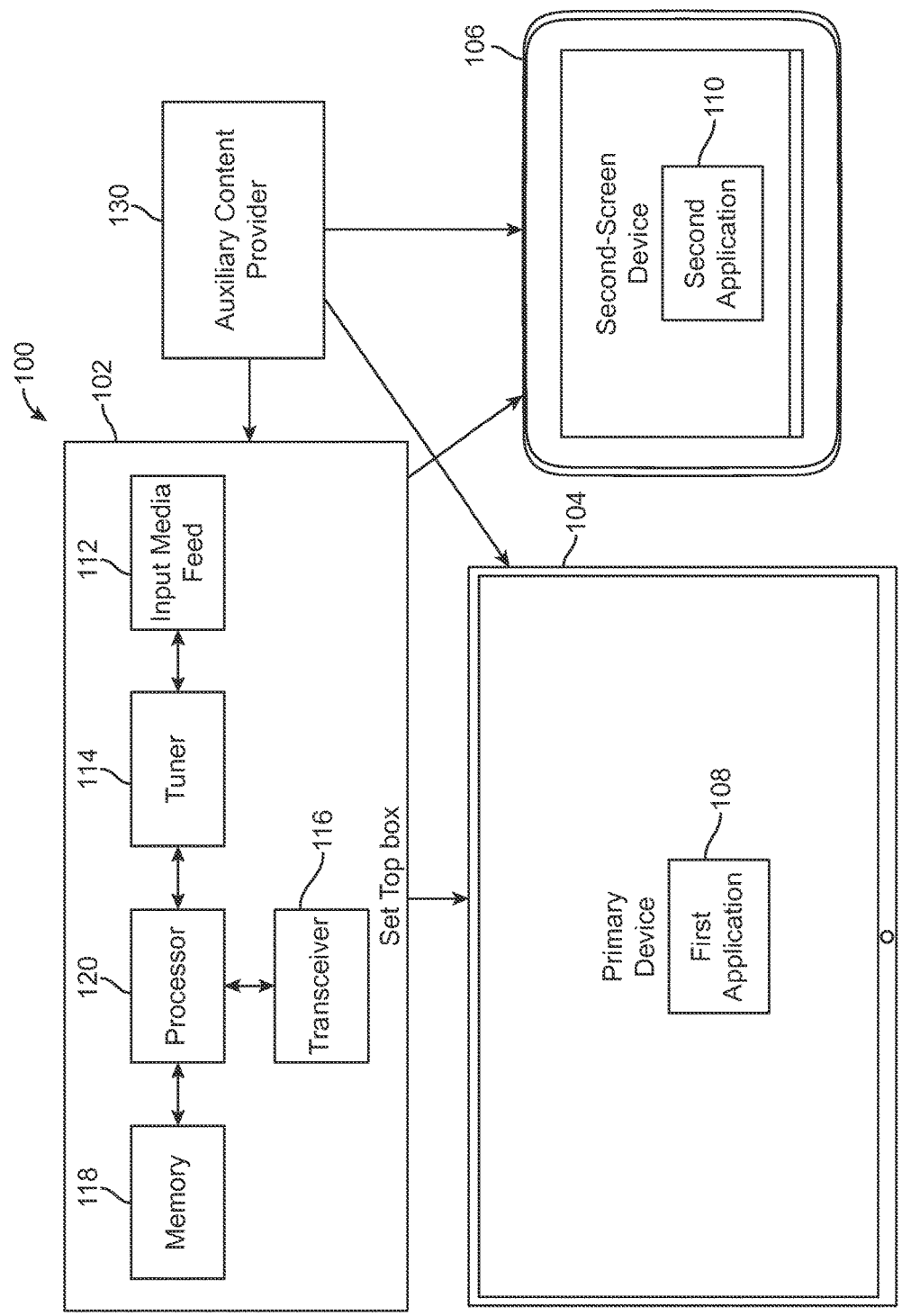
FIG. 1 illustrates a block diagram of a TV bridge system in accordance with an exemplary embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview: Disclosed are systems, methods, and non-transitory computer-readable storage media for providing coordinated graphical user interfaces on a plurality of devices. A set top box can output first media content to a primary display, such as a television. A first application on the primary display can display a video stream associated with the first media content. The set top box can output second media content to a second-screen device, such as a tablet. A second application on the second-screen device can display a video stream associated with the second media content. The video stream of the second media content can be displayed in a video display area on the second-screen device. The video stream of the first media content and the video stream of the second media content can be associated with the same content and can be substantially synchronized. The second application can receive user gestures on a touchscreen of the second-screen device to control the video stream displayed on the primary display. For example, the gestures can include next channel up, next channel down, up peek, down peek, pause, play, fast forward and rewind. More specifically, gestures on the second-screen device can alter the displayed video stream on the primary display and/or can alter the displayed video stream on the second-screen device. As a result, the second-screen device acts as a bridge to affect the displayed video stream on the primary display.

The disclosed technology addresses the need in the art for a user to interact with a second-screen device that is coordinated with the content displayed on a primary display to control a video stream on a primary display and/or a video stream on a second-screen device. More specifically, a user is able to enter commands on a touchscreen of the second-screen device to control the video stream being displayed on the primary device. In addition, the second-screen device displays at least a partial video stream that is associated with the same content and can be substantially synchronized with the video stream that is displayed on the primary display. As a result, there is a visual connection between the primary display and the second-screen device with the entered gestures on the second-screen device being reflected on the primary display and/or the second-screen device. By having the results of the entered command on the second-screen device, the user can look at the second-screen device and know that the entered command was executed without having to go back and forth between the primary display and the second-screen device.

Disclosed are systems, methods, and non-transitory computer-readable storage media for providing coordinated graphical user interfaces on a plurality of devices. An application can display a partial video stream in a video display area on a touchscreen of the second-screen device and display a contextual panel in an active display area on the touchscreen. The contextual panel can include content associated with the partial video stream, with the displayed partial video stream being associated with a video stream being displayed by a primary display with the two displayed video streams being associated with the same content and substantially synchronized. The contextual panel can include messages associated with a social media feed with the displayed messages corresponding to a selected time frame associated with the video stream being displayed on the touchscreen. The contextual panel can include at least one time frame, with each time frame including information associated with a product for sale, with each time frame being associated with the video stream displayed on the touchscreen.

The disclosed technology addresses the need in the art to allow messages from a social media application to tell the story of video stream. More specifically, the rate of messages per time period can tell the story of the video stream. For example, when watching a football game, the number of tweets per minute are typically caused by big plays in the game. In response to each big play, people tweet about the play causing the number of tweets per minute to rise. For each rise that is above a predetermined threshold, a new time frame can be created. For each time frame, a corresponding mini trends panel can be displayed showing the most relevant words or phrases in the messages. Thus, a user can watch clips of the football game based on the rate of tweets per minute. As a result, the user can watch the clip of the football game and can see what the corresponding tweets about the play or plays associated with the clip of the football game. As for the shopping application, viewers are able to shop for products that are offered by television programs and/or programs available via the internet. Not only can the user watch products that aired or they may have missed being aired, but can still have the current price despite the product no longer being displayed on a user's device.

As used herein the term "configured" shall be considered to interchangeably be used to refer to configured and configurable, unless the term "configurable" is explicitly used to distinguish from "configured." As used herein the term "transceiver" can mean a single device comprising a transmitter and receiver or can mean a separate transmitter and a separate receiver. The proper understanding of the term will be apparent to persons of ordinary skill in the art in the context in which the term is used.

Referring to FIG. 1, a block diagram of a TV bridge system in accordance with an exemplary embodiment is illustrated. As shown, the TV bridge system 100 can include a set top box 102, a primary display 104 and a second-screen device 106. Although FIG. 1 only shows one instance of the second-screen device 106, the system 100 can include one or more second-screen devices 106. The set top box 102 can receive media content and can output first media content to the primary display 104 and second media content to the second-screen device 106. The first media content and the second media content can be the same media content or can be different media content. The media content, first media content and second media content second media content can include one or more of a video stream, an audio stream and non-video content.

The primary display 104 can be a television, a smart television, or any other device that is capable of receiving and displaying media content. The primary display 104 can display the video stream and/or non-video content on a screen associated with the primary display 104. The primary display 104 can play the audio stream on one or more speakers associated with the primary display 104. The primary display 104 can include a first application 108 configured to receive and output the first media content. In some embodiments, the first application 108 can decode the received first media content. The first application 108 can be configured to output one or more of the video stream, audio stream and the non-video content. For example, a processor (not shown) in the primary display 104 can run the first application 108 and generate output for the primary display 104.

The second-screen device 106 can be a touchscreen device, such as a tablet, a smart phone, a laptop computer or any other device capable of receiving and displaying media content. The second-screen device 106 can display one or more of the video stream, video streams and non-video content on a touchscreen of the second-screen device 106. The second-screen device 106 can play the audio stream on one or more speakers associated with the second-screen device 106. In some embodiments, the second-screen device 106 can play a different audio stream compared to the audio stream played on the primary display 104. For example, the audio stream played on the second-screen device can be in a different language or can be an audio description, which can also be known as video description or visual description. The second-screen device 106 can receive inputs, such as navigational input, via the touchscreen. The second-screen device 106 can include a second application 110 configured to receive and output the second media content. In some embodiments, the second application 110 can decode the received second media content. The second application 110 can be configured to output one or more of the video stream, audio stream and the non-video content. For example, a processor (not shown) in the second-screen device 106 can run the second application and generate output for the second-screen device 106.

The primary display 104 and second-screen device 106 can be communicatively coupled to the set top box 102. For example, the primary display 104 can be communicatively coupled to the set top box 102 via a cable and/or wirelessly. For example, the second-screen device 106 can be communicatively coupled to the set top box 102 via a cable and/or wirelessly. The cable can be an HDMI cable or any other suitable coupler for providing media content between the two devices. The wireless connection can be Bluetooth, Wi-Fi, or any other suitable wireless communication means for providing media content between the two devices.

As shown, the set top box 102 can include an input media feed 112, a tuner 114, a transceiver 116, memory 118 and a processor 120. Although FIG. 1 only shows one instance of the input media feed 112, tuner 114, transceiver 116, memory 118 and processor 120, the set top box can include one or more input media feeds 112, one or more tuners 114, one or more transceivers 116, one or more memories 118 and/or one or more processors 122. The set top box 102 is shown as a standalone device but can comprise one or more devices and/or can be integral with one or more devices. For example, the set top box 102 can be integrated into a television, such as a smart television. The set top box 102 can be a standalone device, a computer, a smart television or any other device capable of receiving media content and outputting two or more media streams. The input media feed 112 can receive media content from a media source. The media source can be a cable provider, satellite provider, internet provider, cloud provider, website, and/or any other entity that can provide media content to the set top box 102. In some embodiments, the media source can be a product, such as a DVD, or a device, such as a DVD player. The tuner 114 can be tuned to receive media content associated with a specific channel. The transceiver 116 can transmit media content to the primary display 104 and the second-screen device 106, can transmit one or more commands to the primary display 104 and/or second-screen device 106 and/or can receive commands from the second-screen device 106. In some embodiments, a transceiver 116 can transmit the same media content to both the primary display 104 and the second-screen device 106. In some embodiments, one or more transceivers 116 can transmit first media content to the primary display 104 and one or more transceivers 116 can transmit second media content to the second-screen device 106, with the one or more transceivers 116 being the same transceivers or different transceivers. In some embodiments, the one or more transceivers 116 can transmit the first media content and second media content as separate feeds or as a combined feed. The first media content and the second media content can be the same or can be different. The media content received from the input media feed 112 can be stored in memory 118. The processor 120 can control the media input feed 112, tuner 114, transceiver 116 and memory 118. The processor 120 can cause media content to be sent to the primary display 104 and the second-screen device 106, with each of the primary display 104 and the second-screen device 106 displaying the media content. The processor 120 can substantially synchronize the media content displayed on the primary display 104 and the second-screen device 106.

In some embodiments, in addition to receiving and presenting the second media content, the second screen device 106 can be configured to receive content from another source simultaneously. For example, second screen device might display auxiliary content, coming from an auxiliary content provider 130. The auxiliary content can be transmitted to the second screen device 106 directly, or through set top box 102. The auxiliary content can also be transmitted to the primary display 104.

In some embodiments the auxiliary content provider 130 can be a provider of social media, such as FACEBOOK or TWITTER, or could be any other source of content that an application on the second screen device 106 attempts to access and display along with second media content. In some embodiments, explained in more detail below, the auxiliary content from the auxiliary content provider can be a curated collection of social media posts, i.e., TWEETS, or a feed of products offered for sale by a shopping networks.

Referring to FIG. 2A, a block diagram of a primary display and a second-screen device of a TV bridge system in accordance with an exemplary embodiment is illustrated. A screen 202 of a primary display 104 can display the received media content and a touchscreen 204 of a second-screen device 204 can display the received media content. The screen 202 can display a video stream of the first media content and/or non-video content of the first media content. More specifically, the first application can cause the video stream of the first media content and/or the non-video content of the first media content to be displayed on the screen 202. For example, the primary display 104 can be a television displaying the video stream of the first media content on a screen 202 of the television.

The touchscreen 204 can display a video stream of the second media content and/or non-video content of the second media stream. More specifically, the second application can cause the video stream of the second media content and/or the non-video content of the second media content to be displayed on the touchscreen 204. For example, the second-screen device 106 can be a tablet displaying part of the video stream of the second media content in a video display area 206 on the touchscreen 204 and/or can display the non-video content of the second media content in an active display area 208 on the touchscreen 204. As shown, the video display area 206 and the active display area 208 can each be limited in size, for example, less than full screen. The video display area 206 can display the video stream of the second media content and/or can display the non-video content of the media content. The active display area 208 can display non-video content of the second media content. The active display area 208 can display non-video content associated with the second media content or other media content. For example, the non-video content can be information associated with video stream, such as a listing of cast members of a television show being displayed on the primary display 104 and the second-screen device 106. In some embodiments, the other media content can be media content not associated with the second media content. For example, the other media content can be information associated with a television show not being displayed on the primary display 104 and the second-screen device 106. As shown, the video display area 206 can be displayed near the top of the touchscreen 204 and the active display area 208 can be displayed below the active display area 208. In some embodiments, the video display area 206 and active display area 208 can located in other locations on the second-screen device 206, such as switched as shown in FIG. 2B or side by side as shown in FIG. 2C. In some embodiments, the user can adjust the size of the video display area 206 and/or the active display area 208.

The set top box can transmit the first media content to the primary display 104 and can transmit the second media content to the second-screen device 106. More specifically, one or more transceivers 116 can transmit the first media content to the primary display 104 and can transmit the second media content to the second-screen device 106. In some embodiments, one or more transceivers 116 can be dedicated to only transmit first media content to one or more primary displays 204 and one or more transceivers 116 can be dedicated to only transmit second media content to one or more second-screen devices 106. In some embodiments, one or more transceivers 116 can transmit first media content and second media content to one or more primary displays 204 and to one or more second-screen devices 106.

The video stream being displayed on the screen 202 and the video stream being displayed on the touchscreen 204 can be associated with the same content and can be substantially synchronized. Synchronization of the video stream being displayed on the screen 202 and the video stream being displayed on the touchscreen 204 can be accomplished using various known techniques or methodologies. In some embodiments, the processor 120 of the set top box 102 can synchronize the video stream for the primary display 104 and the video stream for the second-screen device 106. In such embodiments, the set top box 102 can act as a master and the primary device 104 and the second-screen device 106 can be slaves in a master-slave relationship. For example, the processor 120 can send, via one or more transceivers 116, the first media content and the second media content at the same time, so that the primary device 204 displays the video stream of the first media content and the second-screen device 106 display the video stream of the second media content at about the same time, so the two video streams are substantially synchronized. In another example, the processor 120 can send, via one or more transceivers 116, time coded segments of the video streams in a coordinated manner. For example, the processor 120 can send, via one or more transceivers 116, a stream of video streams that are time coded in some ways, such as continuous streams (e.g., a broadcast) or fragmented streams (e.g., internet streamed content). In such embodiments, both the primary display 104 and the second-screen device 106 can have their playback position, such as the timecode of a given frame, coordinated such that both the primary display 104 and the second-screen device 106 are displaying the same video frames substantially at the same time. In such embodiments, the set-top box 102 can control the synchronization. In addition, the primary display 104 and the second-screen device 106 are able to maintain the temporal synchronization through normal playback and trick modes (such as skipping for playback at speeds other than normal playback).

In some embodiments, the primary display 104 and the second-screen device 106 can access the content directly from the internet, with the set top box 102 having little to no involvement. In embodiments having set-top box 102 involvement, the set top box 102 can act as a master and the primary device 104 and the second-screen device 106 can be slaves in a master-slave relationship. In embodiments having no set-top box 102 involvement, the primary display 104 can act as a master and the second-screen device 106 can act as a slave. In such arrangements, the media content provided by the primary display 104 to the second-screen device 106 can use simple and low latency encoding over a connection, such as WiFi with the video content can be temporally or spatially down sampled to minimize required bandwidth. As a result, the displayed video content on the second-screen device 106 can be substantially synchronized with the displayed video content on the primary device 104. In other embodiments having no set-top box 102 involvement, the second-screen device 106 can act as a master and the primary display 104 can act as a slave. In yet other embodiments, the functionalities described above with respect to the set-top box 102, can be performed by a different entity, such as cloud computing.

The video display area 206 can serve as a bridge between the primary display 104 and the second-screen device 106. The video display area 206 can be used to enter commands to control the video stream being displayed on the primary display 104. In response to the touchscreen 204 sensing a gesture, the second-screen device 106 can send a command to the set top box 102. In response to receiving the command, the set top box 102 can respond to the received command. For some commands, the set top box 102 can respond by sending a corresponding command to the primary display 104 causing the primary display 104 to execute the command thereby affecting the media content being displayed on the screen 202. For other commands, the set top box 102 can respond by changing and/or altering the media content being sent to the primary display 104 and/or the second-screen device 106. The active display area 208 can be used to enter commands to control the video stream being displayed on the second-screen device 106 as explained below.

Figure 3:
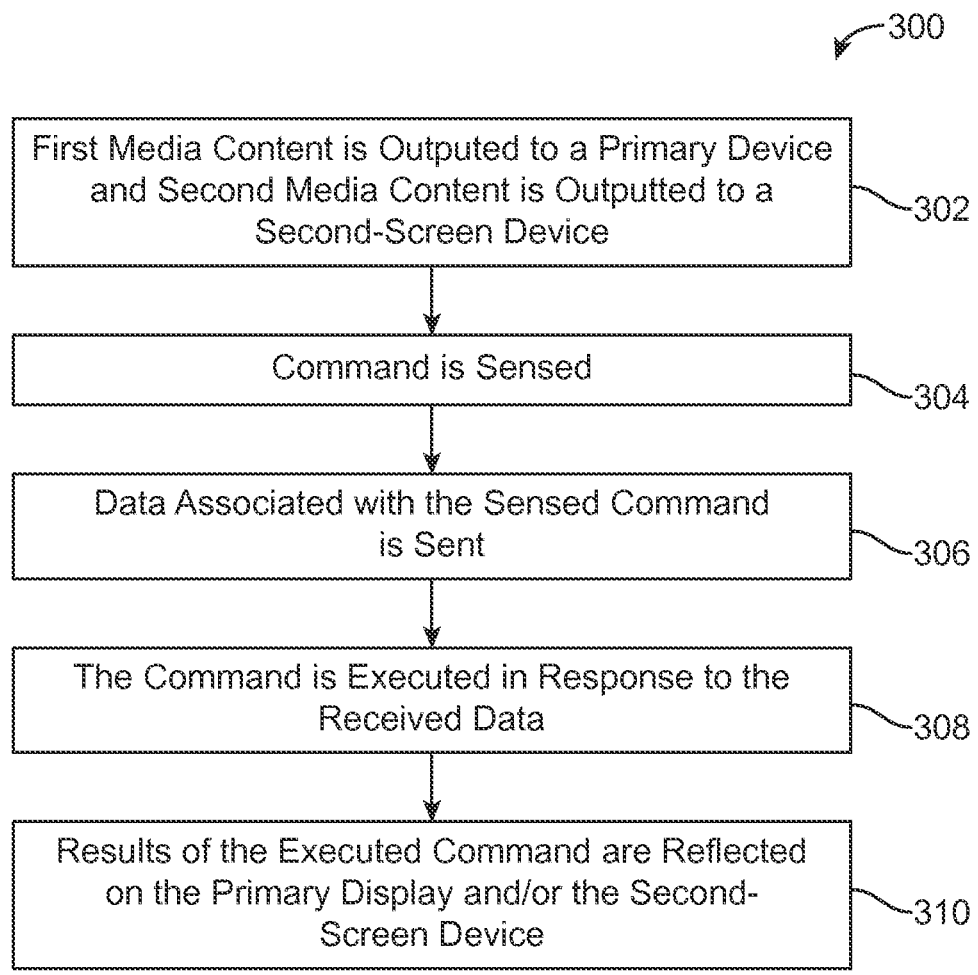
FIG. 3 illustrates a flowchart for executing a command in accordance with an exemplary embodiment.

Referring to FIG. 3, a flowchart for executing a command in accordance with an exemplary embodiment is illustrated. The exemplary method 300 is provided by way of example, as there are a variety of ways to carry out the method. The method 300 described below can be carried out using the configurations illustrated in FIGS. 1 and 2 by way of example, and various elements of these figures are referenced in explaining exemplary method 300. Each block shown in FIG. 3 represents one or more processes, methods or subroutines, carried out in the exemplary method 300. The exemplary method 300 can begin at block 302.

At block 302, first media content is outputted to a primary display and second media content is outputted to a second-screen device. For example, the set top box 102 outputs, via one or more transceivers 116, first media content to the primary display 104 and second media content to the second-screen device 106. A first application 108 on the primary device 104 causes a video stream associated with the received first media content to be displayed on the screen 202 of the primary device 104. A second application 110 on the second-screen device 106 causes a video stream associated with the received second media content to be displayed on the touchscreen 204 of the second-screen device 106. After outputting the first media content and the second media content, the method 300 can proceed to block 304.

Referring to FIG. 4, screenshots of a screen and touchscreen in accordance with an exemplary embodiment are illustrated. As shown, the video stream associated with the received first media content is displayed on the screen 202 of the primary device 104 and the video stream associated with the second media content is displayed on the touchscreen 204 of the second-screen device 106. More specifically, the second application 110 displays part of the video stream associated with the second media content in a video display area 206. The first video stream 214 displayed on the screen 202 and the partial video stream 216 displayed on the touchscreen 204 can be associated with the same video content and can be substantially synchronized. As shown, the video stream displayed on the primary display 104 and the partial video stream displayed on the second-screen device 106 are associated with the same video content and are substantially synchronized. More specifically, the displayed video streams are for a soccer game with the primary device 104 displaying the soccer game full screen on the display 202 and the second-screen device 106 displaying part of the soccer game, for example, the bottom part, in the video display area 206 of the touchscreen 204. As shown, icons for launching applications can be displayed in the active display area 208 of the touchscreen 204.

Returning to FIG. 3, at block 304, a command is sensed. For example, the touchscreen 204 can sense one or more gestures for a command entered by a user. In some embodiments, the touchscreen 204 can sense one or more gestures entered by the user in the video display area 206 and/or the active display area 208. In some embodiments, the command can be sensed when the touchscreen 204 is displaying the video stream in full screen mode. The commands can include, but are not limited to, a peek command (such as an up peek command or a down peek command), a change channel command (such as channel up command or a channel down command), a pause command, a resume command, an adjustment command (such as a fast forward command or a rewind command), full screen command or tear to unlock command.

After a gesture for a command is sensed, the method 300 can proceed to block 306.

At block 306, data associated with the sensed command is sent. For example, the second-screen device 106 can send, via a transceiver, data associated with a partial or full command to the set top box 102. In some embodiments, the data associated with the sensed command can be the touch data. The touch data can be the data associated with the gesture. For example, the data associated with the command gesture can include one or more of the following: coordinates of the original touch, coordinates of the last touch, the time from the original touch to the last touch, and whether the touch is maintained or released. The touch data can be sent in one or more messages. The data associated with the sensed command can include time data, such as how long the gesture was made. After the data associated with the sensed command is sent, the method 300 can proceed to block 308.

At block 308, the command is executed in response to the received data associated with the sensed command. For example, the processor 120 of the set top box 102 can receive, via a transceiver 116, the data associated with the sensed command and can execute the sensed command. In response to receiving the data associated with the sensed command, the processor 120 can determine the sensed command based on the received data and can execute the sensed command. After executing the command in response to the received data, the method 300 can proceed to block 310.

At block 310, the results of the executed command can be reflected on the primary device and/or on the second-screen device. For example, the processor 120 can change the first media content being sent to the primary display 104 and/or the second media content being sent to the second-screen device 106. Below, each of the commands are described in further detail and one or more of the blocks of method 300 are described with more detail.

Regarding a peek up command, the sensed gesture at block 304 can comprise an upward gesture starting in the video display area 206, continuing vertically upward in the video display area 206 and maintaining the touch in the video display area 206 as shown in FIG. 5. For a peek down command, the sensed gesture at block 304 can comprise a downward gesture starting in the video display area 206, continuing vertically downward in the video display area 206 and maintaining the touch in the video display area 206. As a result of the sensed gesture, the data associated with the sensed gesture can be sent at block 306. In response to the receiving the data associated with the sensed command, the set top box 102 can execute the command at block 308. For a peek up command or peek down command, the processor 120 of the set top box 102 can execute the command by causing a tuner 114 to tune to the desired channel, such as the next available channel up from the current tuned channel for a peek up command or the next available channel down for a peek down command from the current tuned channel. In some embodiments, for a peek down command, the tuner 114 can tune to the immediate previously viewed channel. After tuning to the desired channel, the processor 120 can send the media content associated with the new tuned channel to the primary display 104 for display and to the second-screen device 106 for display at block 308. More specifically, the processor 120 can send the media content for the current channel and the media content for the desired channel, such as the next channel up from the current channel, the next channel down from the current channel or the immediate previously viewed channel. The results of the executed peek up or peek down command can be reflected on the primary device 204 and/or on the second-screen device 106 at block 208.

For a peek up command, the video stream displayed on top can be the tuned channel and the video stream displayed on bottom can be the newly tuned channel and for a peek down command, the video stream displayed on top can be the newly tuned channel and the video stream displayed on bottom can the tuned channel. In other embodiments, the two video streams can be displayed in other manners, for example, vice versa or side by side. The percentage of each video stream being displayed can be in accordance with the distance from the original touch to the last touch. In response to the user moving the user's finger in the opposite direction, the percentage of each video stream being displayed can be reflected accordingly. For example, the two video streams can be scrolled up and down with the percentages of each changing accordingly. In some embodiments, a peek distance threshold can be used to set the percentage of each displayed video stream at fifty-fifty (50%/50%). For example, the processor 120 can compare the distance traveled from the first touch to the last sensed touch to a peek distance threshold and in the event the distance traveled is not less than the peek distance threshold, the percentage of each displayed video stream can be set to fifty-fifty (50%/50%). For distances below the threshold, the percentage can be in accordance with the traveled distance. For example, if the distanced traveled is ten percent (10%) of the peek distance threshold, the percentages can be ten percent and ninety percent (10%/90%), if the distanced traveled is twenty percent (20%) of the peek distance threshold, the percentages can be twenty percent and eighty percent (20%/80%), etc. The percentages can change in response to the user moving the user's finger up or down with the percentages corresponding to the distance traveled from the original touch.

In response to the user releasing the user's touch on the touchscreen 204 prior to reaching the change channel distance threshold (discussed below), the peek up command or peek down command can end. As a result of the peek up or peek down command ending, the results can be reflected on the primary device 204 and/or on the second-screen device 106 at block 208 with the percentage of the video stream of the media content associated with the tuned channel increasing and the video steam of the media content associated with the newly tuned channel decreasing until the video stream associated with the tuned channel reaches one hundred percent (100%) of the screen 202 of the primary display 104 and of the video display are 208 of the second-screen device 106. In some embodiments, the percentages of the displayed video streams can change quicker in response to an end peek up or end peek down command compared to how the percentages of the displayed video streams change in response to a peek up command or peek down command. By changing the percentages of the displayed video streams quickly, the video stream of the media content associated with the tuned channel can appear to slam or push the video stream of the media content associated with the newly tuned channel.

Referring to FIG. 6, screenshots of the primary device and the second-screen device for a peek command that is less than 50%/50% in accordance with an exemplary embodiment are illustrated. As shown, the primary device 204 and the second-screen device 106 display the video stream associated with the current channel and the video stream associated with the newly tuned channel. For example, for a peek up command, the video stream displayed on top is the video stream of the tuned channel and the video stream displayed below is the video stream of the newly tuned channel and for a peek down command the video streams can be the opposite. More specifically, the video stream displayed on top is for a soccer game and the video stream on bottom is for the Finding Nemo movie. The displayed streams are for a distance that is below the peek distance threshold.

Referring to FIG. 7, screenshots of the primary device and the second-screen device for a peek command that is 50%/50% in accordance with an exemplary embodiment are illustrated. As shown, the primary device 204 and the second-screen device 106 display the video stream associated with the current channel and the video stream associated with the newly tuned channel. For example, for a peek up command, the video stream displayed on top is the video stream of the tuned channel and the video stream displayed below is the video stream of the newly tuned channel and for a peek down command the video streams can be the opposite. More specifically, the video stream displayed on top is for a soccer game and the video stream on bottom is for the Finding Nemo movie. The displayed streams are for a distance that is not less than the peek distance threshold.

Regarding a channel up command, the sensed gesture at block 304 can comprise an upward gesture starting in the video display area 206, continuing vertically upward in the video display area 206 and being released in the video display area 206 as shown in FIG. 8. For a channel down command, the sensed gesture at block 304 can comprise a downward gesture starting in the video display area 206, continuing vertically downward in the video display area 206 and being released in the video display area 206. As a result of the sensed gesture, the data associated with the sensed gesture can be sent at block 306. In response to the receiving the data, the set top box 102 can execute the command at block 308. For a channel up command or channel down command, the processor 120 of the set top box 102 can execute the partial or full command by causing a tuner 114 to tune to the desired channel, such as the next available channel up from the current tuned channel for a channel up command or the next available channel down for a channel down command from the current tuned channel and can send the media content associated with the new tuned channel to the primary display 104 for display and to the second-screen device 106 for display at block 308. In some embodiments, for a channel down command, the tuner 114 can tune to the immediate previously viewed channel. The processor 120 can send the media content for the current channel and the media content for the desired channel, the next channel up from the current channel, the next channel down from the current channel or the immediate previously viewed channel. The results of the executed channel up or peek channel command can be reflected on the primary device 204 and/or on the second-screen device 106 at block 208.

For a channel up command, the video stream displayed on top can be the tuned channel and the video stream displayed on bottom can be the newly tuned channel with the video stream of the newly tuned channel moving up until it replaces the tuned or previously tuned channel. For a channel down command, the video stream displayed on the bottom can be the tuned channel and video stream displayed on top can be the newly tuned channel with the video stream of the newly tuned channel moving down until it replaces the tuned or previously tuned channel. In other embodiments, the two video streams can be displayed in other manners, for example, vice versa or side by side.

In some embodiments, a change channel distance threshold can be used. The change channel distance threshold can be different from the peek distance threshold. For example, the processor 120 can compare the distance traveled from the first touch to the last sensed touch with the change channel distance threshold. In the event the distance traveled is less than the change channel distance threshold, the sensed gesture percentage of each displayed video stream can be in accordance with the traveled distance. This can be the same as for the peak commands. For example, if the distanced traveled is ten percent (10%) of the change channel distance threshold, the percentages can be ten percent and ninety percent (10%/90%), if the distanced traveled is twenty percent (20%) of the change channel distance threshold, the percentages can be twenty percent and eighty percent (20%/80%), etc. However, in the event the traveled distance is not less than the change channel distance threshold and the user releases the user's touch on the touchscreen 204, the video stream from the newly tuned channel can continue to increase compared to the tuned channel or previously tuned channel until the video stream of the newly tuned channel is one hundred percent (100%) of the available display area of the screen 202 of the primary display 104 and (100%) of the available display area of the video display area 206 of the second-screen device 106.

Figure 9:
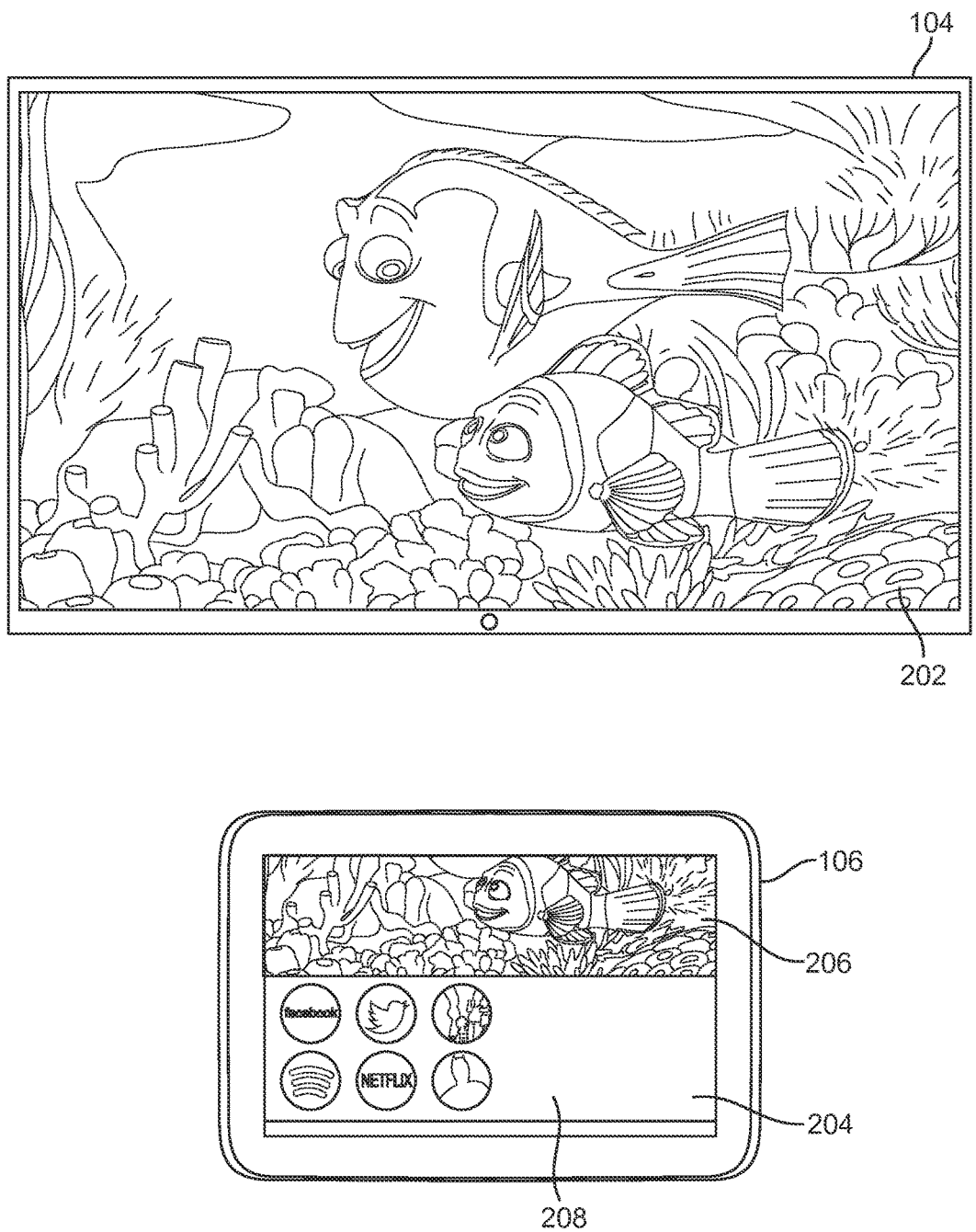
FIG. 9 illustrates screenshots of the primary device displaying a video stream and the second-screen device displaying video streams for a newly tuned channel in accordance with an exemplary embodiment.

Referring to FIGS. 5-9, screenshots of the primary device and the second-screen device displaying video streams with different percentages of video streams for a currently tuned channel and a newly tuned channel in accordance with exemplary embodiments are illustrated. As shown in FIG. 5, a user is watching a currently tuned channel and enters an up channel command in the video display area 206. As shown in FIGS. 5 and 6, the percentages of the newly tuned channel increases with the video stream of the tuned channel decreasing in a similar manner as described above with respect to FIGS. 5 and 6 and the peek command. As shown in FIG. 8, the up channel command is completed. Once the change channel command is completed: the user releasing their touch from the touchscreen 204, the percentage of the display of the newly tuned channel can continue to increase until the video stream of the newly tuned channel is one hundred percent (100%) of the available display area of the screen 202 of the primary display 104 and (100%) of the available display area of the video display area 206 of the second-screen device 106 as shown in FIG. 9.

Figure 10:
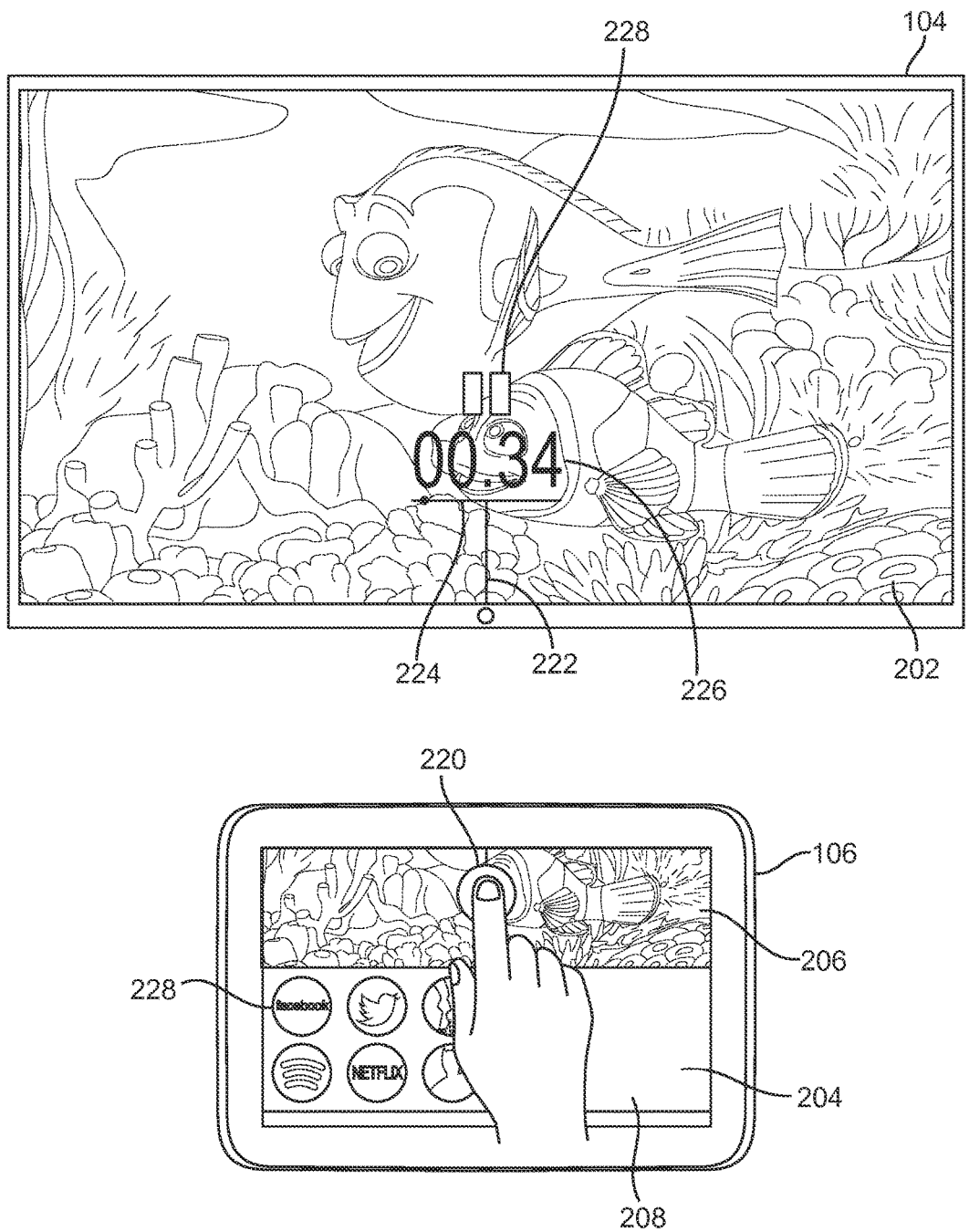
FIG. 10 illustrates screenshots of the primary device and the second-screen device for a pause command gesture in accordance with an exemplary embodiment.

Regarding a pause command, the sensed gesture at block 304 can comprise a tap in the video display area 206 of the second-screen device 106 as shown in FIG. 10. As a result of the sensed gesture, the data associated with the sensed gesture can be sent at block 306. For example, the data associated with the sensed gesture can include the location or coordinates of the tap. In response to the receiving the sensed gesture, the set top box 102 can execute the pause command at block 308. For example, the processor 120 can stop sending the media content to the primary display 104 and the second-screen device. The results of the executed pause command can be reflected on the primary device 204 and/or on the second-screen device 106 at block 310. For example, the last displayed frame can be maintained until another gesture is sensed. FIG. 10 shows the executed pause command with a pause icon 228 displayed on the primary display 104. A touch indicator 220 can be displayed on the second-screen device 106 where the user has touched the touchscreen 204. A line 222 can be shown on the touch indicator 220 on the second-screen device 106 and extending to the display 202 on the primary device 104. The primary device 104 can display a time scale 224 and a time stamp 226 showing where the pause command occurred with respect to the full video.

Figure 11:
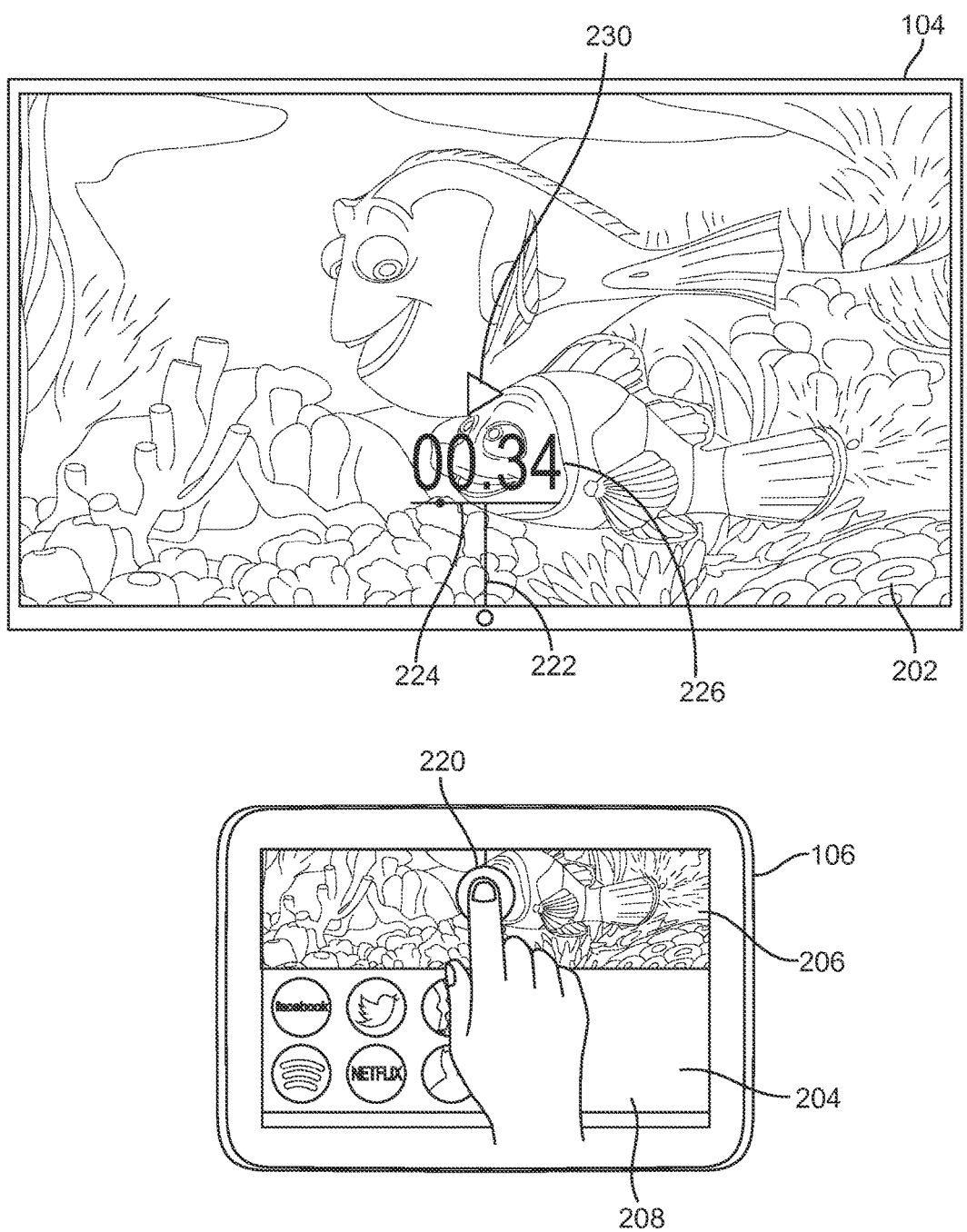
FIG. 11 illustrates screenshots of the primary device and the second-screen device for a resume command gesture in accordance with an exemplary embodiment.

Regarding a resume command, the sensed gesture at block 304 can comprise a tap in the video display area 206 of the second-screen device 106 as shown in FIG. 11. The tap would be a second tap to the pause command. As a result of the sensed gesture, the data associated with the sensed gesture can be sent at block 306. For example, the data associated with the sensed gesture can include the location or coordinates of the tap. In response to the receiving the sensed gesture, the set top box 102 can execute the resume command at block 308. For example, the processor 120 can resume sending the media content to the primary display 104 and the second-screen device. The results of the executed channel up or peek channel command can be reflected on the primary device 204 and/or on the second-screen device 106 at block 310. For example, the video streams associated with the received media streams can be displayed on the screen 202 of the primary device 204 and/or on the touchscreen 204 of the second-screen device 106. FIG. 11 shows the executed resume command with a resume icon 230 displayed on the primary display 104. The primary device 104 can display a time scale 224 and a time stamp 226 showing where the resume command occurred with respect to the full video.

Figure 12:
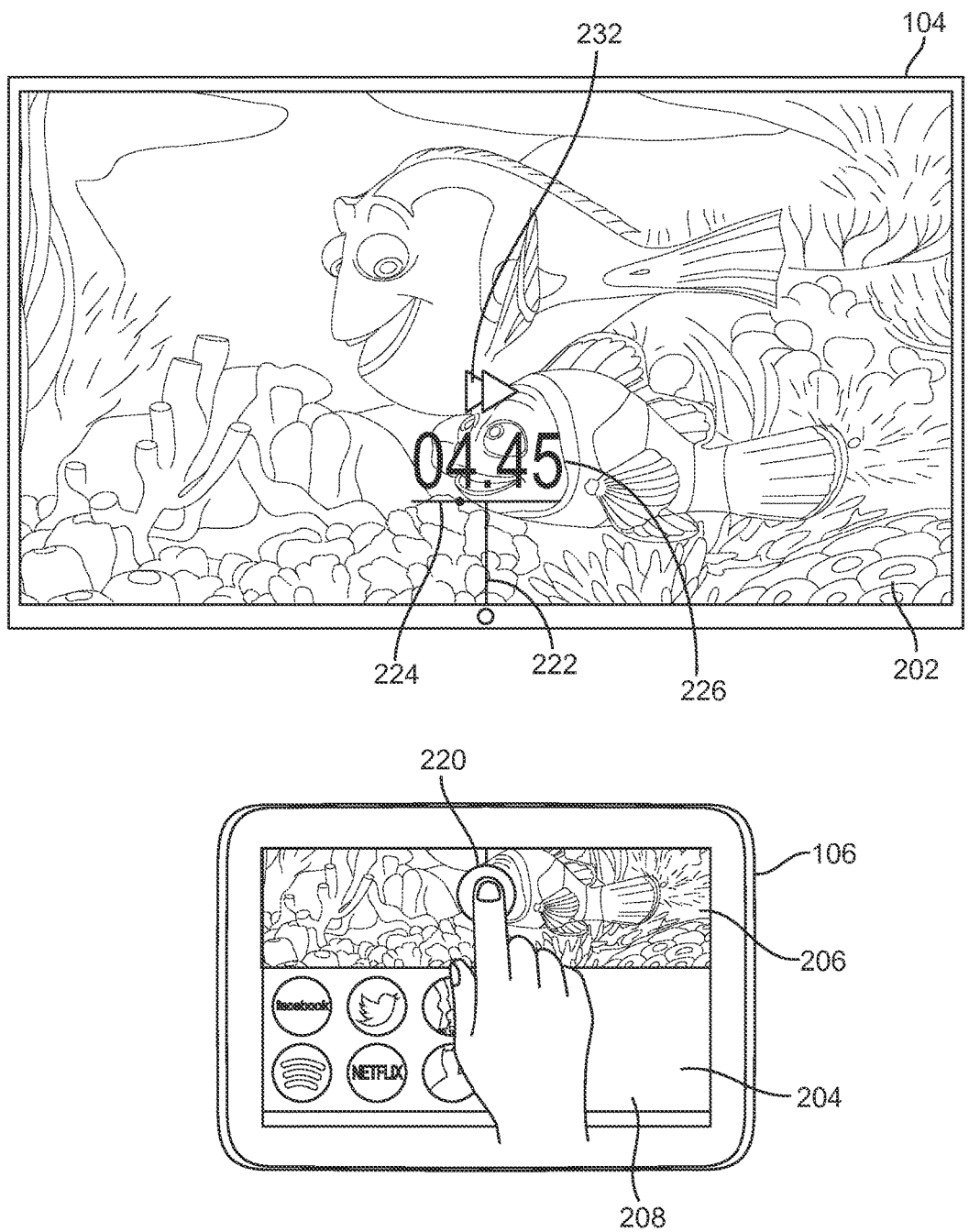
FIG. 12 illustrates screenshots of the primary device and the second-screen device for a fast forward command gesture in accordance with an exemplary embodiment.
Figure 13:
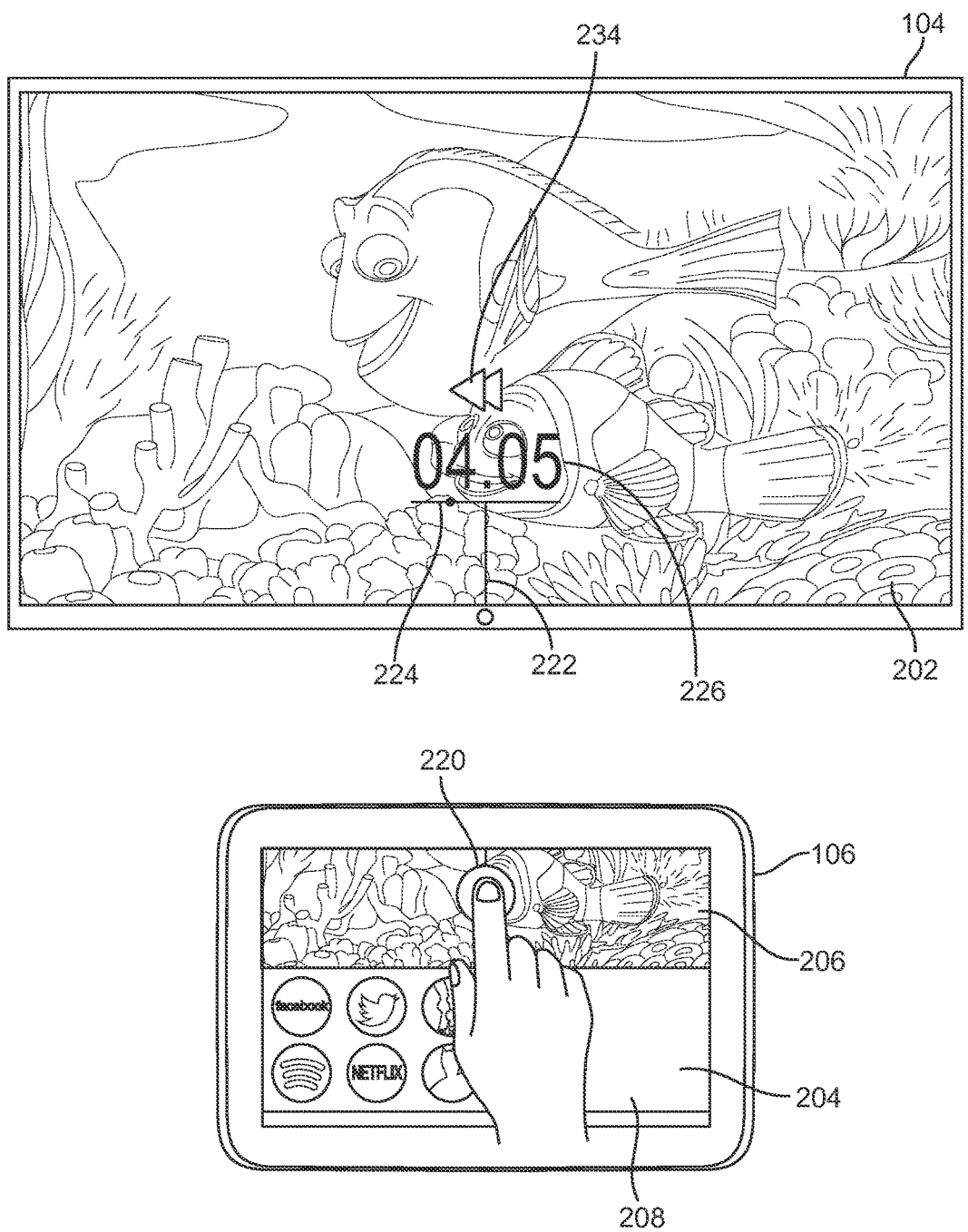
FIG. 13 illustrates screenshots of the primary device and the second-screen device for a rewind command gesture in accordance with an exemplary embodiment.

Regarding adjustment commands, such as a fast forward command or a rewind command, the processor 120 can execute the command by adjusting the video stream of the first media content and the video stream second media content being displayed by a time factor for as long as the user's touch on the screen is maintained. A fast forward command can be a touch in the video display area 206, continuing laterally to the right for a predetermined distance of the video display area 206 and being maintained in the video display area 206 as shown in FIG. 12. A rewind command can be a touch in the video display area 206, continuing laterally to the left for a predetermined distance of the video display area 206 and being maintained in the video display area 206 as shown in FIG. 13. The distance between the original touch and the end touch can adjust the video streams of the media content by a time factor accordingly. For example, a distance of ten percent (10%) of the screen width can result in a 1× fast forward, a distance of twenty percent (20%) of the screen width can result in a 2× fast forward, etc. The adjustment command can be sensed in block 304. As a result of the sensed gesture, the data associated with the sensed gesture can be sent at block 306. In response to the receiving the sensed gesture, the set top box 102 can execute the command at block 308. For example, the processor 120 can adjust the displayed video streams of the media content in accordance with the time factor and send the adjusted video streams of the media content to the primary display 104 for display and to the second-screen device 106 for display at block 308. The media content can be sent in various ways as discussed in further detail below. The results of the executed adjustment command can be reflected on the primary device 204 and/or on the second-screen device 106 at block 208. FIG. 12 shows the executed fast forward command with a fast forward icon 232 displayed on the primary display 104. The primary device 104 can display a time scale 224 and a time stamp 226 showing where the location of the video content is with respect to the full video. FIG. 13 shows the executed rewind command with a rewind icon 234 displayed on the primary display 104. The primary device 104 can display a time scale 224 and a time stamp 226 showing where the location of the video content is with respect to the full video.

In the event the received command is a fast forward command and the memory 118 does not contain stored media content, then the transmitted media content is not incremented by the time factor. In the event, the time factor is not beyond the stored media content in memory 118, the transmitted media content can be incremented by the time factor providing the time factor is not beyond the stored media content. In the event, the time factor is beyond the stored media content in memory 118, then the transmitted media content can be the media content received from the input media feed 112.

In the event the received command is a rewind command and the memory 128 does not contain stored media content, then the transmitted media content is not changed. In the event, the time factor is not beyond the stored media content in memory 128, the transmitted media content can be decremented by the time factor providing the time factor is not beyond the stored media content. In the event, the time factor is beyond the stored media content in memory 128, then the transmitted media content can be the media content stored in the memory 128 starting at the beginning of the stored media content.

Regarding a full screen command, the processor 120 can execute the command by causing the displaying the video stream on the second-screen device 106 full screen, for example, not only in the video display area 206. For example, a full screen command can be a touch in the video display area 206, continuing to the vertically downward beyond the video display area 206 and ending in the active display area 208. The full screen command can be sensed in block 304 as shown in FIG. 14. As a result of the sensed gesture, the data associated with the sensed gesture can be sent at block 306. In response to the receiving the sensed gesture, the set top box 102 can execute the command at block 308. For example, the processor 120 can cause the display of the displayed video stream of the media content on the second-screen device 106 to be full screen at block 308. The media content can be sent in various ways as discussed in further detail below. The results of the executed adjustment command can be reflected on the second-screen device 106 at block 310.

Referring to FIG. 15, screenshots of the primary device displaying a video stream and the second-screen device displaying a video stream in full screen in accordance with an exemplary embodiment are illustrated. As shown, the video stream associated with the media content displayed on the screen 202 of the primary display 104 is shown full screen and the video stream associated with the media content displayed on the touchscreen 204 of the second-device device 310 is shown full screen.

Regarding the tear to unlock command, the processor 120 can execute the command by no longer requiring the video stream of the first media content and the video stream of the second media content to be substantially synchronized. A tear to unlock gesture command can be a touch to the left of the video display area 206, continuing to the right into the video display area 206 and ending in the video display area 206 as shown in FIG. 16. The tear to unlock command can be sensed in block 304. As a result of the sensed gesture, the data associated with the sensed gesture can be sent at block 306. In response to the receiving the sensed gesture, the set top box 102 can execute the command at block 308. For example, the processor 120 can cause the display of the displayed video stream of the media content on the second-screen device 106 to be full screen at block 310 as shown in FIG. 8. As a result of the tear to unlock command being executed, the video stream of the media content displayed on the on the screen 202 of the primary display 104 is displayed full screen and the video stream associated with the media content displayed on the touchscreen 204 of the second-device device 208 is displayed full screen with the video streams no longer being required to synchronized.

The above described method 300 and commands are directed to embodiments where the second-screen device 106 is a "dumb" device which sends touch data. In some embodiments, the second screen device 208 can be a "smart" device and can interpret the sensed commands and send the "sensed command" to the set top box 102 which can execute the sensed command. For example, the second application 110 on the second-screen device 106 can sense a pause command on the touchscreen 204 and can send the sensed command to the set top box 102 which can execute the pause command. In some embodiments, the set top box 102 can receive the touch data or a sensed command and can execute the command by sending commands to the primary display 104 and/or second-screen device 106 with the first application 108 and/or the second application 110 executing the commands. In some embodiments, the second application 110 can determine the sensed command and can execute the command on the second-screen device 106. In such embodiments, the second-screen device 106 can send the touch data or the sensed command to the set top box 102 which can execute the command and have the results displayed on the primary display 104. Regardless of how the commands are executed, the user is able to enter commands via gestures on the second-screen device 106 with the set top box 102 causing the effects of the command on the primary display 104.

The processor 120 can send, via one or more transceivers 116, media content to the primary display 104 and the second-screen device 106. This can be done in various ways. In some embodiments, the processor 120 can send the same media content to both the primary display 104 and the second-screen device 106. In some embodiments, first media content can be sent to the primary display 104 and second media content can be sent to the second-screen device 106. In such embodiments, the first media content can comprise one or more video streams and one or more associated audio streams and the second media content can comprise one or more video streams, one or more associated audio streams and non-video content. The non-video content can include information associated with the one or more video stream. In other embodiments, the media content sent to the primary display 104 and/or the second-screen device 106 can include a single video stream comprising the video stream associated with the tuned channel and the video stream associated with a newly tuned channel in accordance with the command. For example, for a peek command, the single video stream can have ninety percent (90%) of the tuned channel and ten percent (10%) of the newly tuned channel with the percentage of each changing in accordance with the sensed gesture. In yet other embodiments, the media content can contain the video stream associated with the tuned channel and the video stream associated with the newly tuned channel along with instructions on how to display the video streams in accordance with the sensed gesture. For example, the media content can comprise both video streams with instructions for each application, the first application 108 and the second application 110, to display ninety percent (90%) of the tuned channel and ten percent (10%) of the newly tuned channel with the percentage of each changing in accordance with the sensed gesture. In yet another embodiment, one or more transceivers 116 can send media content comprising a video stream associated with the tuned channel, one or more transceivers can send media content comprising a video stream associated with the newly tuned channel, along with instructions on how to display the video streams in accordance with the sensed gesture. Regardless of how the media content is sent to the primary display 104 and the second-screen device 106, the primary display 104 and the second-screen device 106 display the video stream or video streams in accordance with the sensed gesture.

In some embodiments, graphic items, such as a touch indicator 220, line 222, time scale 224, time stamp 226 and an icon 228, 230, 232, 234, are displayed on the second-screen device 106 for an executed command that affects the location of the video content being displayed. These commands can include pause, resume, fast forward and rewind commands. In such embodiments, more, less and/or different graphic items can be displayed. For example, the time stamp 226 may not be displayed on the primary device 104 in response to an executed command. In other embodiments, one or more graphic items can be displayed for other executed commands, such as a peek command.

Figure 17:
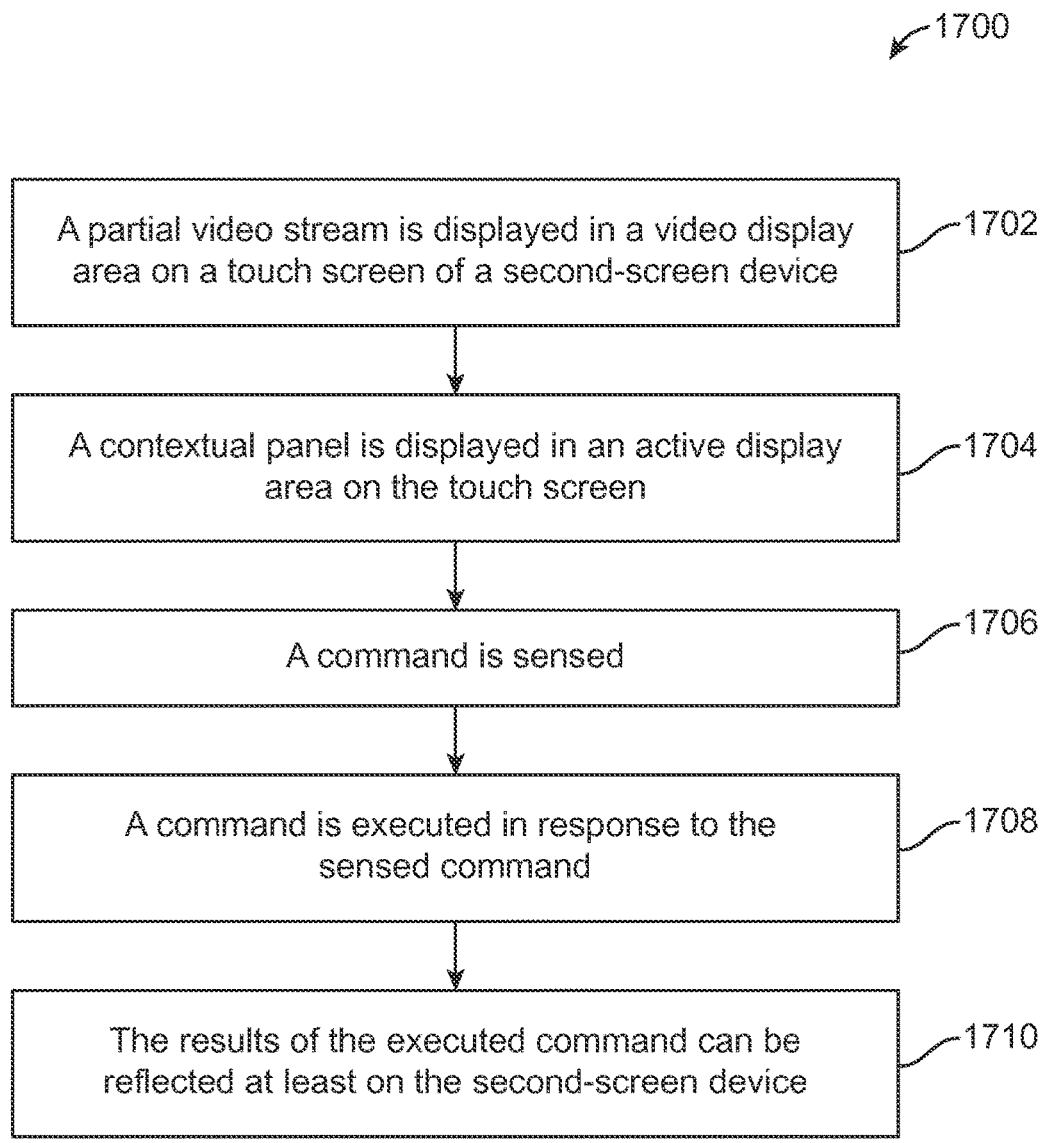
FIG. 17 illustrates a flowchart for displaying a contextual panel in a graphical user interface on a second-screen device in accordance with an exemplary embodiment.

Referring to FIG. 17, a flowchart for displaying a contextual panel is a graphical user interface on a second-screen device in accordance with an exemplary embodiment. The exemplary method 1700 is provided by way of example, as there are a variety of ways to carry out the method. The method 1700 described below can be carried out using the configurations illustrated in FIGS. 1 and 2 by way of example, and various elements of these figures are referenced in explaining exemplary method 1700. Each block shown in FIG. 17 represents one or more processes, methods or subroutines, carried out in the exemplary method 1700. The exemplary method 1700 can begin at block 1702.

At block 1702, a partial video stream is displayed in a video display area on a touchscreen of a second-screen device. For example, the second application 110 can display a partial video stream in the video display area 206 on the second-screen device 106. After displaying the partial video stream, the method 1700 can proceed to block 1704.

Figure 18:
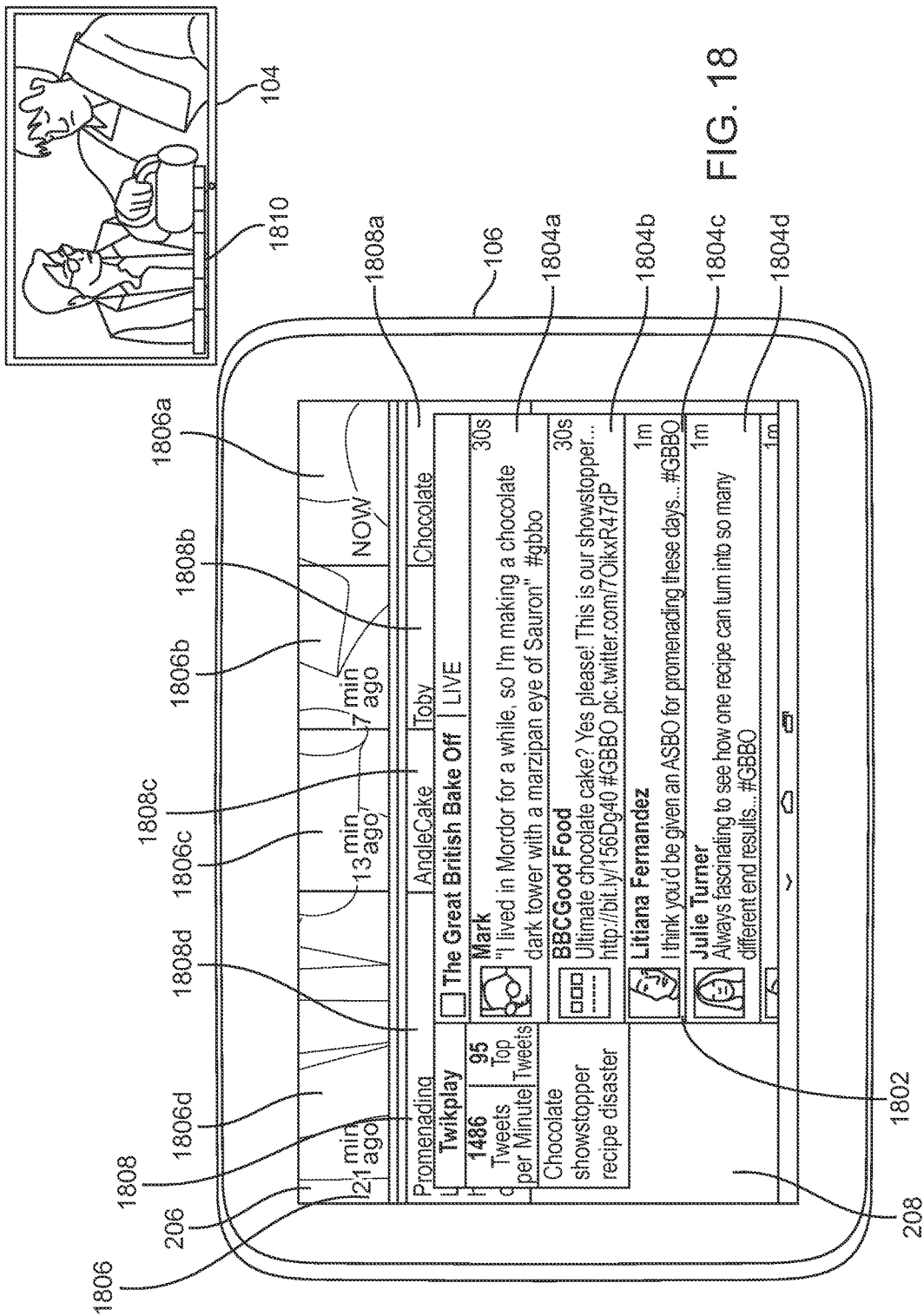
FIG. 18 illustrates screenshots of the primary device and the second-screen device for a social media application in accordance with an exemplary embodiment.
Figure 19:
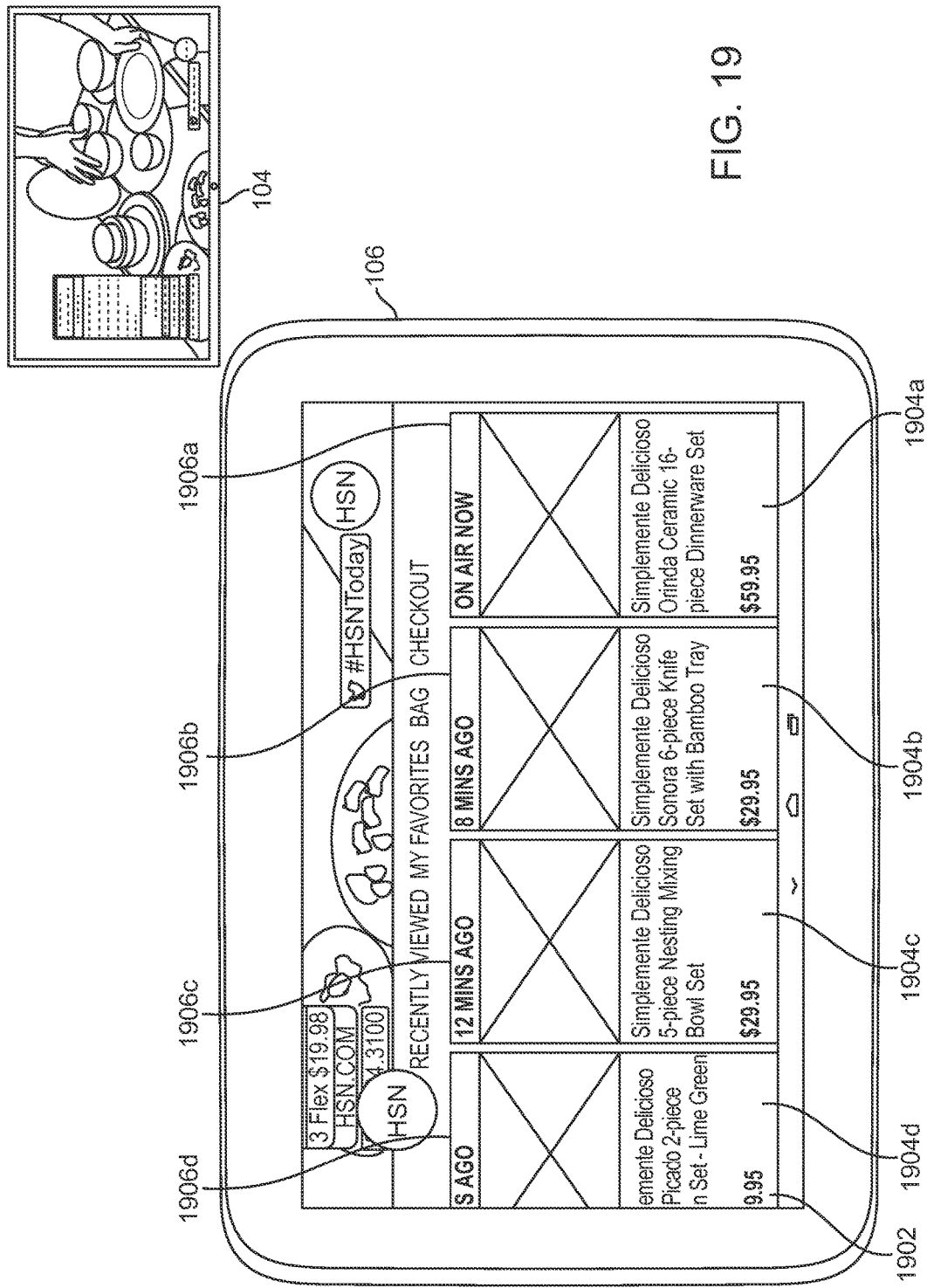
FIG. 19 illustrates screenshots of the primary device and the second-screen device for a shopping application in accordance with an exemplary embodiment.
Figure 20A:
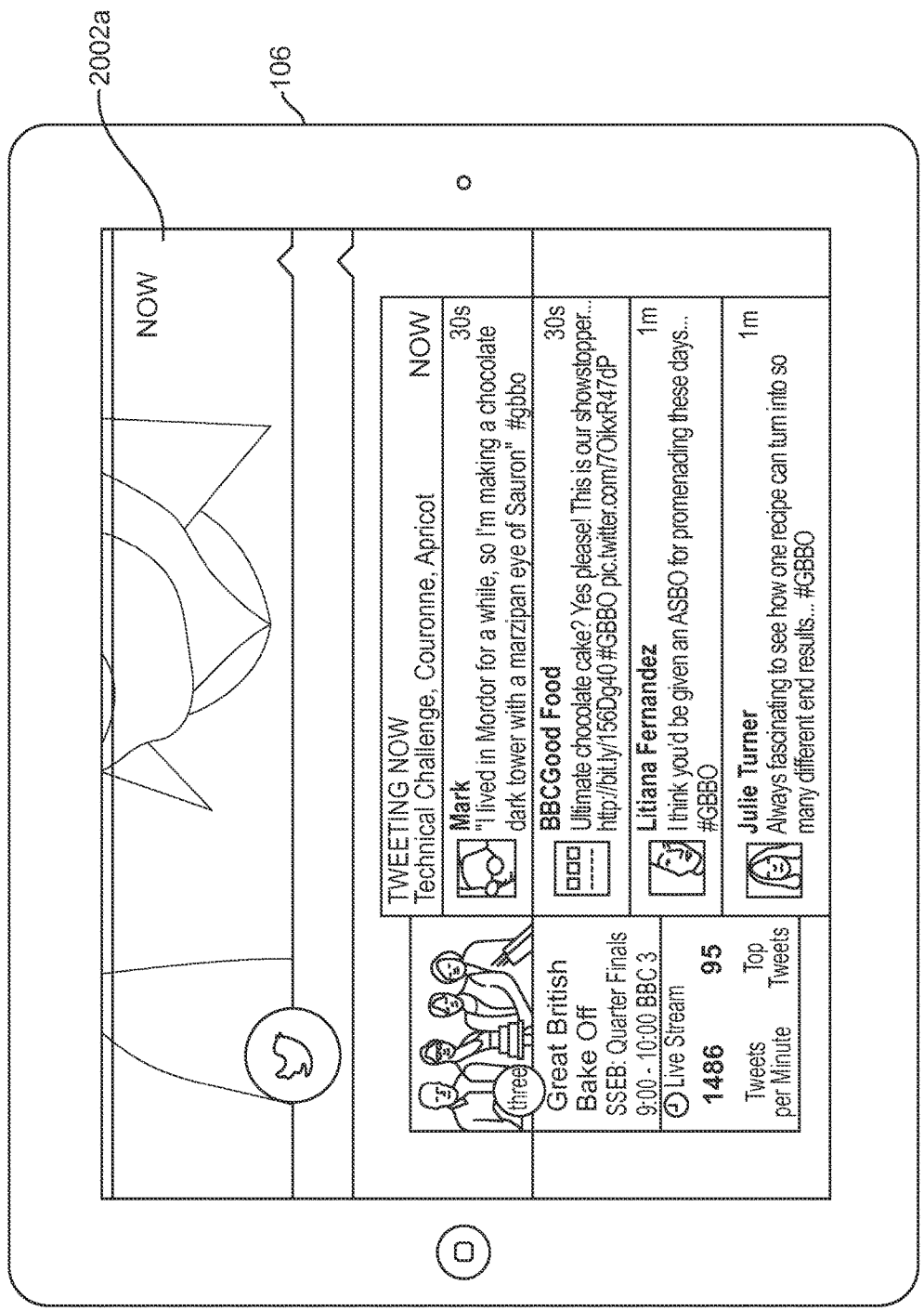
FIG. 20A illustrates a screenshot of the second-screen device for the social media application having one time frame in accordance with an exemplary embodiment.
Figure 20B:
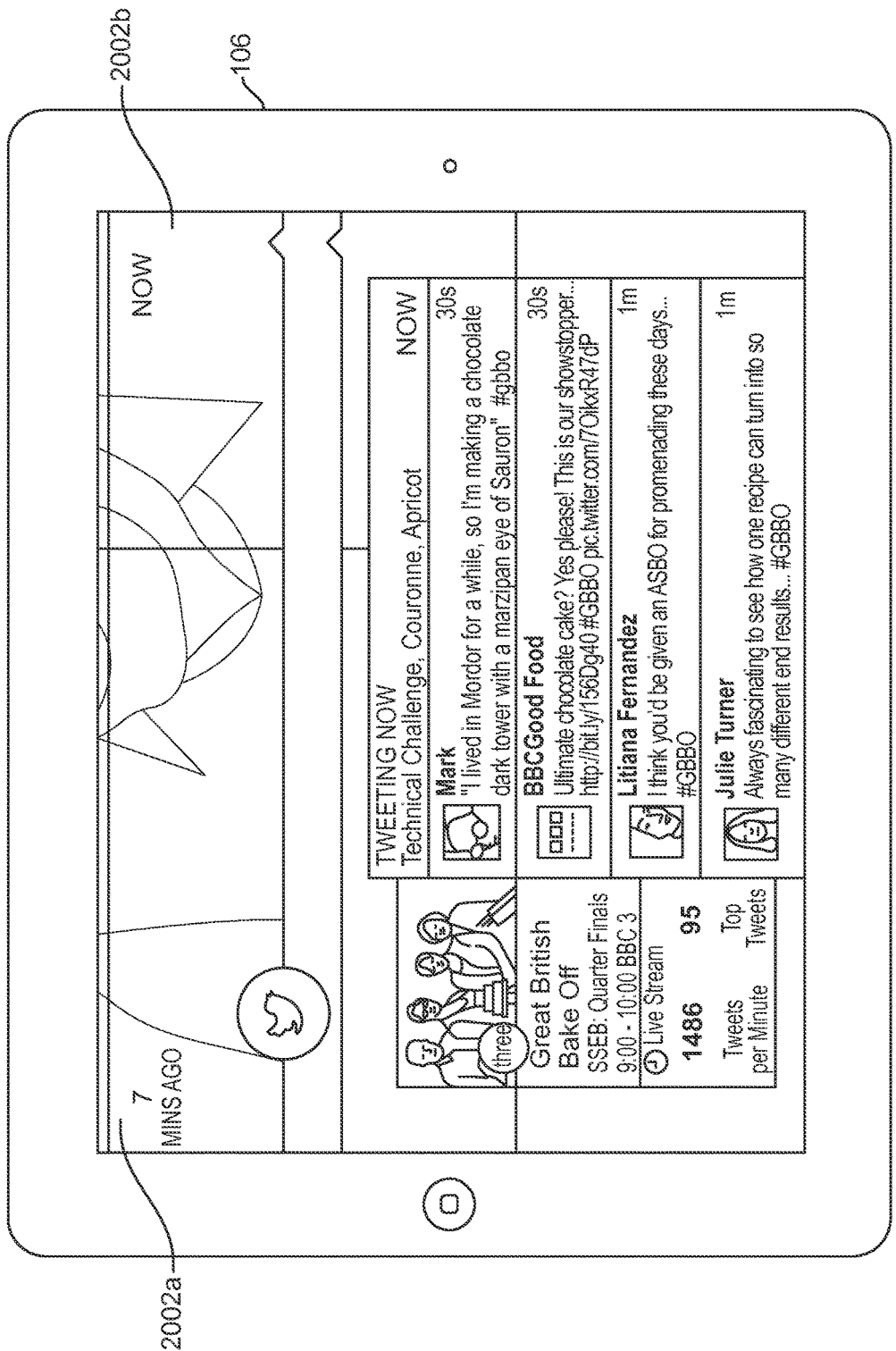
FIG. 20B illustrates a screenshot of the second-screen device for the social media application having two time frames in accordance with an exemplary embodiment.
Figure 20C:
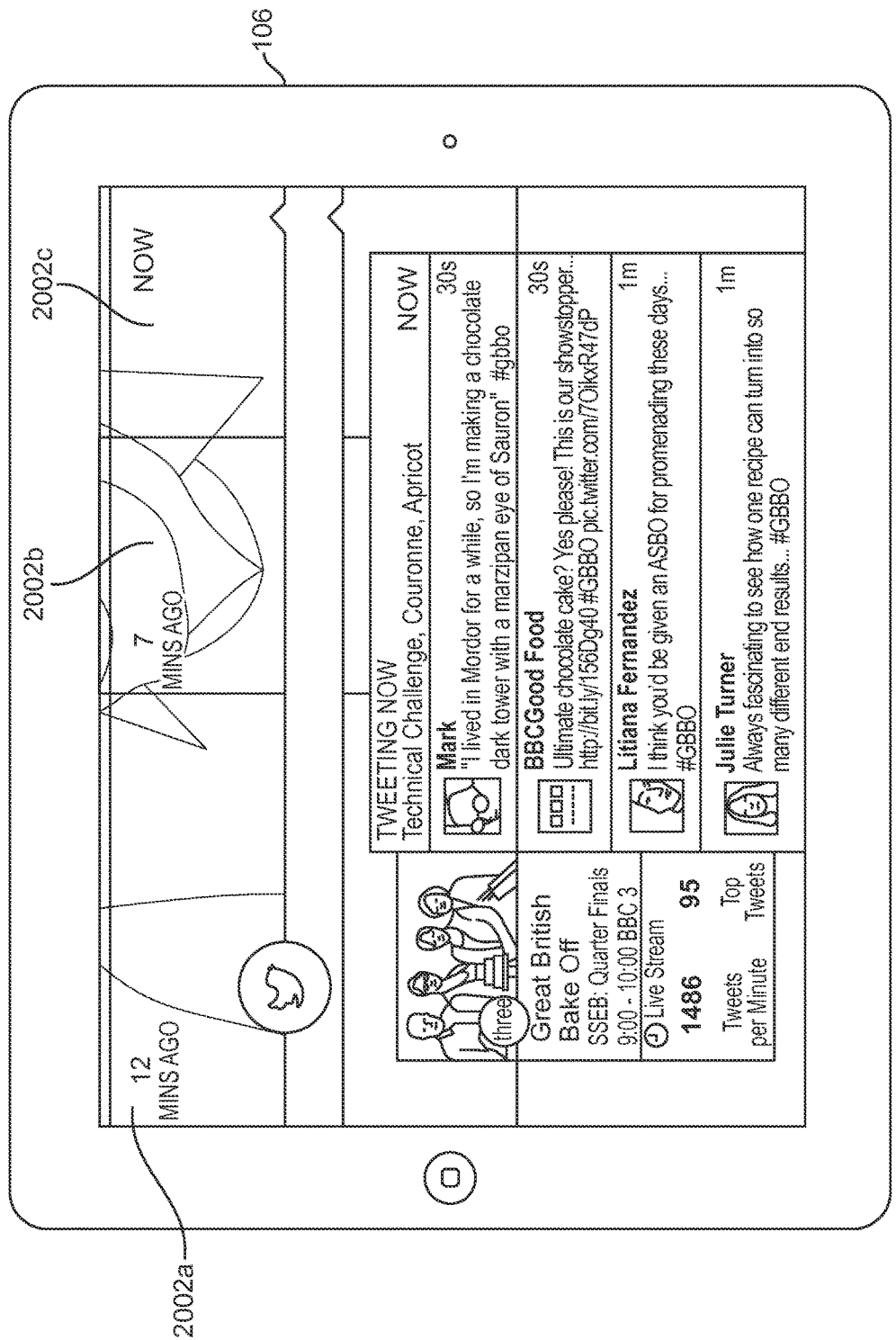
FIG. 20C illustrates a screenshot of the second-screen device for the social media application having three time frames in accordance with an exemplary embodiment.
Figure 20D:
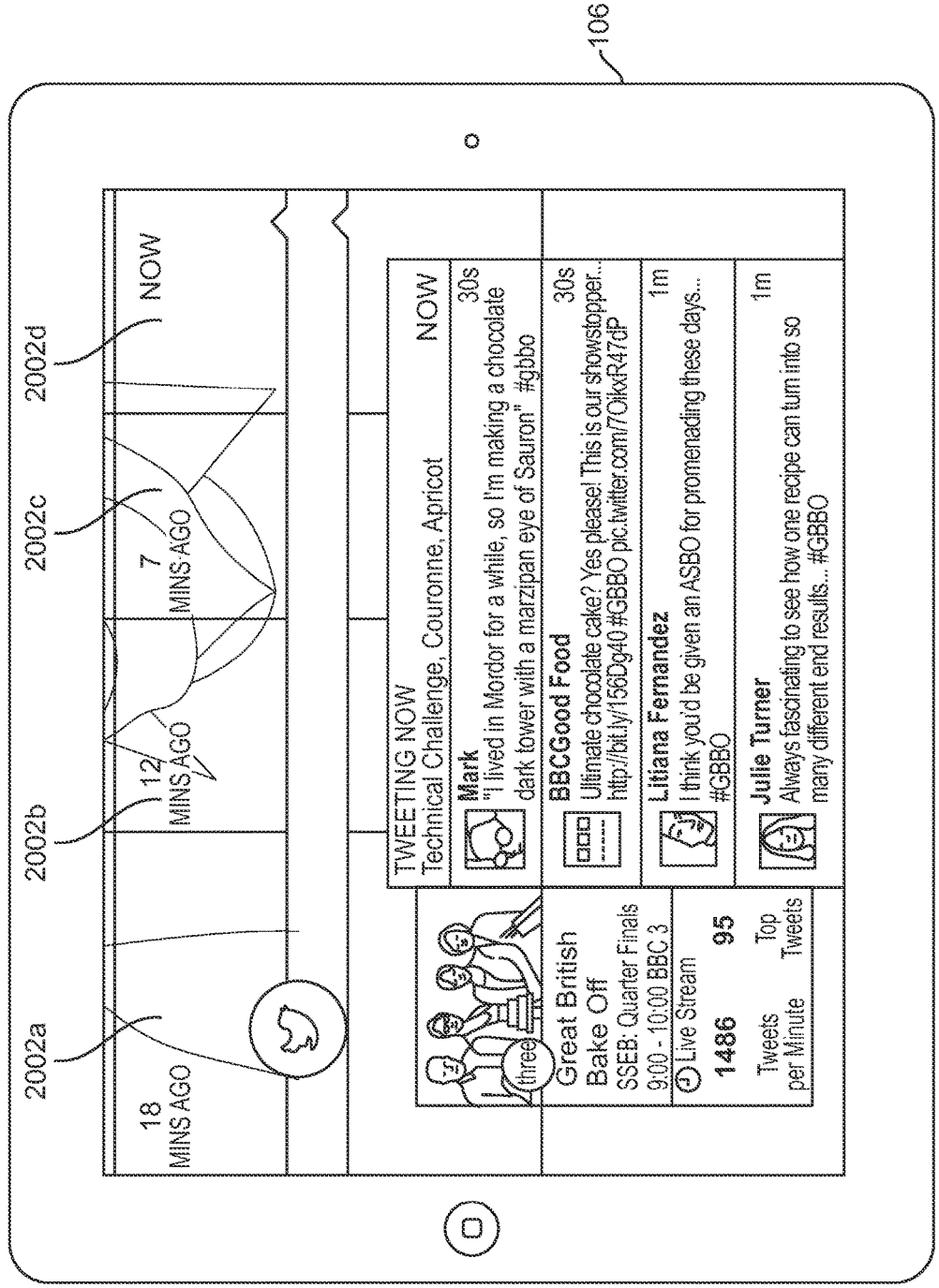
FIG. 20D illustrates a screenshot of the second-screen device for the social media application having four time frames in accordance with an exemplary embodiment.

At block 1704, a contextual panel is displayed in an active display area on the touchscreen. For example, the second application 110 can display the contextual panel in the active display area 208. The display of the contextual panel can be in response to an application being selected from an application menu. Referring to FIG. 5, an application menu is displayed in the active display area 208 on the touchscreen 204 of the second-screen device 106. A user can navigate the application menu and select an icon for an application having a contextual panel. The selection can be in response to a displayed icon being touched. The content for the contextual panels can be streamed or downloaded from an auxiliary content provider 130. As shown in FIG. 18, screenshots of the primary device and the second-screen device for a social media application are illustrated. In this example, the social media application is for Twitter, but can apply to other social media applications as known in the art. In this example, a contextual panel 1802 having associated messages 1804a-d or tweets is displayed. The messages 1804 are scrollable using navigation gestures. For example, the messages 1804 can be scrolled to see additional associated messages. As shown in FIG. 19, screen shots of the primary device and the second-screen device for a shopping application are illustrated. In this example, a contextual panel 1902 having associated products for sale 1904a-d is displayed. As shown in FIGS. 18 and 19, the video stream associated with the received first media content can be displayed on the screen 202 of the primary display 104 and the video stream associated with the second media content can be displayed on the touchscreen 204 of the second-screen device 106. More specifically, the second application 110 can display part of the video stream associated with the second media content in a video display area 206. The first video stream 214 displayed on the screen 202 and the partial video stream 216 displayed on the touchscreen 204 can be associated with the same video content and can be substantially synchronized.

Referring to FIG. 18 again, the partial video stream displayed in the video display area 206 is segmented into time frames 1806. In this example, there are four time frames 1806a-d. The time frame 1806a to the far right includes a label of "NOW." The next time frame 1806b to the left is labeled as "7 mins ago," the next time frame 1806c is labeled as "13 mins ago" and the time frame 1806d to the far left is labeled as "21 mins ago." A mini trends panel 1808 can be displayed in the active display area 208. The mini trends panel 1808 can include segments corresponding to the time frames 1806. The mini trends panel 1808 can include words and/or phrases that appear most often in the messages associated with the given time frame 1806. The words in the mini trends panel 1808 can avoid specific words, such as "a," "an," "the," and "and." As shown, the top word in the mini trends panel 1808a associated with the NOW time frame 1806a is "chocolate," the top word in the mini trends panel 1808b associated with the 7 mins ago time frame 1808b is "Toby," the top word in the mini trends panel 1808c associated with the 13 mins ago time frame 1808c is "Angel Cake" and the top word in the mini trends panel 1808d associated with the 21 mins ago time frame 1808d is "Promenading." The contextual panel 1802 can include additional information associated with the current selected time frame. In this example, the NOW time frame 1806a includes additional information such as the title of the video stream being displayed (The Great British Bake Off), total number of messages (1486) associated with the selected time frame 1806a, the number of messages per minute (95) associated with the selected time frame 1806a and four trending words and/or phrases: chocolate, show stopper, recipe and disaster.

The graphical user interface for the social media application can be created using analytics, such as a Twitter analytic. The following is a description of how the graphical user interface can be created but is not limited to this description. First a raw Twitter feed can be received. In some embodiments, the raw Twitter feed can be received by auxiliary content provider 130, which can be a server configured to perform analytics on the raw Twitter feed to divide the raw Twitter feed into collections pertaining to events, or scenes that are presented in the first media content. In some embodiments, this service could be performed by Twitter, or a third party provider. The auxiliary content provider 130 can monitor social media feeds for hash tags or other identifiers indicating that social media commentary is relevant to live or recorded media content. The auxiliary content provider 130 can curate the social media feeds into individual collections that pertain to its related content. In some embodiments, the curating of social media feeds also involves parsing a collection of social media commentary relevant to media content into sub-collections relevant to a time period surrounding a scene or event that generates an increased amount or rate of social media commentary.

The auxiliary content provider 130 can first associate social media commentary with a video program by matching hash tags in a database. The auxiliary content provider 130 can further monitor the rate of messages or tweets on an ongoing basis. The rate can be tweets per minute (TPM). The rate can be measured on a predetermined basis. For example, the rate of tweets per minute can be measured every five second. In other words, the rate of tweets per minute can change every five seconds. When TPM exceeds a predetermined threshold, or change from a prior period the auxiliary content provider 130 can divide the feed into a new sub-collection and associate the sub-collection with the media content to which it pertains a period beginning a few seconds earlier than the point in time that the change in the rate of social media commentary was detected (as there will be some delay), and ending at the start of the beginning of the next sub-collection. Many sub-collections associated with time frames can potentially be associated with the media. Each sub-collection can include a reference pointer to the time frame that the sub-collection is relevant to. In some embodiments, the auxiliary content provider is associated with a cloud DVR service so that the reference pointer has a specific media file to reference.

These collections and sub-collections of social media content can be accessed by the second screen device 106 directly, or through the set top box 102 in associating with the primary media content being displayed on the primary display device 104. In some embodiments, the collections of social media content can be made available through an API to the auxiliary content provider 130. The collection can be streamed to the second screen device 106 while the primary media content is displayed, and the sub-collections can be displayed in the contextual panels described herein.

FIG. 20 illustrates how the sub-collections appear in different contextual panels on the second screen device 106. For example, a single time frame 2002a is shown in FIG. 20A. As the program advances, and the rate of messages associated with that point in the program, for example, the number of tweets per minute, exceeds a predetermined value, a new time frame can be identified. For example, a new time frame 2002b is identified or added as shown in FIG. 20B. Once the rate of messages exceeds the predetermined value, a third time frame 2002c can be added as shown in FIG. 20C. If the rate of messages exceeds the predetermined value again, a fourth time frame 2002d can be added as shown in FIG. 20D.

In some embodiments the tweets contained within a time frame and displayed within the interactive contextual panels can be dynamic. While one set of analytics, such as tweets per minute or other analytics, can be used to determine the time boundaries of an event that can become a contextual panel, other analytics can be used to curate the collection of tweets that are displayed within the contextual panel. A large number of tweets might be associated with one of the contextual panels, but over time, algorithms can be used to determine that some tweets are more important or interesting than others. For example, if a tweet was re-tweeted often, an occurrence of that tweet could be considered important and included in the curated collection, while the re-tweets are duplicates and can be filtered out of the collection displayed in the interactive contextual panel. Accordingly, overtime, data will develop that will allow an algorithm to curate the collection of tweets into the most relevant collection. This has the consequence that two viewers viewing the same content at different times could experience a somewhat different collection of tweets pertaining to the same time frame of the content. Another way that the collection of tweets can be curated includes identifying zero-retweet tweets from verified twitter accounts with a high number of followers (e.g., >10,000), implying popular or well known users saying something more or less as it happens. Of course any method of curating the social media collections could be used. In some embodiments, the curated collection could be supplemented with tweets that come from accounts that are followed by the viewing user.

Even though the contextual panels may relate to events that happened in the past, a user experiencing recorded content enhanced with the contextual panels can still provide their own commentary via social messaging. In some embodiments the application on the second screen device that is providing the contextual panels and content therein can provide an interface for a user to add their own commentary. Since the application can identify what program the commentary is associated with, and can identify the time during the program that the user is providing their commentary, the application can associate such information (program and time marker) in metadata associated with the commentary. The commentary can then be posted on various social media outlets, and shared with the auxiliary content service 130 for potential addition to the contextual panel.

Referring to FIG. 18 again, the application can color code or shade the time frames 1806 and/or the mini trends panel 1808. For example, the second application 110 can color code or shade the NOW time frame 1806a and mini trends panel 1808a in orange, the 7 mins ago time frame 1806b and mini trends panel 1808b in red, the 13 mins ago time frame 1806c and mini trends panel 1808c in yellow, the 21 mins ago time frame 1806*db* and mini trends panel 1808*d* in blue. The second application 110 can cause the primary display 104 to display a time bar 1810. For example, the second application 110 can send instructions or commands directly to the primary display 104 or to the set-top box 102 which can forward the instructions or commands. In response to receiving the instructions or commands, the first application 108 can display the time bar 1810 on the screen 202 with the colors on the time bar 1810 corresponding to the colors displayed on the second-screen device 106.

Returning to FIG. 17, at block 1706, a command can be sensed. For example, the touchscreen 204 can sense one or more gestures for a command entered by a user. In some embodiments, the touchscreen 204 can sense one or more gestures entered by the user in the video display area 206 and/or the active display area 208. In some embodiments, the command can be sensed when the touchscreen 204 is displaying the video stream in full screen mode. After a gesture for a command is sensed, the method 1700 can proceed to block 1708.

At block 1708, a command is executed in response to the sensed command. For example, the second application 110 can determine the command based on the sensed command. After executing the command in response to the received data, the method 1700 can proceed to block 1710.

At block 1710, the results of the executed command can be reflected at least on the second-screen device. For example, the second application 110 can change the display on the second-screen device 106. For some commands, the second application 110 can execute the command by sending a command or instructions to the primary display 104 for execution by the first application 108. The commands can be sent directly from the second-screen device 106 to the primary display 104 or can be sent to the set-top-box 102 which forward them to the primary display 104.

Figure 21:
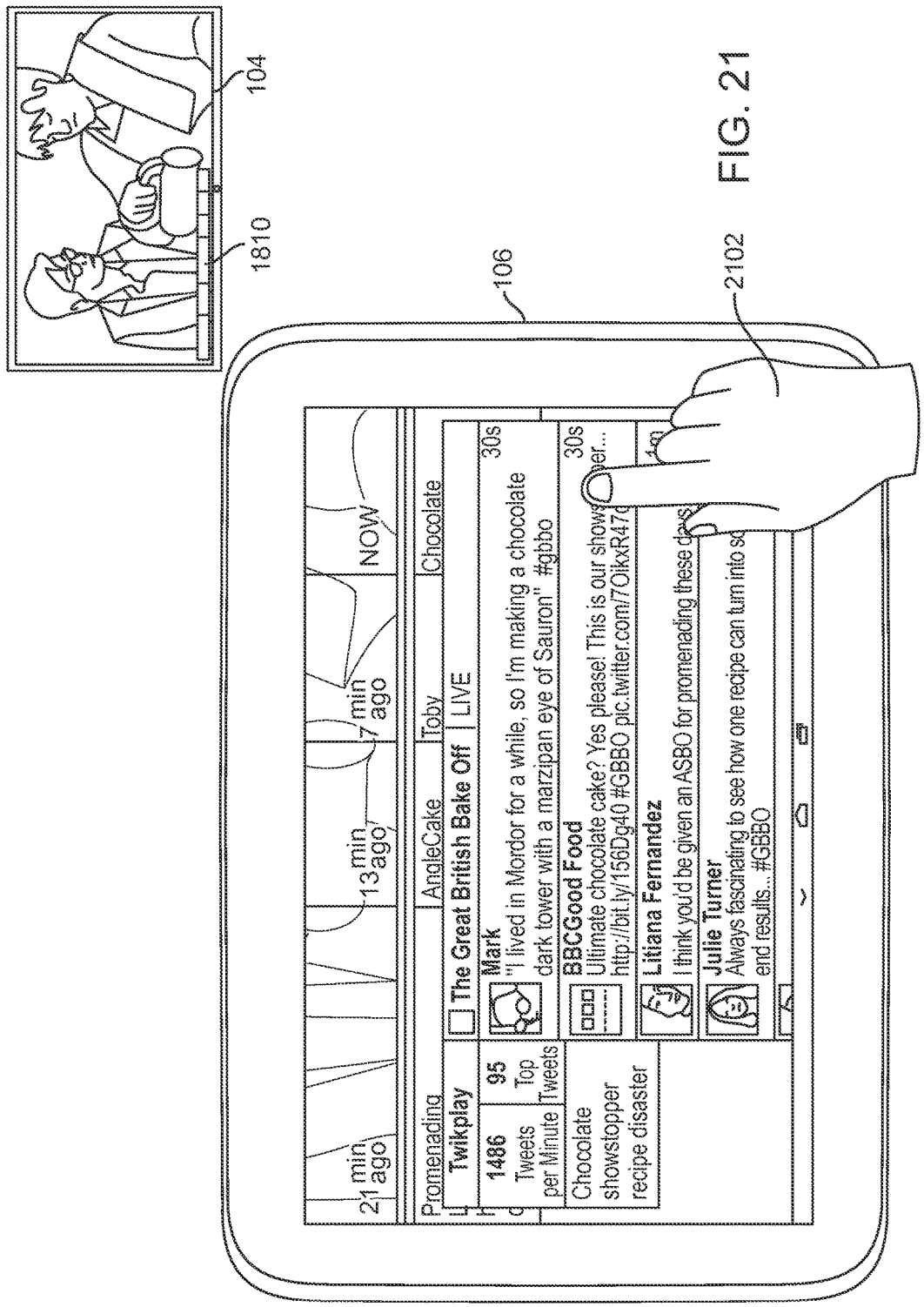
FIG. 21 illustrates screenshots of the primary device and the second-screen device for browsing the messages in the contextual panel in accordance with an exemplary embodiment.
Figure 22:
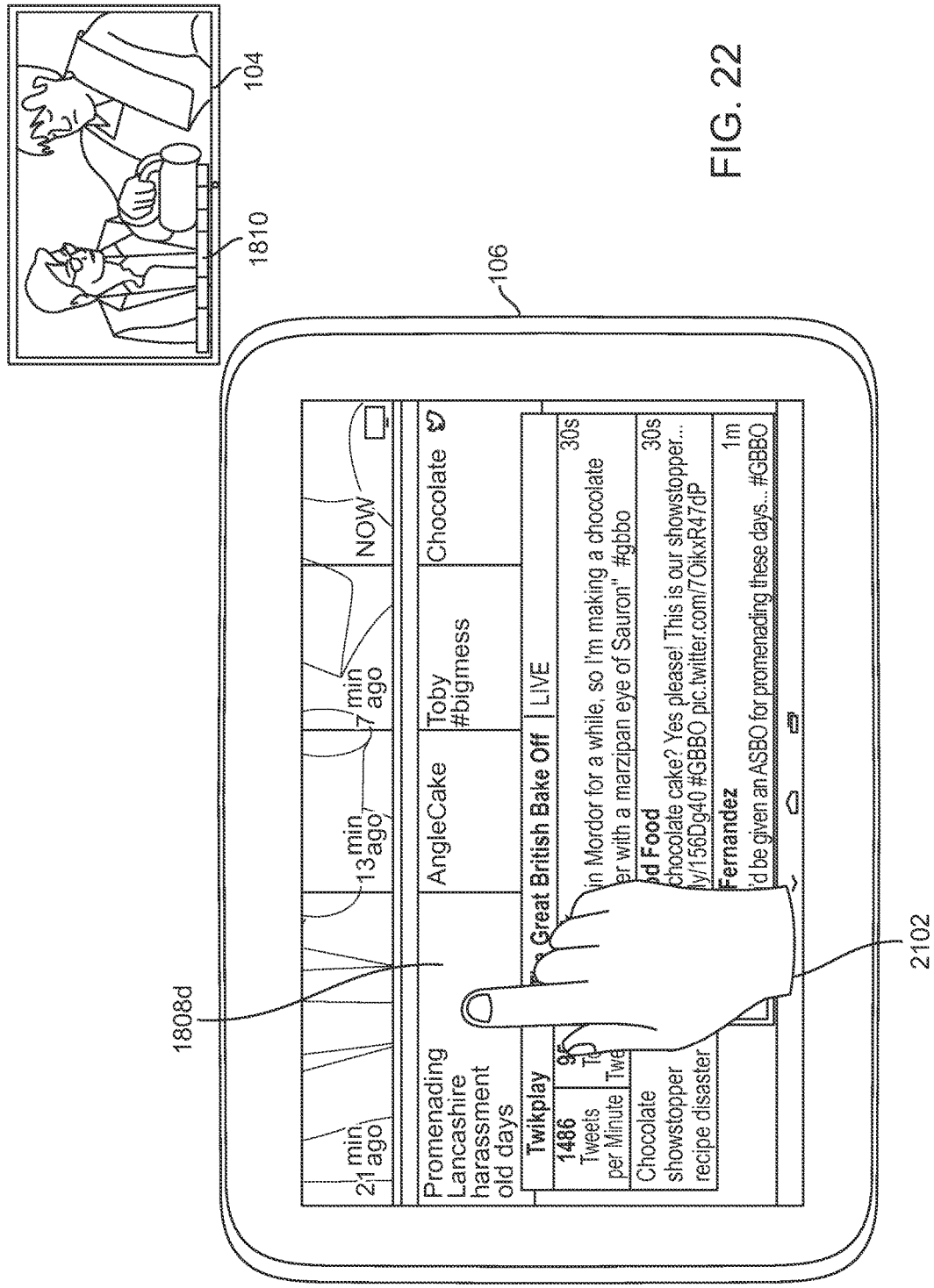
FIG. 22 illustrates screenshots of the primary device and the second-screen device for a selecting a mini trends panel in accordance with an exemplary embodiment.
Figure 23:
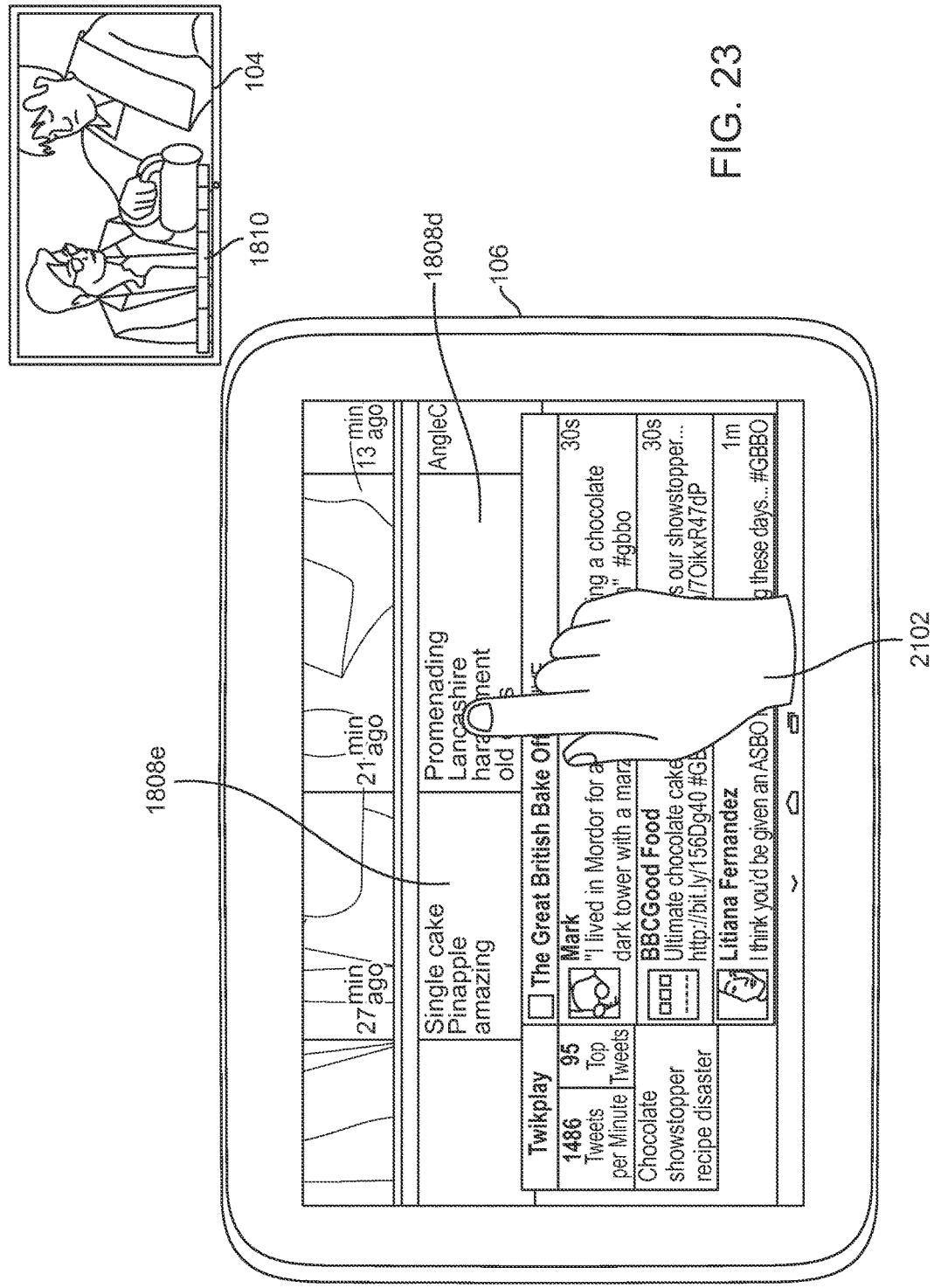
FIG. 23 illustrates screenshots of the primary device and the second-screen device for scrolling the time frames in accordance with an exemplary embodiment.
Figure 24:
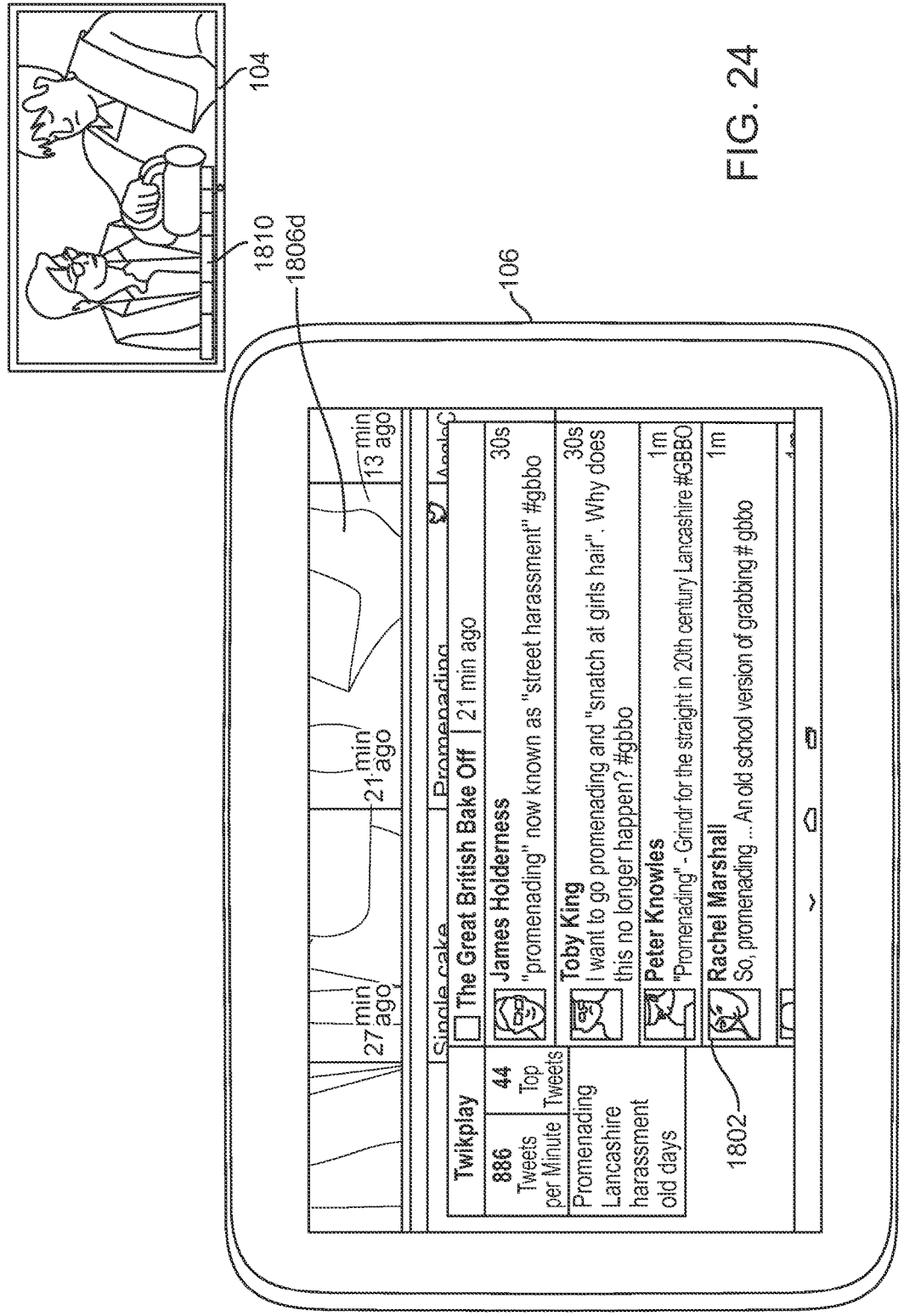
FIG. 24 illustrates screenshots of the primary device and the second-screen device for selecting a time frame in accordance with an exemplary embodiment.
Figure 25:
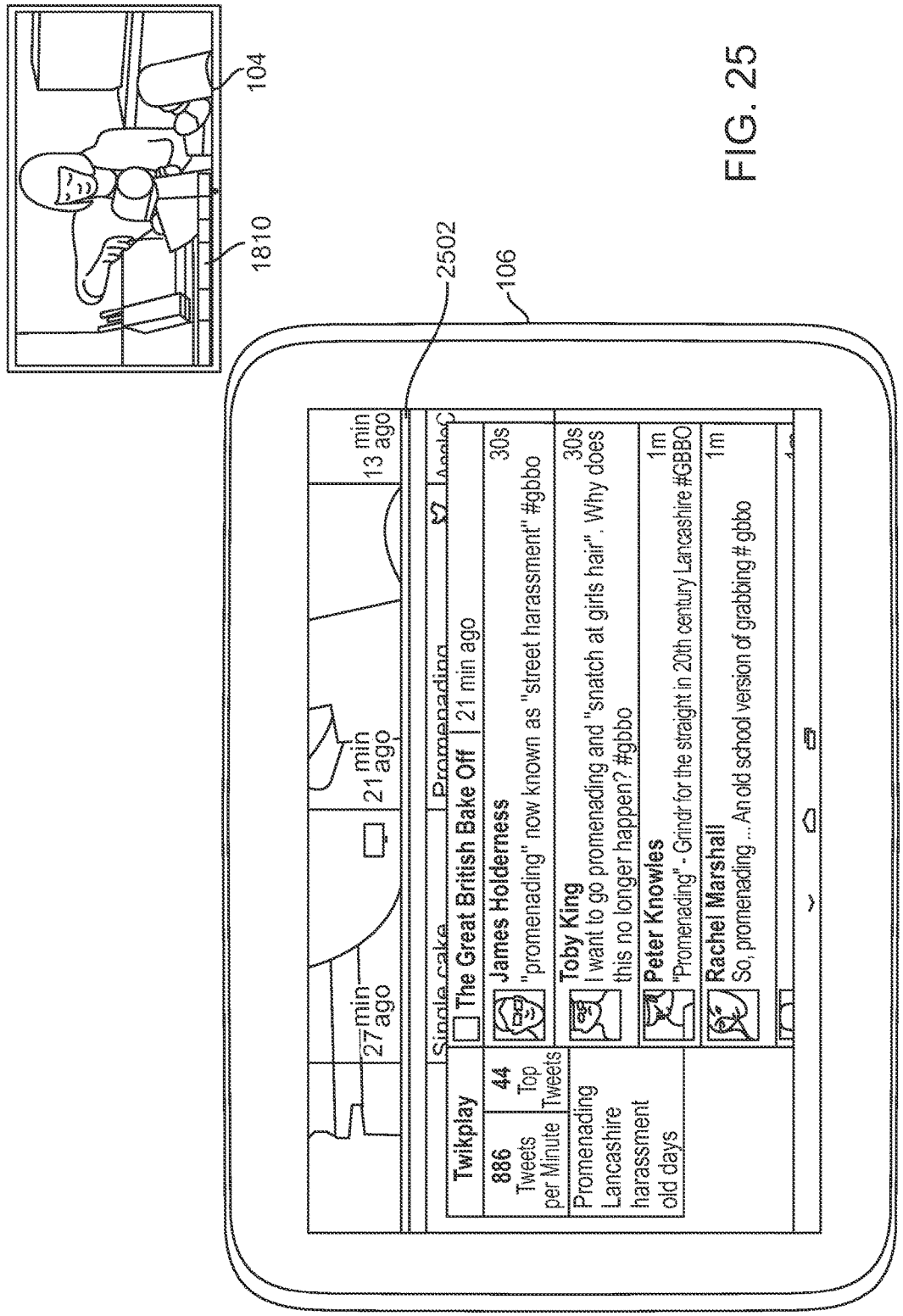
FIG. 25 illustrates screenshots of the primary device and the second-screen device prior to a synchronization command in accordance with an exemplary embodiment.
Figure 26:
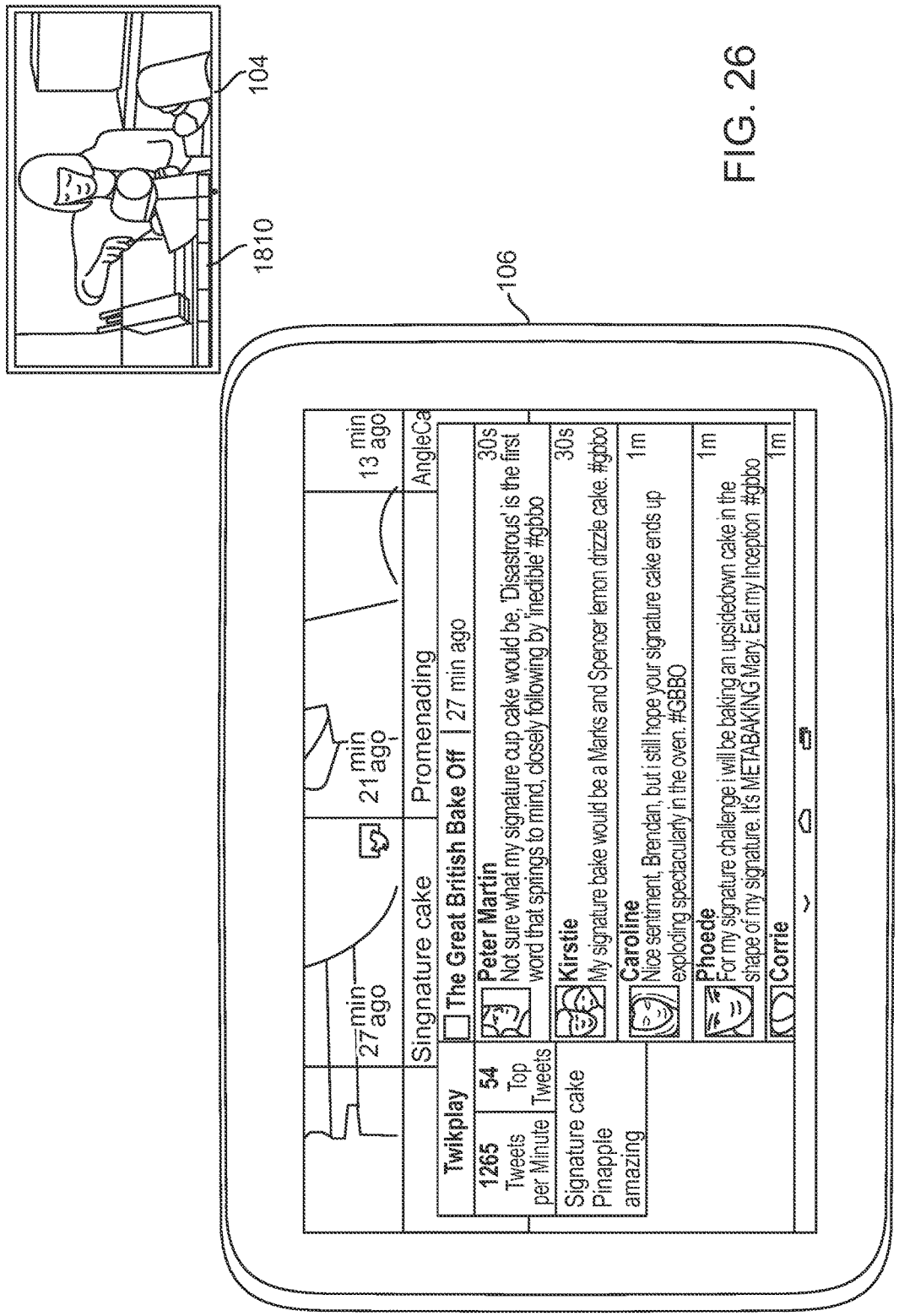
FIG. 26 illustrates screenshots of the primary device and the second-screen device after a synchronization command but before the most recent message is displayed in accordance with an exemplary embodiment.
Figure 27:
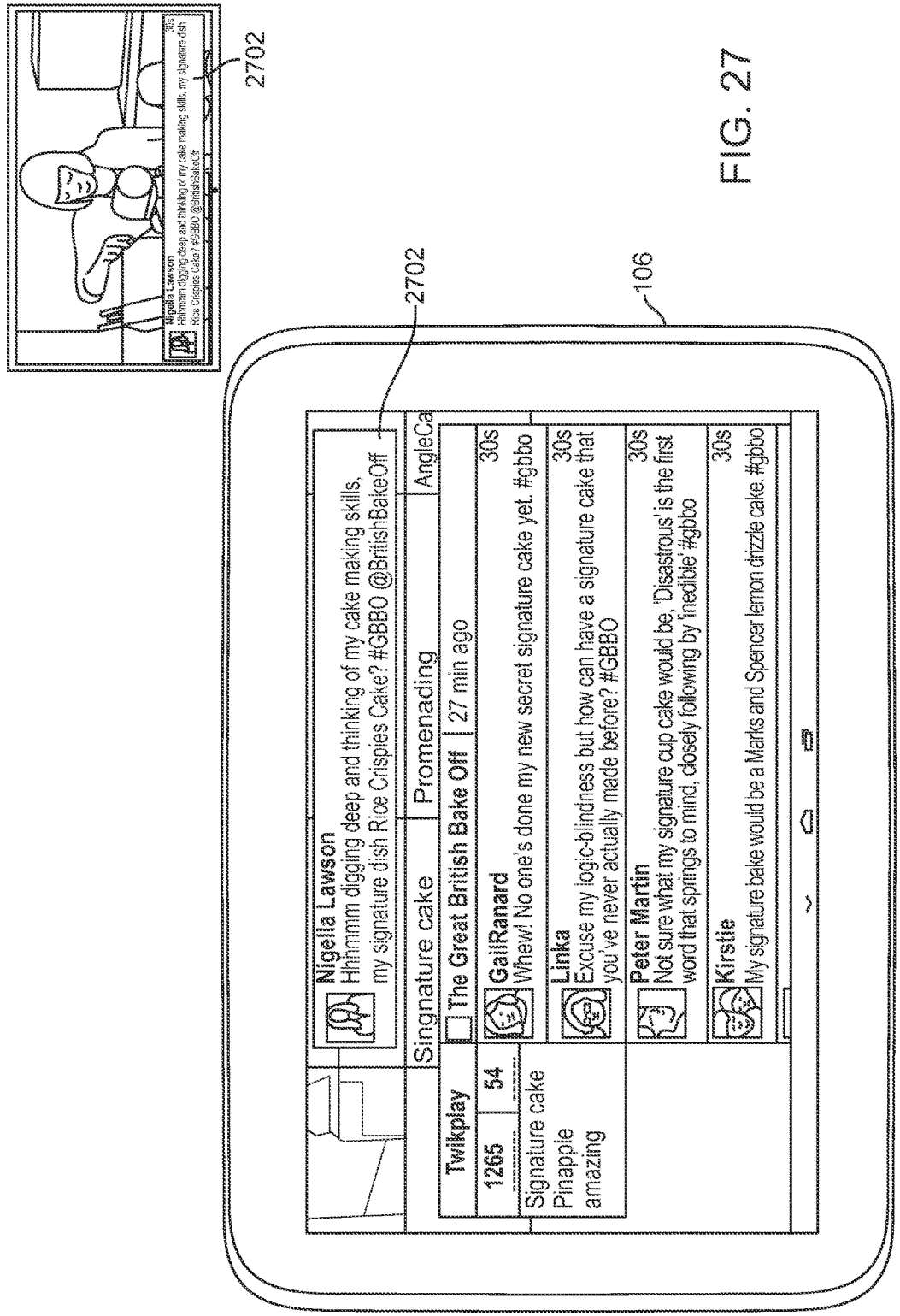
FIG. 27 illustrates screenshots of the primary device and the second-screen device after the most recent message is received in synchronization mode in accordance with an exemplary embodiment.

Referring to FIGS. 21-27, screenshots of the primary device and the second-screen device with respect to commands are illustrated. As shown in FIG. 21, a user 2102 can enter a scrolling gesture which can be sensed by the touchscreen 204. For example, the user 2102 can scroll or browse the associated messages in a selected time frame (e.g., time frame 1806*a*) by touching the contextual panel 1802 at about a message 1804 and scrolling up or down. In another example, the user 2102 can select a mini trends panel (e.g., mini trends panel 1808*d*) by touching the touchscreen 204 at about mini trends panel 1808*d* as shown in FIG. 22 and drag his or her finger horizontally to the right as shown in FIG. 23. More specifically, in response to the touching of mini trends panel 1808*d*, the second application 110 can cause the display of the contextual panel 1802 to slide down to more fully expose the display of the mini trends panel 1808 and in response to the drag to the right, the display of a new time frame 1806 can appear. For example, in FIG. 23, a new time frame, time frame 1806*e* (e.g., 27 mins ago) is shown and a corresponding mini trends panel 1808*e* is displayed by the second application 110. By removing the user's touch on mini trends panel 1808*d*, the messages associated with the 21 min ago time frame 1806*d* can be displayed by the second application 110 in the contextual panel 1802 as shown in FIG. 24. In response to a synchronization command, the most recent message can be displayed on both the screen 202 of the primary display 104 and the touchscreen 204 of the second-screen device 106. For example, the most recent message can be displayed in the video display area 206. FIG. 25 shows a gap 2502 between the video stream being displayed in the video display area 206 and the top of the mini trends panel 1806. By entering a synchronization command, for example, selecting the contextual panel 1802 by touching the contextual panel on the touchscreen 204 and dragging the selected contextual panel 1802 vertically upward, the gap 2502 can be removed as shown in FIG. 26. As a result of the executed synchronization command, the most recent message 2702 can be displayed on the screen 202 of the primary display 104 and in the video display area 206 of the second-screen device 106 as shown in FIG. 27. In response to a selection command of a time frame in the video display area 206, the video stream associated with the selected time frame can be displayed in the video display area 206 and on the screen 202 of the primary display with the video stream displayed in video display area 206 and on the screen 202 can be associated with the same content and can be substantially synchronized. In addition, the messages 1804 displayed in the contextual panel 1802 can be associated with the selected time frame 1806.

Referring to FIG. 19 again, the contextual panel 1902 can have time frames 1906, for example, time frames 1906*a-d*. The time frames 1906 can be based on products—each product for sale 1904 having a corresponding time frame 1906. As shown, the first time frame 1906*a* is for a Simplemente Delicioso Orlinda Ceramic 16-piece Dinnerware Set for $59.95 and is being aired at the present time. The second set time frame 1906*b* is for a Simplemente Delicioso Sonora 6-piece Knife Set with Bamboo Tray for $29.95 and was aired 8 minutes ago. The third time frame 1906*c* is for a Simplemente Delicioso 5-piece Nesting Mixing Bowl Set for $29.95 and was aired 12 minutes ago. The time frames 1906 shown in FIG. 19 can be displayed in a similar manner as the time frames 2002*a-d* shown in FIGS. 20A-20D. For example, the fourth displayed time frame 1906*d* was created before the third displayed time frame 1906*c* which was created before the second displayed time frame 1906*b* which was created before the fourth or present displayed time frame 1906*a*.

Figure 28:
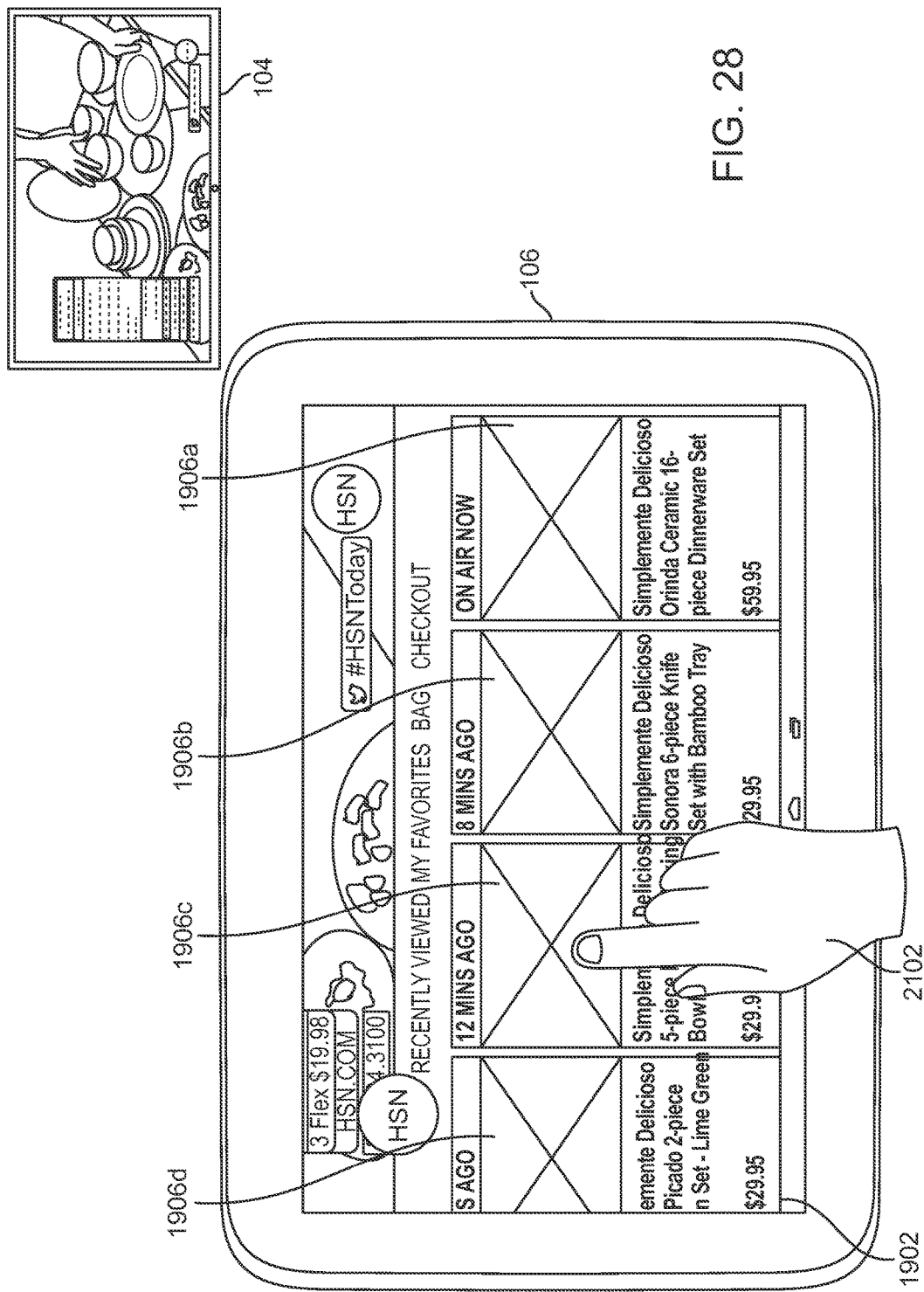
FIG. 28 illustrates screenshots of the primary device and the second-screen device prior to scrolling the time frames for a shopping application in accordance with an exemplary embodiment.
Figure 29:
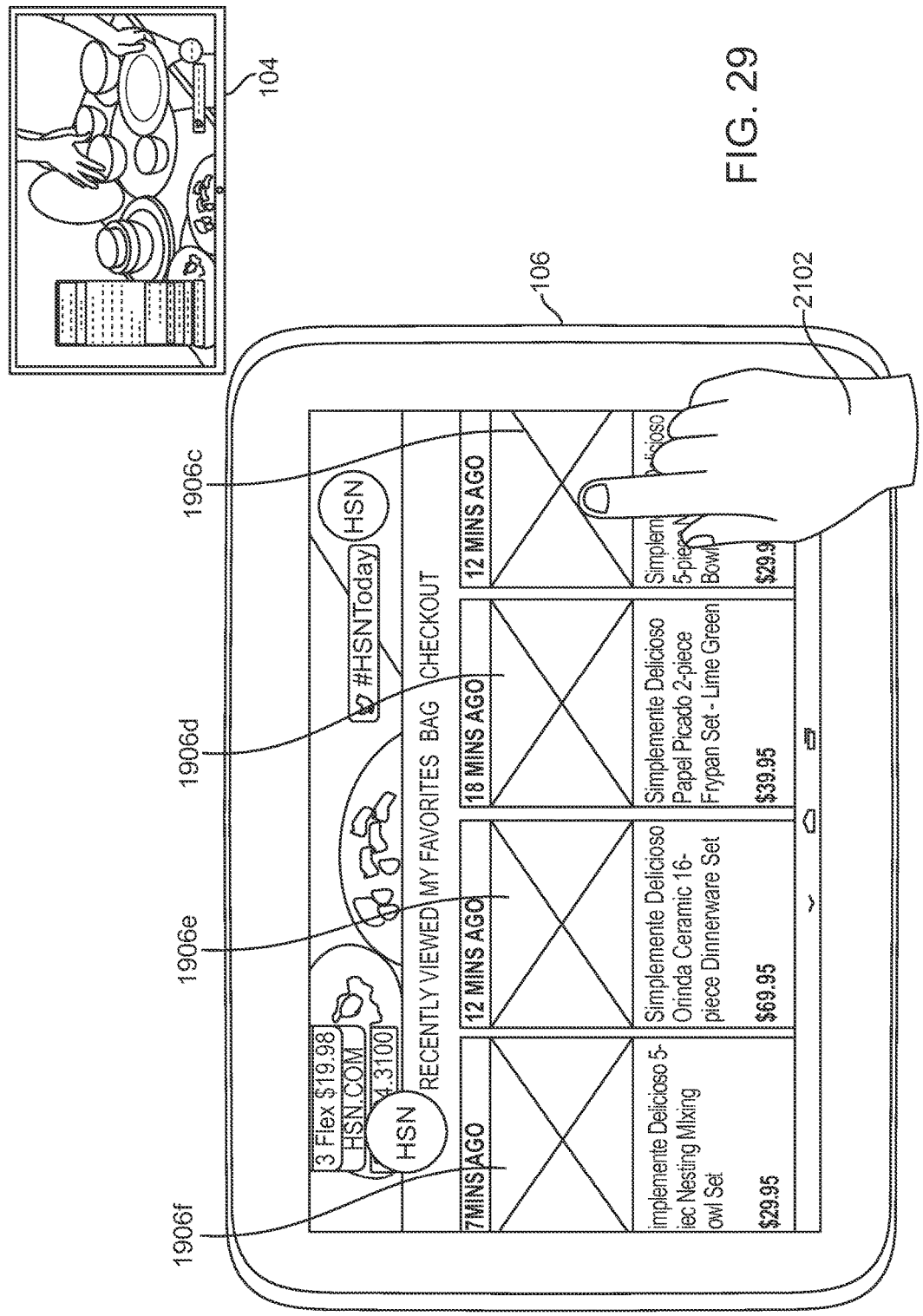
FIG. 29 illustrates screenshots of the primary device and the second-screen device after scrolling time frames for a shopping application in accordance with an exemplary embodiment.

Referring to FIGS. 28 and 29, screenshots of the primary device and the second-screen device with respect to a scrolling command for a shopping application are illustrated. As shown in FIG. 28, a user 2102 can enter a scrolling gesture which can be sensed by the touchscreen 204. For example, the user 2102 can scroll the time frames 1906 by touching the contextual panel 1902 at about a time frame 1906 and scroll left or right by dragging their touch horizontally to the left or to the right with the displayed time frames 1906 moving accordingly. For example, as shown in FIG. 29, the time frames 1906 are scrolled causing the earlier advertised products 1904 being displayed. Specifically, the 18 mins ago time frame 1906*d* and the 21 mins ago time frame 1906*e* are displayed.

Figure 30:
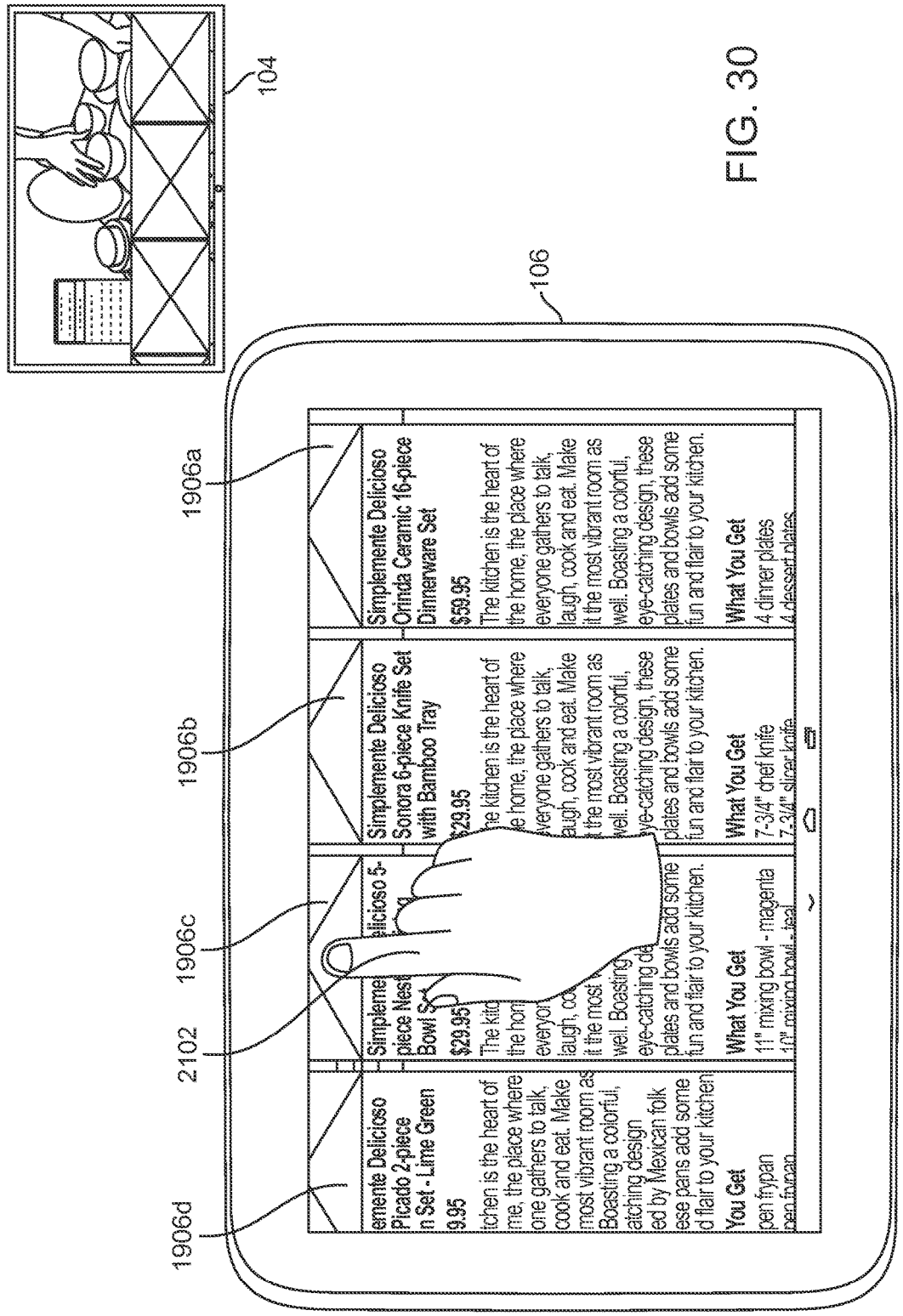
FIG. 30 illustrates screenshots of the primary device and the second-screen device prior to scrolling product for sale images on the primary display in accordance with an exemplary embodiment.
Figure 31:
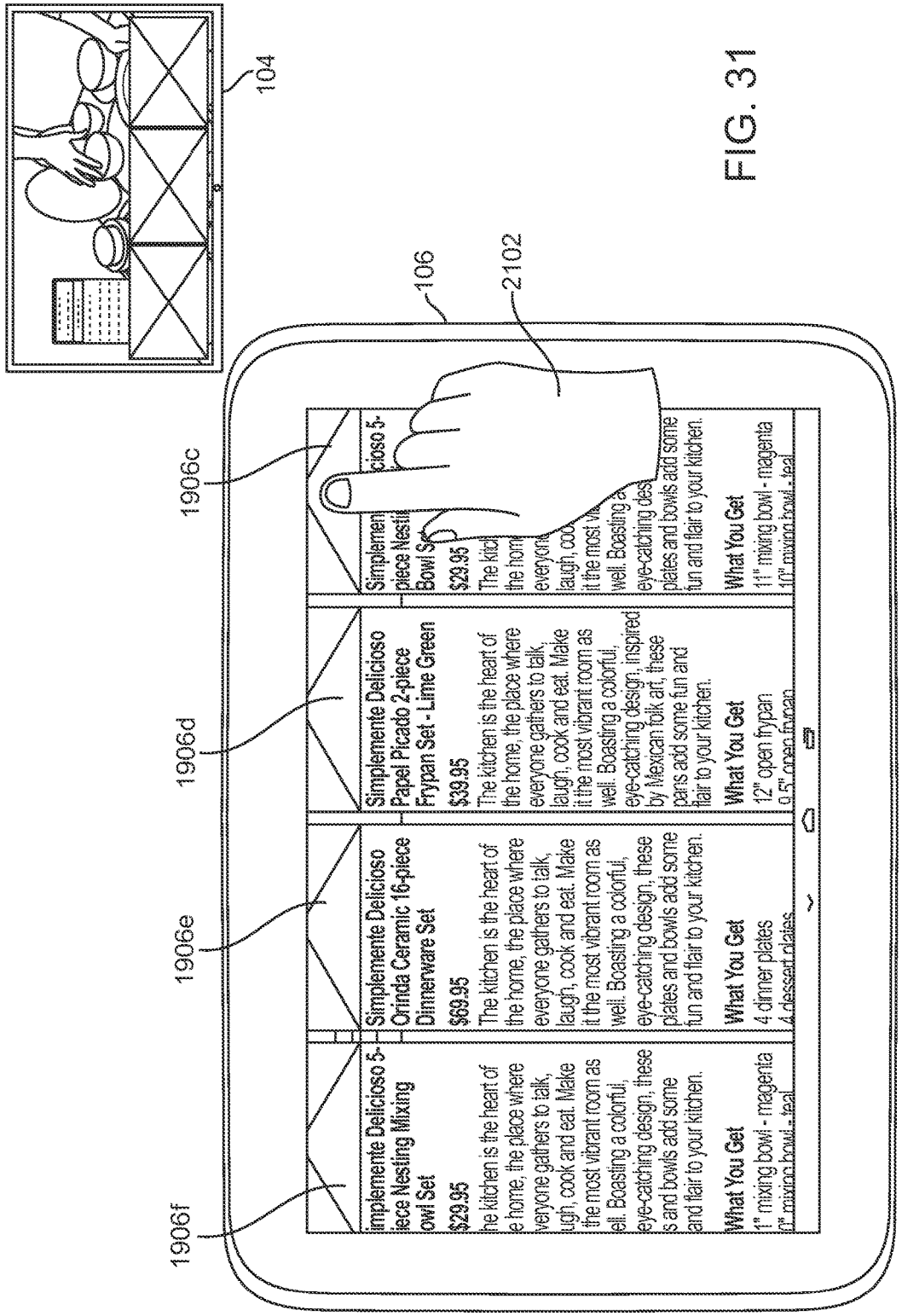
FIG. 31 illustrates screenshots of the primary device and the second-screen device after scrolling product for sale images on the primary display in accordance with an exemplary embodiment.

Referring to FIGS. 29-31, screenshots of the primary device and the second-screen device for scrolling images on the primary display for a shopping application in accordance with exemplary embodiments are illustrated. In response to a user 2102 selecting a time frame 1906 being displayed in the active display area 208 as shown in FIG. 29 and moving the selected time frame 1906*c* vertically upward into the video display area 206, the second application 110 can cause the display of images of the products for sale 1904 that are associated with the time frames 1906 being displayed on the second-screen device 106 as shown in FIG. 30. In response to the user 2102 scrolling left or right by dragging their touch horizontally to the left or to the right in the video display area 206, the display of images of the products for sale 1904 on the screen 202 of the primary display 104 correspondingly scroll as shown in FIG. 31. More specifically, the images for the products for sale 1904 on the screen 202 correspond to time frames 1906c-e.

Figure 32:
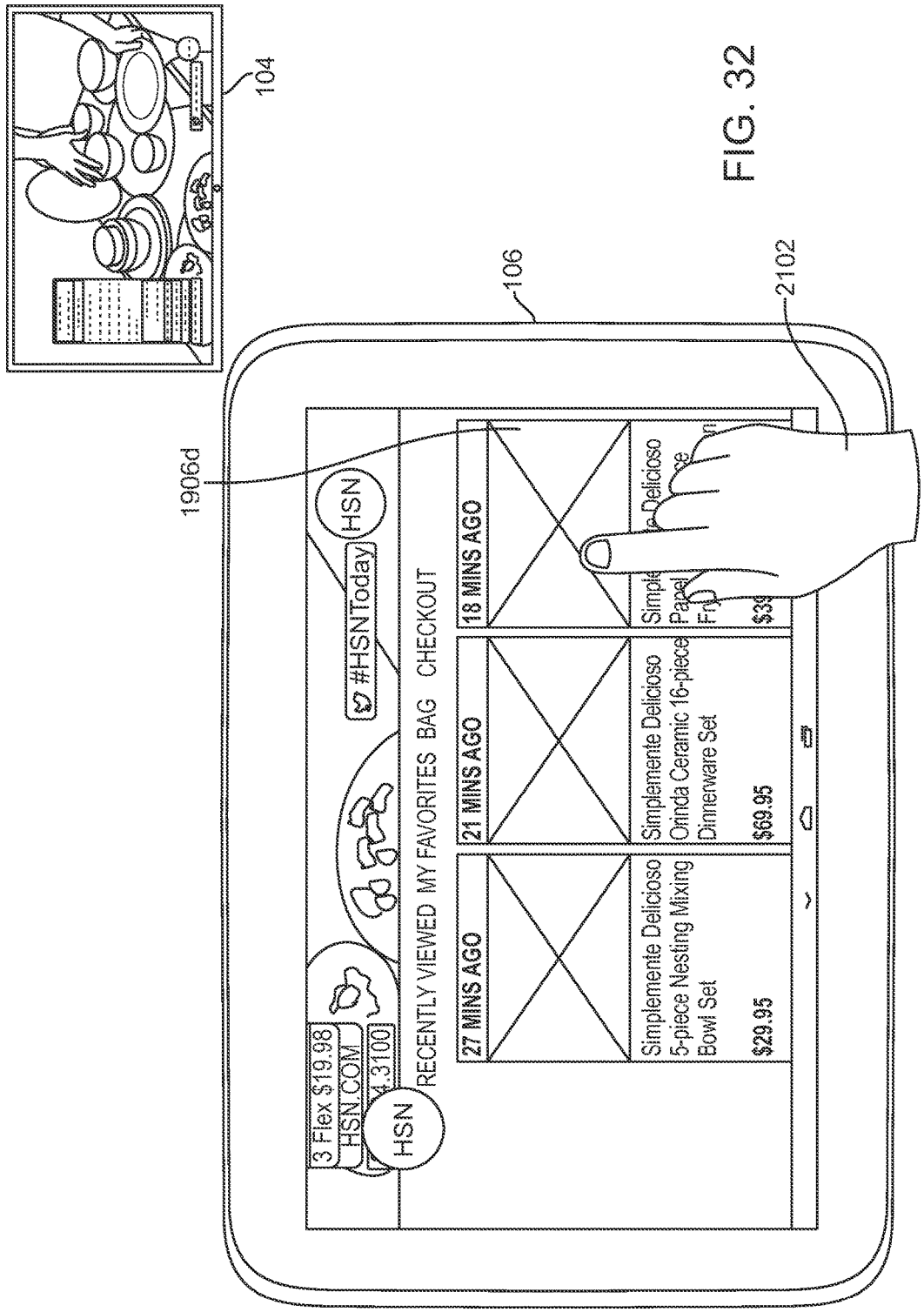
FIG. 32 illustrates screenshots of the primary device and the second-screen device prior to selecting a displayed time frame in accordance with an exemplary embodiment.
Figure 33:
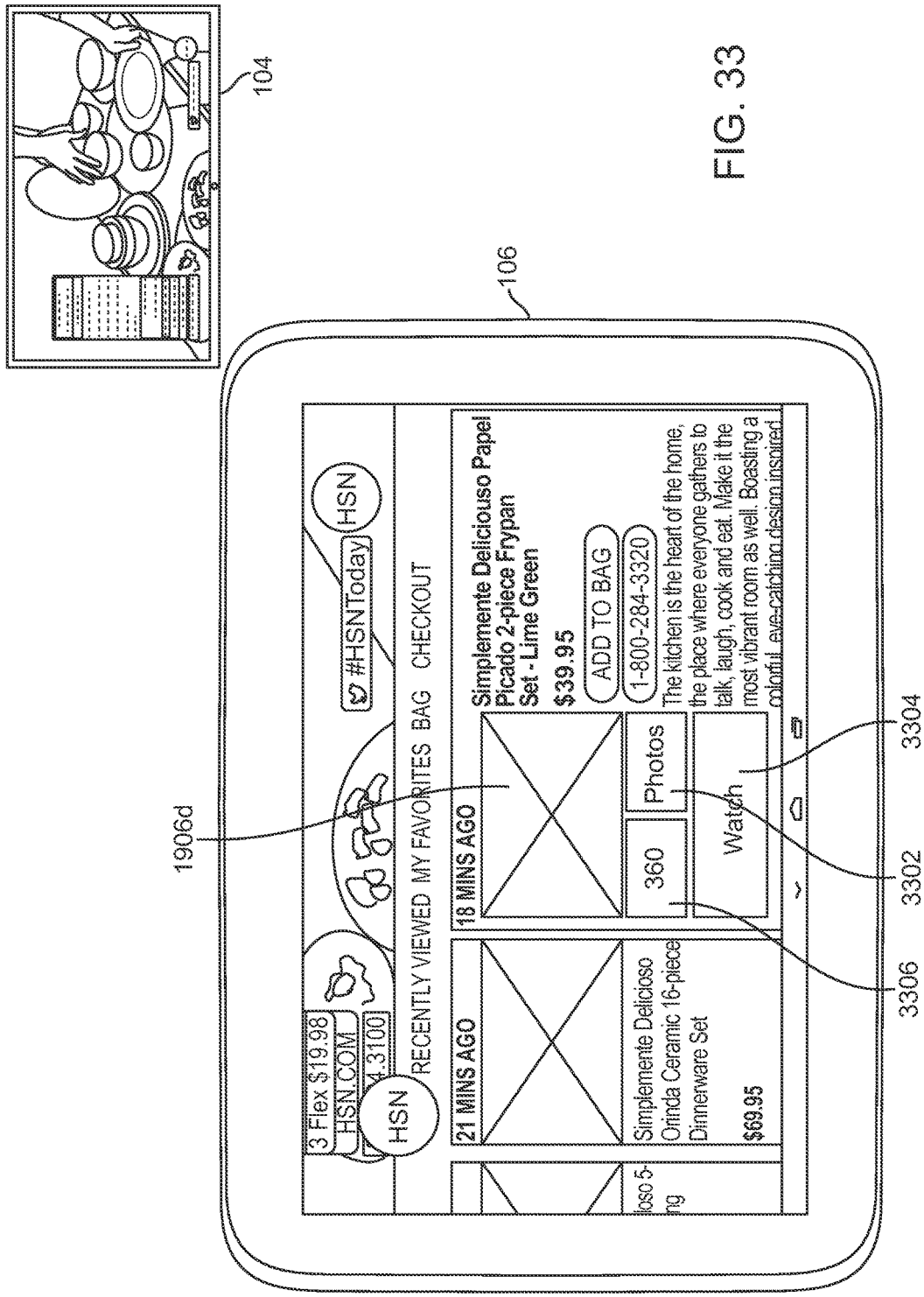
FIG. 33 illustrates screenshots of the primary device and the second-screen device after selecting a displayed time frame in accordance with an exemplary embodiment.
Figure 34:
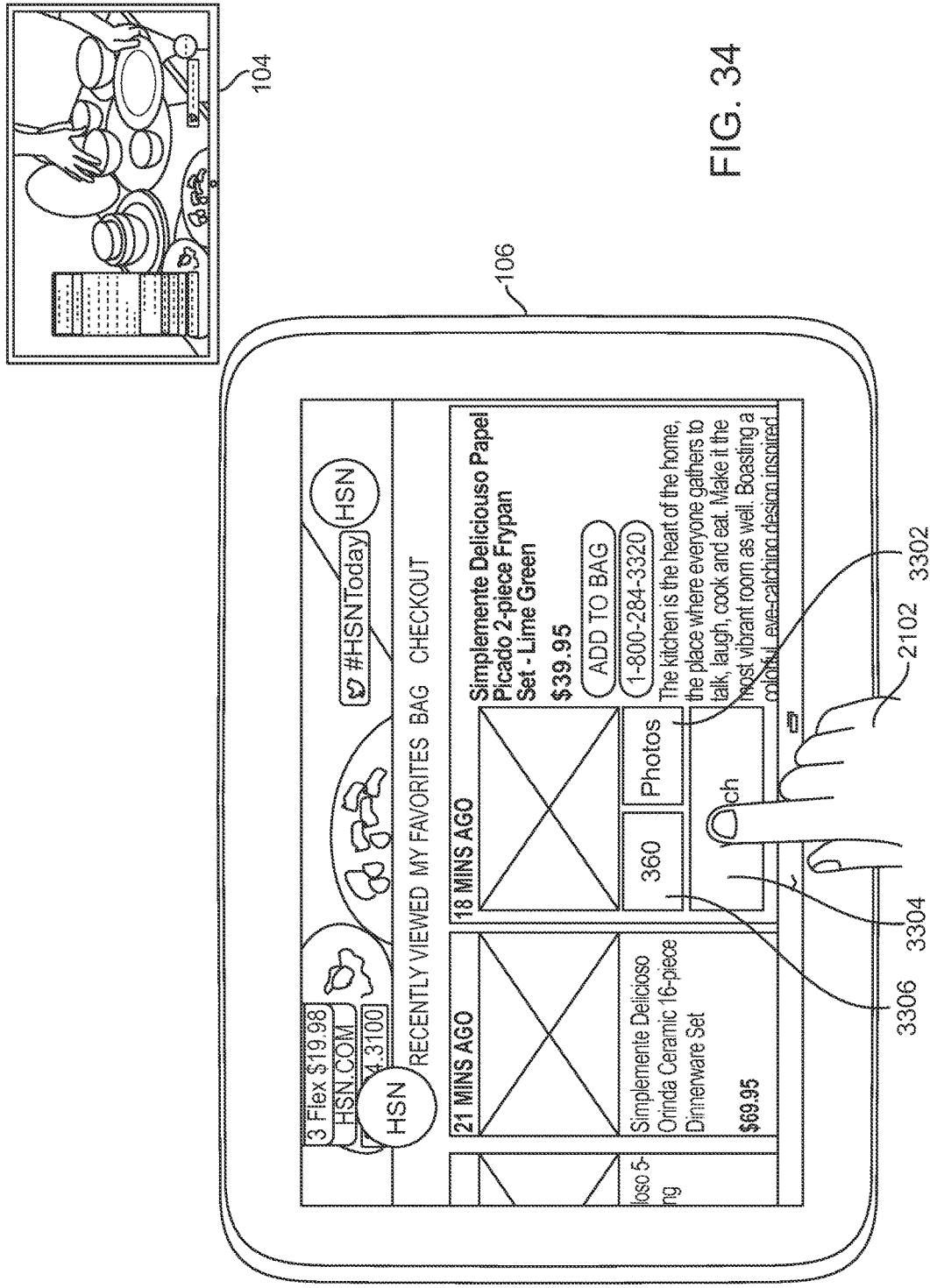
FIG. 34 illustrates screenshots of the primary device and the second-screen device prior to selecting a video stream for display on the primary display in accordance with an exemplary embodiment.
Figure 35:
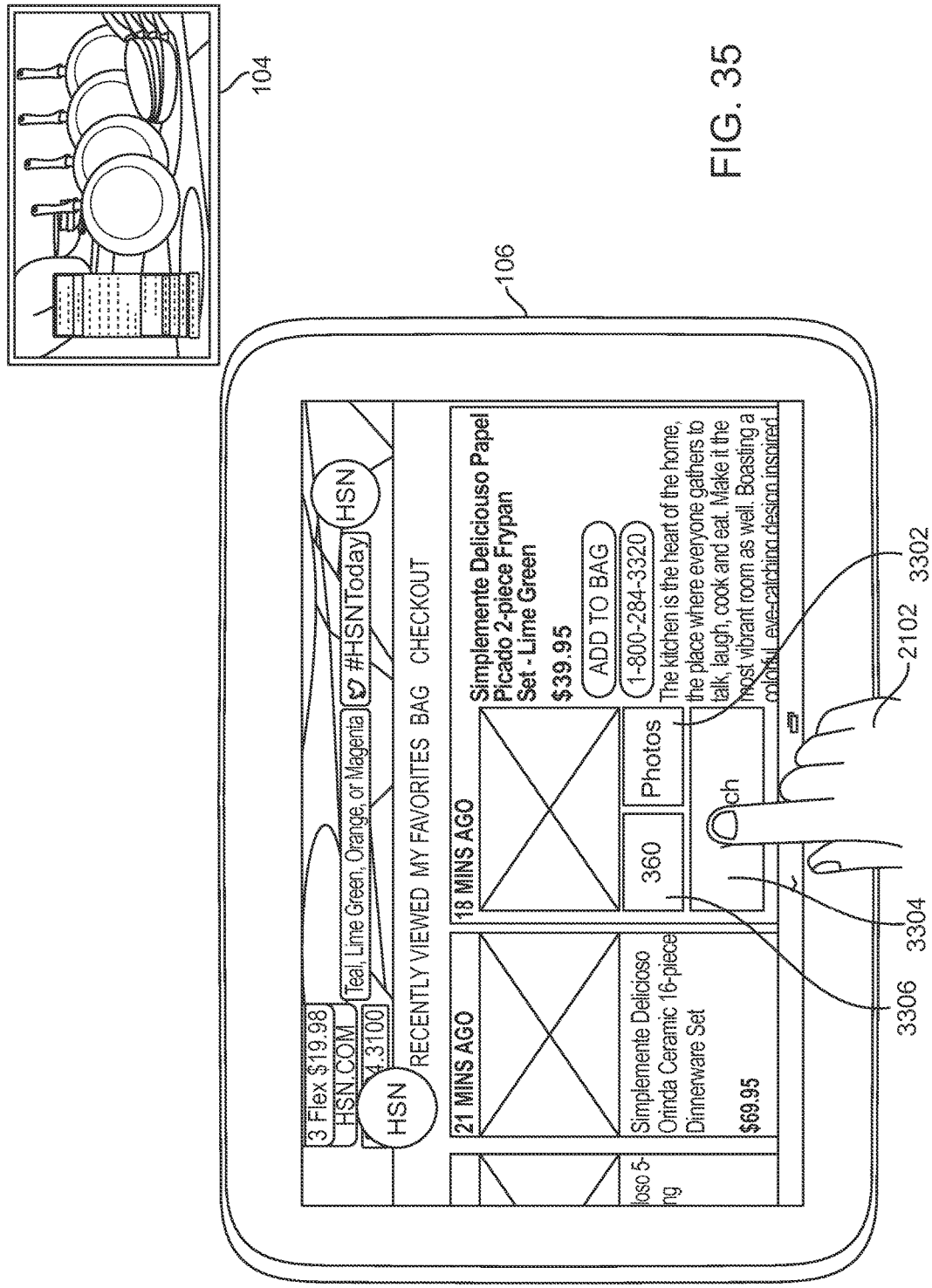
FIG. 35 illustrates screenshots of the primary device and the second-screen device after selecting a video stream for display on the primary display in accordance with an exemplary embodiment.
Figure 36:
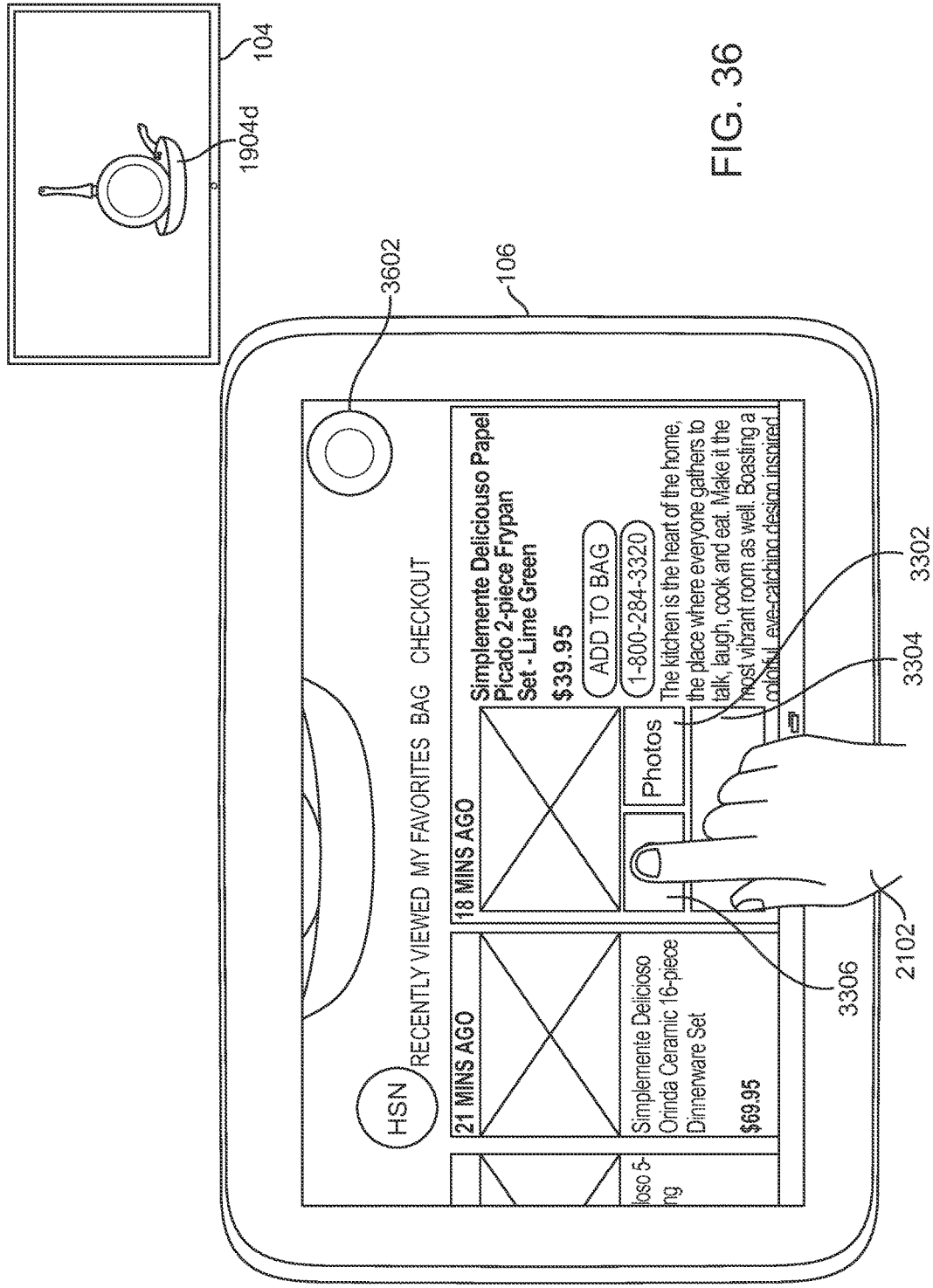
FIG. 36 illustrates screenshots of the primary device and the second-screen device after selecting a 360 option in accordance with an exemplary embodiment.
Figure 37:
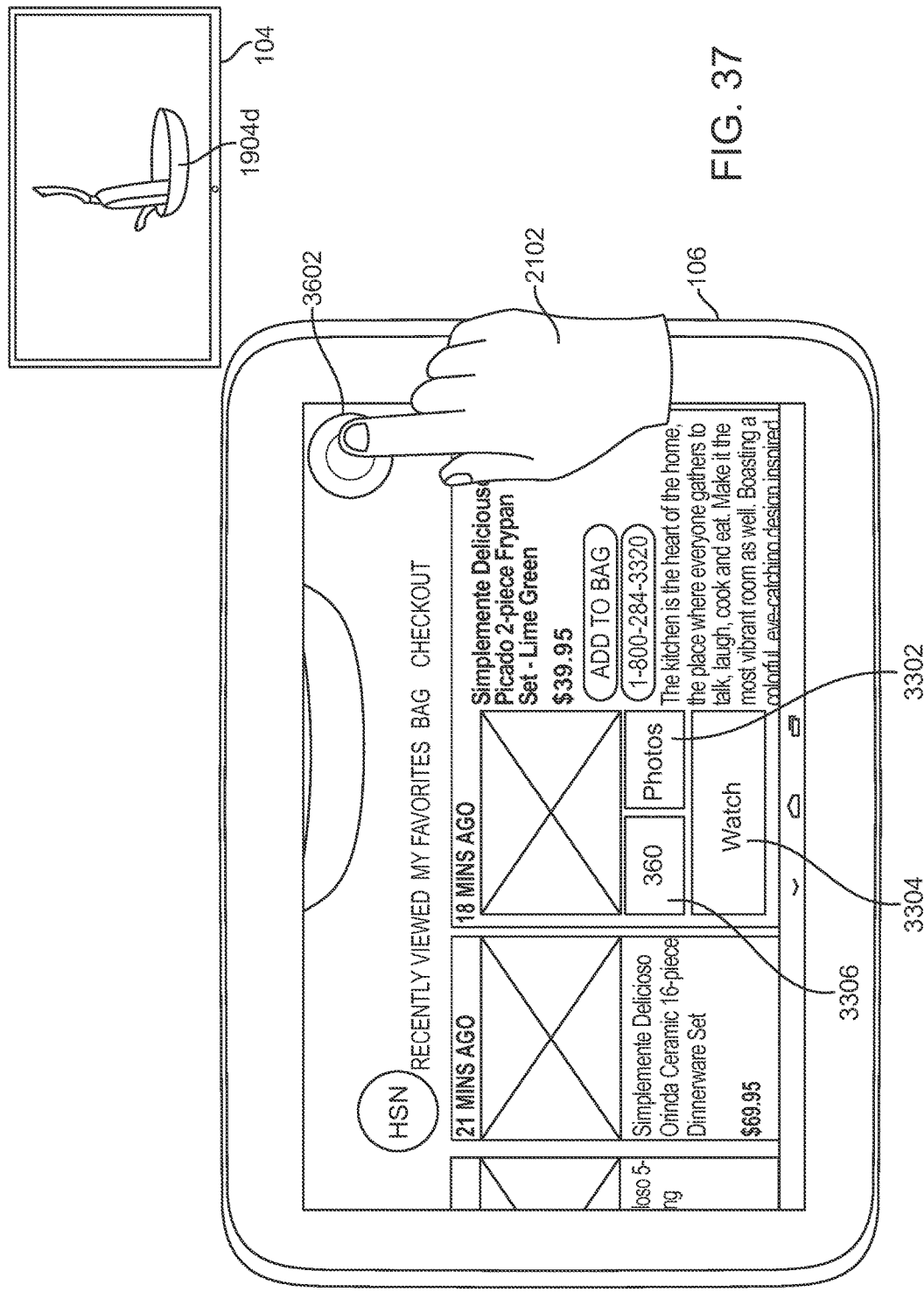
FIG. 37 illustrates screenshots of the primary device and the second-screen device after using an interactive component to rotate a product for sale in accordance with an exemplary embodiment.

Referring to FIGS. 32-37, screenshots of the primary device and the second-screen device for interacting with a product for sale in a selected time frame for a shopping application are illustrated. In response to a selection command in which a user 2102 selects a time frame 1906d being displayed in the active display area 208 as shown in FIG. 32, the selected time frame 1906d can expand to display more information about the product for sale 1904d with additional viewing options being available. For example, as shown, the Simplemente Delicioso Papel Picado 2-piece Frypan Set—Lime Green was selected and includes a photo option 3302, a watch option 3304 and a 360 option 3306. In response to the user 2102 selecting the photo option 3302, photos of the product for sale can be displayed on the screen 202. In response to the user 2102 selecting the watch option 3304 as shown in FIG. 34, the video stream for the corresponding time frame 1906d which was aired 18 minutes ago can be played on the screen 202 as shown in FIG. 35. In response to the user 2102 selecting the 360 option 3306, an image of the product for sale 1904d can be displayed on the screen 202 and an interactive component 3602 can be displayed in the video display area 206 as shown in FIG. 36. By interacting with the displayed interactive component 3602, such as touching and rotating the touch on the displayed interactive component 3602 the image of the product for sale 1904d displayed on the screen 202 rotates in a correspond manner to the interaction on the displayed interactive component 3702 as shown in FIG. 37. More specifically, the view of the product for sale 1904d being displayed on the screen 202 in FIG. 36 differs from the same product for sale 1904s being displayed on the screen in FIG. 37 by ninety degrees in response to the interaction with the displayed interactive component.

As addressed above the interactive contextual panels, whether they display trending comments (or Tweets) or products for sale or any other content, can be linked to video content. The linking can be handled by a reference pointer, a bookmark in the video, or other technique known in the art.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for displaying a graphical user interface on a second-screen device comprising:
   displaying, by an application, a partial video stream in a video display area on a touchscreen of the second-screen device;
   displaying, by the application, a contextual panel in an active display area on the touchscreen, the contextual panel including content associated with the partial video stream, the partial video stream associated with a video stream displayed by a primary display, the partial video stream and the video stream associated with the same content and substantially synchronized;
   displaying, in the contextual panel, messages associated with a social media feed, the messages corresponding to a selected time frame associated with the video stream displayed on the touchscreen; and
   displaying, in the contextual panel, the selected time frame,
   wherein,
      displaying the partial video stream includes providing an indication of one or more time frames of the partial video stream on an ongoing basis, and
      each of the one or more time frames is generated based on a rate of number of messages per time period exceeding a threshold on the ongoing basis.

2. The method of claim 1, wherein the threshold is a predetermined threshold.

3. The method of claim 1, wherein the rate is number of messages per minute.

4. The method of claim 1, wherein the indication comprises color coding each of the time frames.

5. The method of claim 4, further comprising:
   sending, by the application, a color coded time bar to the primary display for display, the color coded time bar having color coded time frames corresponding to the color coded time frames displayed on the touchscreen.

6. A method for displaying a graphical user interface on a second-screen device comprising:
displaying, by an application, a partial video stream in a video display area on a touchscreen of the second-screen device;
displaying, by the application, a contextual panel in an active display area on the touchscreen, the contextual panel including content associated with the partial video stream, the partial video stream associated with a video stream displayed by a primary display, the partial video stream and the video stream associated with the same content and substantially synchronized; and
displaying, in the contextual panel, messages associated with a social media feed, the messages corresponding to a selected time frame associated with the video stream being displayed on the touchscreen,
wherein,
displaying the partial video stream includes providing an indication of one or more time frames of the displayed partial video stream, and
each of the one or more time frames is generated based on a rate of number of messages per time period exceeding a threshold on an ongoing basis.

7. The method of claim 6, further comprising:
displaying, by the application, a mini trends panel comprising one or more trend frames with each of the one or more trend frames corresponding to each displayed time frame and containing at least one common trend for the one or more trend frames.

8. The method of claim 7, further comprising:
receiving, by the application, a selection command selecting a displayed trend frame; and
displaying, by the application, the messages corresponding to the displayed trend frame in the contextual panel in response to the selection command.

9. The method of claim 6, further comprising:
receiving, by the application, a synchronization command; and
sending, by the application, a most recent received message to the primary display for display in response to the synchronization command.

10. The method of claim 6, wherein the social media feed is Twitter.

11. The method of 6, further comprising:
identifying relevant messages and wherein the messages displayed in the contextual panel are the identified relevant messages.

12. The method of claim 11, wherein the contextual panel includes at least one time frame, the at least one time frame including information associated with a product for sale, the at least one time frame associated with the video stream displayed on the touchscreen.

13. The method of claim 12, further comprising:
receiving, by the application, a selection of a displayed time frame; and
displaying, by the application, information associated with the product associated with the displayed time frame in the active display area in response to the selection of the displayed time frame.

14. The method of claim 13, wherein the information includes a prompt to navigate a 360 degree view of the product and in response to the prompt being selected:
displaying in the video display area, by the application, an image of the product and an interactive component configured to navigate a viewing of the product; and
controlling the display of the product displayed on the primary display in response to receiving gestures associated with the interactive component.

15. The method of claim 13, wherein the information includes a prompt to watch the video stream associated with the product in response to the prompt being selected:
displaying in the video display area, by the application, the video stream of the product associated with the selected time frame; and
controlling the display of the product being displayed on the primary display.

16. The method of claim 12, further comprising:
receiving, by the application, a navigation command to scroll a display of the one or more time frames; and
scrolling, by the application, the display of the one or more time frames and information associated with products for each displayed time frame, the scrolling of the display corresponding to the navigation command.

17. The method of claim 12, further comprising:
receiving, by the application, a navigation command to display the one or more time frames on the primary device;
displaying, by the application, the active display area on the touchscreen in response to the navigation command; and
causing images associated with the one or more time frames displayed on the touchscreen to be displayed on the primary display.

18. The method of claim 17, wherein the navigation command includes touch data corresponding to a gesture starting on a displayed image in the active display area and continuing upwards into the video display area.

* * * * *